United States Patent [19]

Sagawa et al.

[11] Patent Number: 5,250,255
[45] Date of Patent: Oct. 5, 1993

[54] METHOD FOR PRODUCING PERMANENT MAGNET AND SINTERED COMPACT AND PRODUCTION APPARATUS FOR MAKING GREEN COMPACTS

[75] Inventors: Masato Sagawa; Hiroshi Nagata; Hiroo Shirai, all of Kyoto, Japan

[73] Assignee: Intermetallics Co., Ltd., Kyoto, Japan

[21] Appl. No.: 800,356

[22] Filed: Dec. 2, 1991

[30] Foreign Application Priority Data

Nov. 30, 1990 [JP] Japan .................. 2-330048
Feb. 14, 1991 [JP] Japan .................. 3-40861
Mar. 1, 1991 [JP] Japan .................. 3-59487
Jun. 14, 1991 [JP] Japan .................. 3-169346

[51] Int. Cl.$^5$ ................................ B22F 3/12
[52] U.S. Cl. ........................ 419/39; 419/38; 419/66
[58] Field of Search .............. 419/38, 39, 66; 148/103, 105, 108

[56] References Cited

U.S. PATENT DOCUMENTS

| | | | |
|---|---|---|---|
| 3,038,199 | 6/1962 | Bartow et al. | 18/5 |
| 3,189,667 | 6/1965 | Buttner et al. | 264/24 |
| 3,469,283 | 9/1969 | Vinson | 18/18 |
| 3,571,854 | 3/1971 | Lundstrom | 18/16.5 |
| 3,650,646 | 3/1972 | Kirkpatrick | 425/78 |
| 3,897,532 | 7/1975 | Lyssy | 264/127 |
| 4,808,224 | 2/1989 | Anderson et al. | 419/42 |
| 4,869,869 | 9/1989 | Anderson et al. | 419/44 |
| 5,080,731 | 1/1992 | Tabaru et al. | 148/103 |

FOREIGN PATENT DOCUMENTS

| | | |
|---|---|---|
| 0386472 | 12/1990 | European Pat. Off. . |
| 49-135805 | 12/1974 | Japan . |
| 51-136198 | 5/1975 | Japan . |
| 55-26601 | 7/1980 | Japan . |
| 55-26601 | 7/1980 | Japan . |
| 59-127823 | 11/1984 | Japan . |
| 61-67599 | 4/1986 | Japan . |
| 61-147997 | 7/1986 | Japan . |
| 61114505 | 10/1986 | Japan . |
| 62-13298 | 1/1987 | Japan . |
| 61-194703 | 1/1987 | Japan . |
| 62-64498 | 3/1987 | Japan . |
| 62-185929 | 3/1987 | Japan . |
| 63-111155 | 9/1988 | Japan . |
| 63-227701 | 9/1988 | Japan . |

OTHER PUBLICATIONS

English abstract of Japanese Unexamined Patent Application (kokai) No. 56-119699, published Sep. 19, 1981.

Primary Examiner—Peter A. Nelson
Assistant Examiner—Daniel Jenkins
Attorney, Agent, or Firm—Fish & Richardson

[57] ABSTRACT

Green compacts for sintered ceramic bodies and for sintered permanent magnets are produced by first preparing outside a die press machine a mold which contains a rubber portion in at least a side portion. The mold cavity is then filled with the fine powder which is to form the compact to a density which is at least 1.2 times the natural filling density of the powder. The filled rubber mold is then placed in the die press machine and compacted in the die press machine to produce the green compact. The natural filling density is obtained by allowing the powder to fall from a powder pan into the rubber mold until the powder reaches the top of the rubber mold, where the distance from the powder pan to the bottom of the rubber mold is 3.7 times the depth of the cavity of the rubber mold.

150 Claims, 44 Drawing Sheets

Fig. I (A)
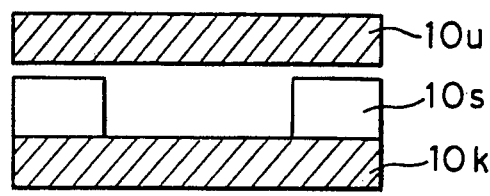
Fig. I (B)
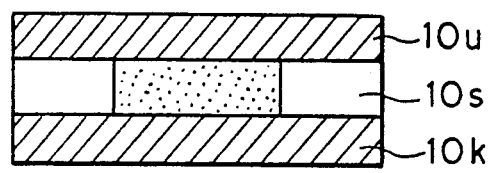
Fig. I (C)
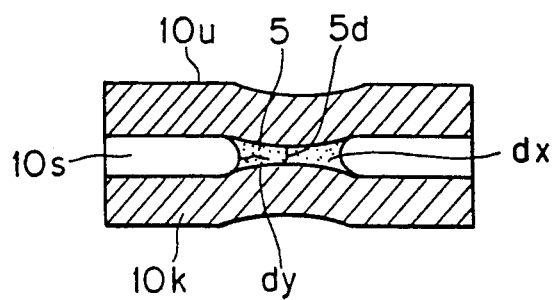

Fig. 26(A)  Fig. 26(B)
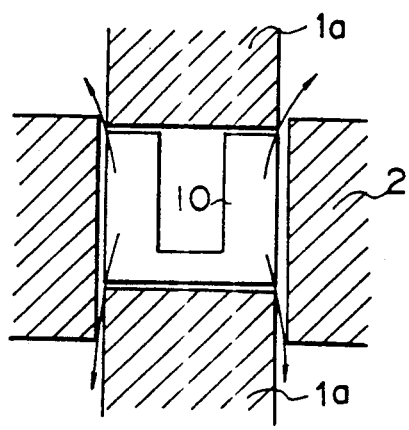 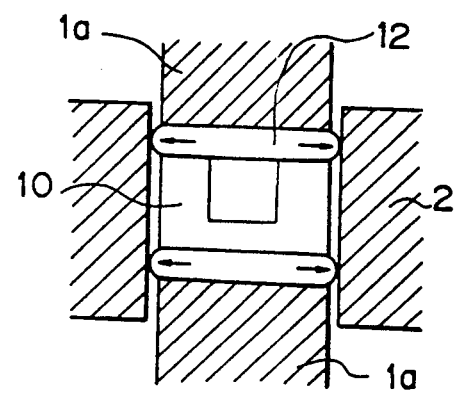
Fig. 26(C)  Fig. 26(D)
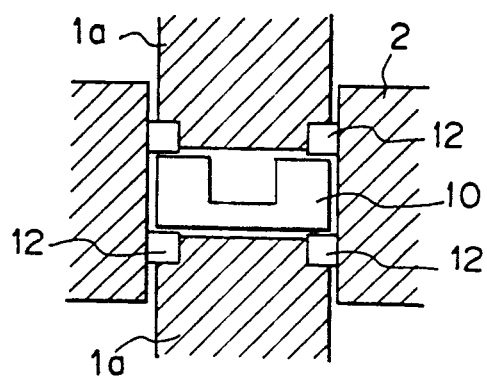 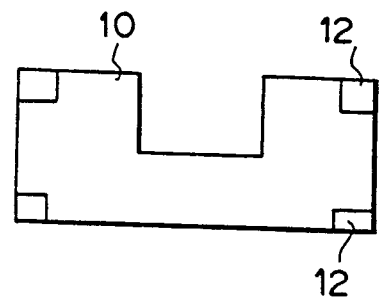

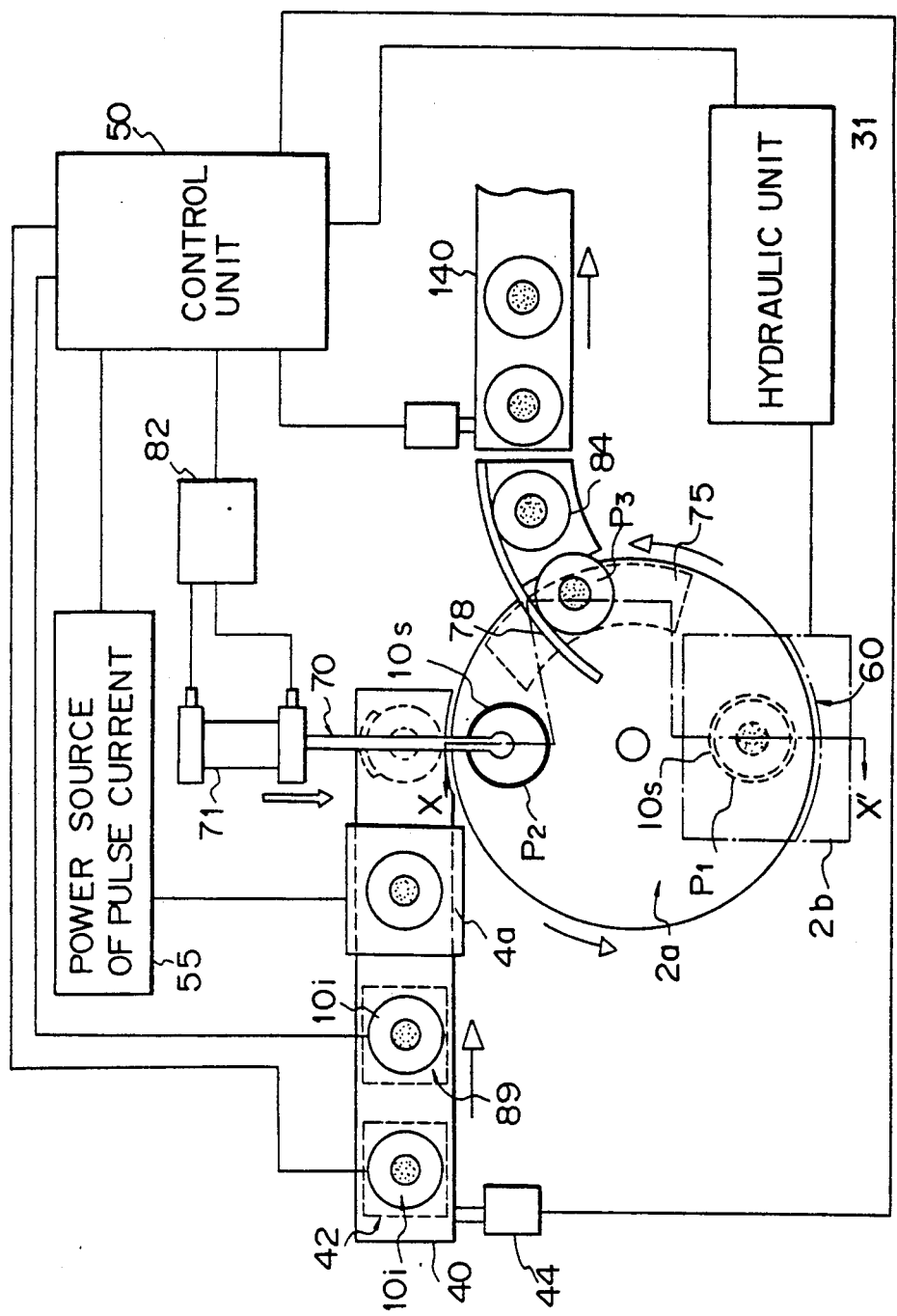

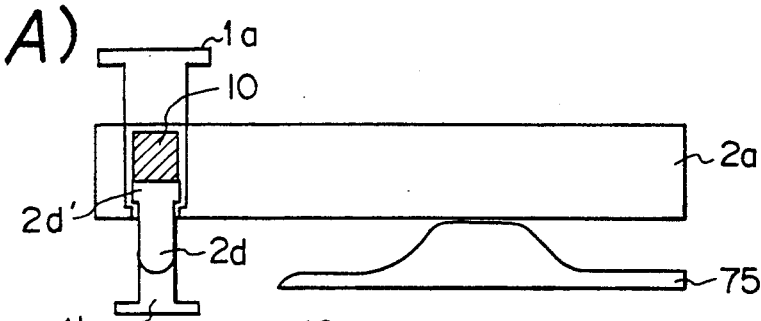
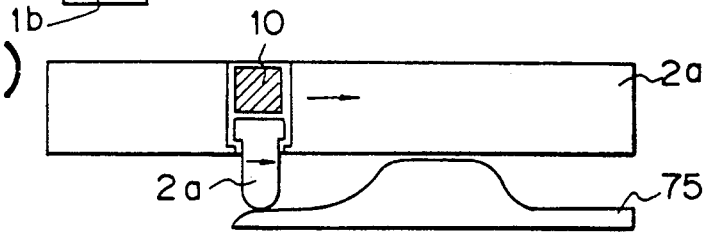
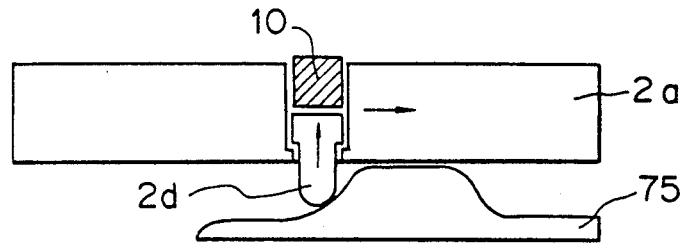
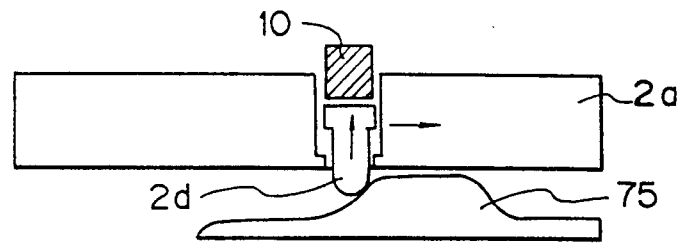
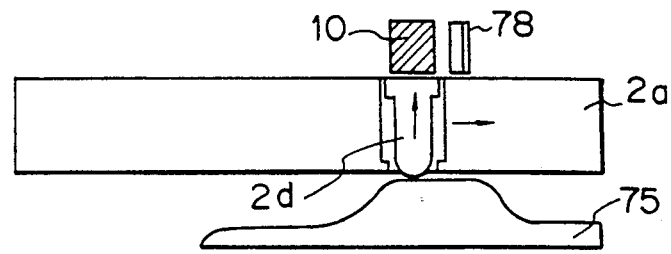
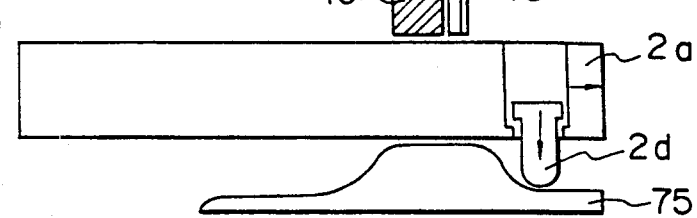

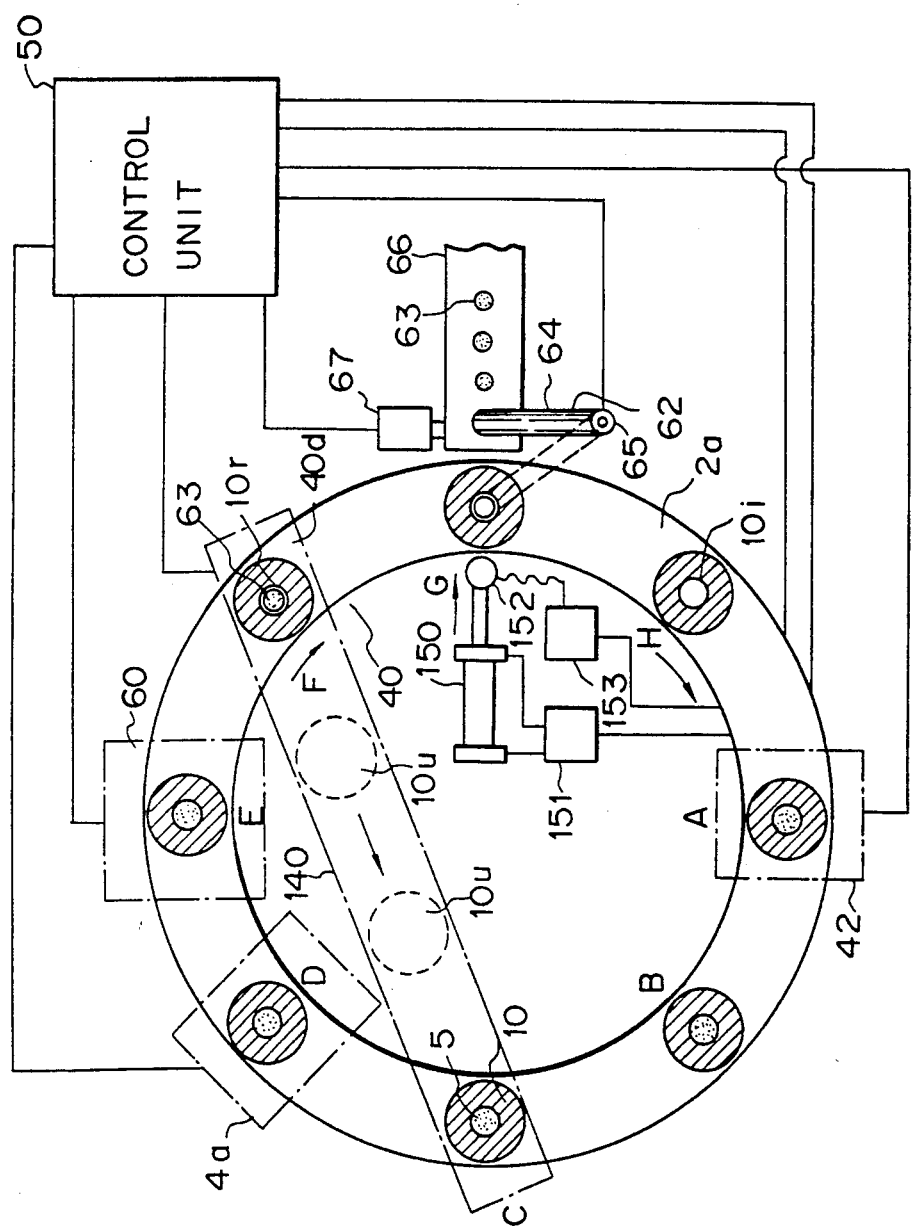

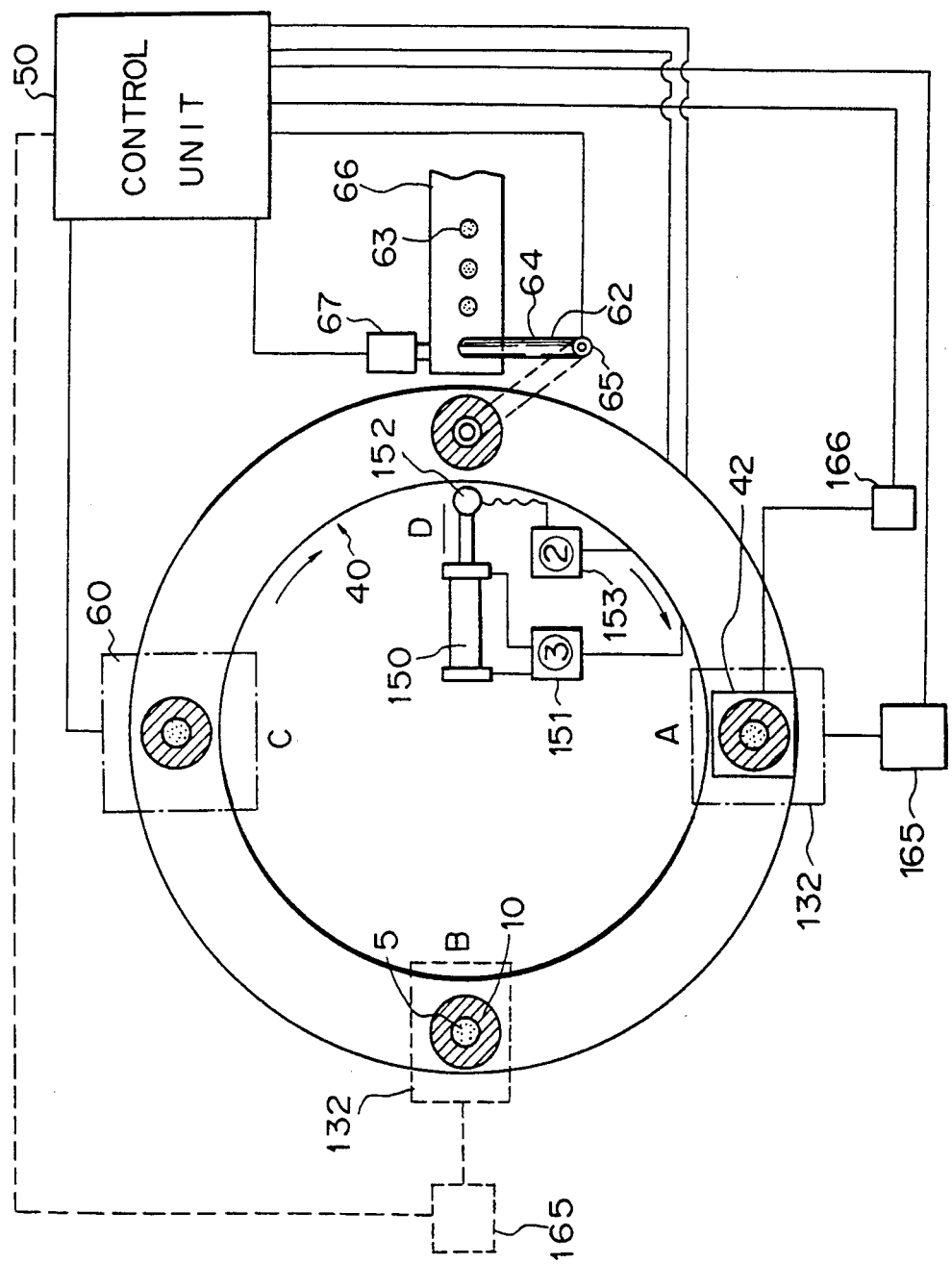

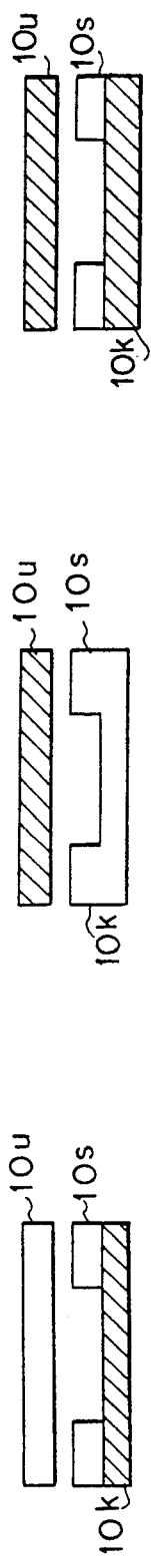

RUBBER MOLD

RUBBER MOLD

METHOD FOR PRODUCING PERMANENT MAGNET AND SINTERED COMPACT AND PRODUCTION APPARATUS FOR MAKING GREEN COMPACTS

BACKGROUND OF THE INVENTION

The present invention relates to a method for producing permanent magnets and sintered compact. More particularly, the present invention relates to a method for compacting a permanent-magnet powder under a magnetic field while enhancing the anisotropic property and hence enhancing the magnetic properties of the permanent magnets so made. The particles of the powder as compacted are oriented in the easy direction of magnetization. The so-oriented particles are then subjected to compacting and the particles are fixed by the compacting force. The green compact is then sintered to obtain the sintered magnet. Alternatively, resin is impregnated into the so-oriented powder so as to obtain the resin-bonded magnet. The permanent-magnet (hereinafter referred to as the "magnet") powder and resin may be compacted together to obtain the resin bonded magnet.

In addition, the present invention relates to a method for producing a sintered compact by means of die-pressing a fine powder of an ordinary material, i.e., a material other than a magnet material, under no magnetic field and then sintering the green compact. More particularly, the conventional diepressing method is improved such that the fine powder is compacted. In the powder-metallurgy technique, not only the density of a sintered compact increases but also the grain size of a sintered compact can be refined by lessening the particle diameter of the powder. As a result, the such sintered materials as Al and Ti are considerably strengthened, and the magnetic properties of soft magnetic ferrous materials are enhanced. However, the flowability of fine powder is very poor. When the powder having poor flowability is filled in a die under gravity, the bridging phenomenon is very liable to occur in the die, and the filling density greatly varies for each filling. The weight of each green compacts (hereinafter referred to as "unit weight") varies greatly and the average filling density of the powder is lower.

The present invention is also related to production apparatus of a green compact, which is subjected to sintering, or to the production of magnet.

Description of Related Arts

(Magnet)

Although CIP (cold isostatic pressing) is used for compacting magnet powders, this method is not industrially carried out, because the compacting process is complicated. That is, the magnet powder is oriented in a rubber mold under a magnetic field, then the rubber mold is immersed in a liquid medium, and the particles of the magnet powder are isostatically compacted in the liquid medium. The industrial compacting method is the die-pressing method by means of a punch(es) and die(s).

Conventional methods are the perpendicular diepressing method, in which the magnetic field is applied to the magnet-powder in a direction perpendicular to the moving direction of the punch(es), and the axial die-pressing method, in which the magnetic field is applied parallel to the moving direction of the punch(es).

The axial die-pressing method is used for forming a flat anisotropic magnet, whose anisotropic direction is perpendicular to the major surface. The perpendicular die-pressing method is used for forming an anisotropic magnet having a relatively simple shape, whose length in the magnetically oriented direction is relatively large. Most of the magnets, particularly ferrite magnets, demanded in the market have such a shape that the magnetically oriented direction is perpendicular to the major surface.

It is generally recognized that the magnetic properties, particularly Br and $(BH)_{max}$, of the sintered magnets industrially produced by the perpendicular die-pressing method are superior to those produced by the axial die-pressing method. However, Japanese Examined (Kokoku) Patent Publication No. 55-26601 discloses that magnetic properties equivalent to those by the perpendicular die-pressing method can be obtained by the axial die-pressing method using a rubber mold. In this method, the magnet powder is filled in a rubber mold, which has been preliminarily set in the metal die of a die-press machine. The above-mentioned examined patent publication describes that the magnetic properties of the ferrite magnet are impaired by the disclosed die-pressing method using a rubber mold.

There is also a wet die-pressing method which is usually carried out for compacting the powder of ferrite magnet, because the magnetic powder is liable to orient in the slurry under the magnetic field, and, hence a higher orientation is obtained than by orienting the dry powder.

In the wet die-pressing, a slurry with a water content of from 30 to 40 wt % is injected into the die cavity via an aperture in the die wall. A filter consisting of one or plurality of sheets or cloths is attached to the upper punch provided with a suction channel. During compacting by the upper and lower punches, the slurry in the die cavity is subjected to vacuum suction and the water is sucked through the filter.

(Ordinary Materials)

Since the specific surface area of fine powders is great, they are so active that they are oxidized in air and deteriorate in air. Particularly, the fine powder of Al-Li alloy and Ti alloy, whose reliability must be very high when they are used for the structural parts of an aircraft, are readily oxidized in air and, in extreme case, spontaneously ignite. In addition, the fine powder is very pyrophoric. When the powder is seized between the die and punch of a die-press machine, the lubrication is lessened and the friction is increased, which can generate the spark which can act to cause the ignition of the fine powder.

There is a limitation in the shape of a green compact which is copacted by the die-pressing method, which is one of the most frequently used shaping methods of powder. Such green compacts having unevenness or grooves, e.g., a screw, and a very elongated shape cannot be produced by die-pressing.

It has been proposed to modify the isotropic compacting in the die-pressing for example in Japanese Unexamined (Kokoku) Patent Publication No. 49-135,805. According to this proposal, a rubber mold is set in a die, and the powder is filled in the rubber mold. The powder is therefore compacted in a moving direction of a punch(es) and also in a direction perpendicular to the former direction. The compression is therefore pseudo-isotropic. The compacting described above may hereinafter be referred to as the rubber mold die-pressing.

A rotary press-machine in known in the field of die-pressing of powder. This rotary press-machine is provided with a circular die having a plurality of die-cavities and the same number of punches as the die-cavities. A feeder box for feeding the powder into the die-cavities is slidably mounted on the circular die. During the rotation of the circular die, the die-cavities pass beneath the open bottom of the feeder box, and, the powder falls under gravity into the die-cavity. When the circular die further rotates, the bottom end of the side wall of the feeder box is displaced relative to the circular die and the die cavities, where the powder is filled, while rubbing them by such end. The punches are secured to a punch holder, whose position relative to the circular die is fixed. The punch holder therefore rotates together with the rotation of the circular die. The punches are held by the punch holder in such a manner that they can be advanced from the punch holder toward the die cavities. Driving mechanisms for the punches, such as a cam and rail, are mounted within the punch holder, and drive successively the punches when pressing the powder. Each punch is therefore pushed into each die-cavity in the sequence determied by the driving mechanisms.

SUMMARY OF THE INVENTION

(Magnets)

Since the powder of rare-earth cobalt magnet is filled into the rubber mold, which is preliminarily set in the die of die-press machine, according to the method of the above-mentioned Japanese Examined Patent Publication No. 55-26601, the powder is naturally filled or filled under gravity in the rubber mold. In this case, the apparent density of the powder of rare-earth cobalt magnet in the mold is approximately 18% of the density of the rare-earth cobalt alloy itself. As is known, the magnetic orientation of the powder is very sensitive to its density, and the magnetic orientation of powder filled at a higher density than the naturally filled density is difficult. It is therefore conventionally carried out to fill the magnet powder by means of a shaker or the like into a die cavity, so that the magnet powder has the naturally filled density in the die cavity.

The present inventors tested the method disclosed in Japanese Examined Publication No. 55-26601 not only with regard to the rare-earth cobalt magnet but also for the ferrite and neodymium magnets and made the following discoveries. When the naturally filled powder is compacted to produce a green compact having an apparent density of approximately 50%, the green compact cracks in the die-press machine or the rubber mold non-uniformly deforms during the die-shaping. In this case, the green compact so non-uniformly deforms that its shape cannot be adjusted by modifying the shape of the rubber mold.

The powders of the magnet are crushed considerably finer, and hence have considerably poorer flowability than those of the ordinary materials, in order to fully extract the magnetic properties thereof. Although a considerable amount of lubricant can be added to the powder of ordinary materials so as to improve their flowability, the amount of lubricant is extremely small even if it is added to the magnet powder, because the remaining carbon and the like have a detrimental effect upon the magnetic properties of the magnet powder. A small amount of the lubricant is not at all effective for improving the flowability of the magnet powder. In addition, it is possible to enhance the flowability of the ordinary materials by increasing the particle diameter. This measure is not utilized for the magnet powder, as the magnetic properties decrease. Because of the reasons as described above, the density of the naturally filled powders is as low as 18% or less for the rare-earth cobalt magnet and 16% or less for the ferrite magnet.

It is therefore an object (hereinafter referred to as "the first object") of the present invention to provide a production method of magnet, by which the orientation of a green compact is enhanced and the magnetic properties are improved by utilizing the elasticity of the rubber mold, without causing cracks, crazing and fracture of the green compact.

Heretofore, as it has been necessary in the die-pressing and orienting method under magnetic field to synchronously apply the magnetic field and compacting pressure to the magnet powder, the process control is more complicated than in the case of mere die-pressing without application of magnetic field.

It is therefore another object (hereinafter referred to as "the second object") of the present invention to provide a production method for anisotropic magnets which does not cause cracks, crazing and fracture of the green compact, and by means of simply controlling the compacting step and magnetic field-application step. It is a specific aspect of the second object to enhance the orientation of the anisotropic magnet to a level higher than that attained by the conventional method.

Japanese Examined Patent Publication No. 55-26601 mentioned above states that the rubber mold replaces the pressure medium used in CIP. The rubber mold therefore completely surrounds the magnetic powder to isostatically apply pressure to the magnet powder. Such rubber mold therefore cannot be utilized for the wet die-pressing.

It is therefore a further object (hereinafter referred to as "the third object") of the present invention to provide a wet die-pressing method for producing a magnet, by which the orientation of a green compact is enhanced and the magnetic properties are improved by utilizing the elasticity of the rubber mold, and, further, by which a green compact is produced without cracks, crazing or fracture.

In the method disclosed in Japanese Examined Patent Publication No. 55-26601, since the rubber mold is preliminarily placed in a die-press machine and the magnet powder is then filled into the rubber mold, the punch, columns for guiding the vertical movement of the punch, and the like impede the feeder which feeds the magnet powder into the rubber mold. The disclosed method has therefore a low efficiency. In addition, until one cycle consisting of the powder-feeding, shaping, and removal of a green compact is completed, the next cycle cannot be initiated. This method is therefore inappropriate for continuous production of a large number of magnets.

(Ordinary Materials)

It is yet another object (hereinafter referred to as the fourth object) of the present invention to provide a sintering method for producing a sintered compact having a density of 90% or more, in which a fine powder of the ordinary material can be compacted without using organic lubricant. It is one aspect of the fourth object that the fine powder of soft material, such as aluminum and its alloys, is compacted to a green compact having high and uniform density. It is also an aspect of the fourth object that the sintered compacts can be produced at an efficiency as high as the conventional die-pressing. It is a further aspect of the fourth object to provide a sintered compact having a high density and low content of impurities, such as carbon, which are detrimental to the properties of metals, particularly Ti. It is another aspect of the fourth object to provide a highly densified sintered compact of hard material, whose density can be only enhanced in the conventional method by means of the post-sintering working, such as sizing, rolling and drawing.

The conventional rotary-press machine can fill the powder only at a natural density.

It is therefore an object (hereinafter referred to as the fifth object) of the present invention to provide a die-press apparatus, which can fill the powder at a density higher than the natural density.

It is yet another object (hereinafter referred to as "the fifth object") of the present invention to provide an apparatus for producing a sintered compact, which is appropriate for continuous production.

BRIEF DESCRIPTION OF THE DRAWINGS

FIGS. 1 (A) through (C) illustrate incidence of cracks during compacting of a rubber mold and powder filled in the rubber mold.

FIGS. 26(A) through (D) illustrate several embodiments of a back-up plate.

FIG. 27 is a schematic top view of a circulating type-dry die-press apparatus according to the present invention.

FIGS. 29(A) through (F) illustrate the movement of a cam plate used in the apparatus shown in FIGS. 27 and 28.

FIG. 31 is a schematic top view of another circulating type-dry die-press apparatus according to the present invention.

FIG. 39 is a top view of a circulating type-wet die-press apparatus according to the present invention.

FIGS. 44(A) through (L) illustrate various combinations of materials and portions of a rubber mold.

DETAILED DESCRIPTION OF THE INVENTION

Figure 2A:
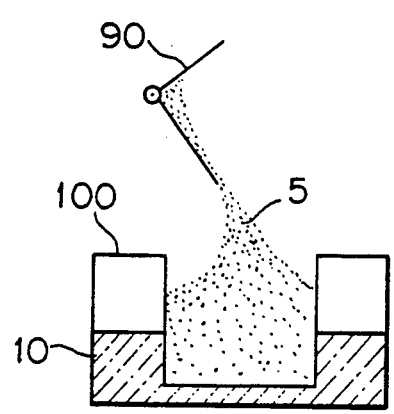
FIGS. 2(A) through (D) illustrate a method for filling the powder in a rubber mold.
Figure 2B:
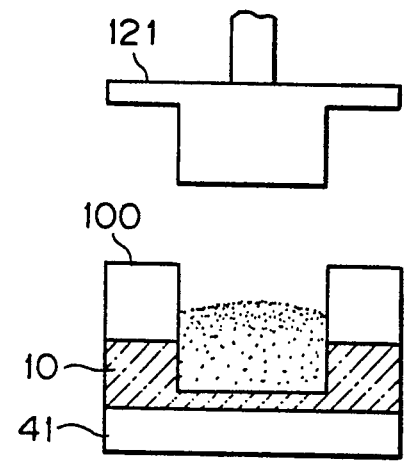

Means for Preventing Cracks in a Green Compact Shaped by Using Rubber Mold

FIG. 1 illustrates a flat green compact of magnet powder shaped in a rubber mold by a die-press machine. When the magnet powder is rare-earth cobalt powder, the density of the naturally filled powder in a rubber mold is from approximately 11 to 13% in most cases. The powder is then compacted so that the dimension decrease is from 30 to 40% and hence is great. During deformation of the rubber mold 10 as shown in FIG. 1(C), frictional force is generated between the portions $10s$, $10k$ and $10u$ as well as between the rubber mold 10 and the metal dies (not shown). Among the deformations, the non-uniform deformation dy is generated in the cover 10u and the bottom 10k and promotes the generation of cracks 5d which extend parallel to the pressing direction of the punch. On the other hand, the non-uniform deformation dx is generated in the side portion of the rubber mold and promotes the generation of cracks 5e which extend in a direction perpendicular to the pressing direction of the punch. The non-uniform deformation dx results in a serious deformation, the so-called "elephant-leg", on the edge of the green compact.

When the magnet powder is compacted and oriented under a magnetic field and is then demagnetized insufficiently, the magnetization remains in a green compact, with the result that stress is generated in the green compact due to the static magnetic energy. Therefore, even if the cracks generated in a green compact are very small, the cracks are rapidly enlarged due to the stress mentioned, thereby breaking the green compact into fragments. Particularly, when the edge of a green compact deforms to form the elephant leg, cracks due to the remaining magnetization are very likely to occur. In order to prevent the non-uniform deformation of a green compact in a rubber mold and cracks and the like, the powder must be filled in a rubber mold at a higher density than the natural density. Since the powder filled at a high density undergoes a smaller deformation than by the ordinary compacting method under magnetic field, the non-uniform deformation of the rubber mold is lessened, thereby preventing cracks and shape-failure of a green compact. The orientation is therefore high notwithstanding the high-density filling in a rubber mold, because the orientation of magnet powder is improved by the deformation of the rubber mold in a direction perpendicular to the moving direction of the punch(es), and also by preliminarily applying the magnetic field to the magnet powder prior to the compacting step.

Aspects of Invention

The high density of magnet powder or mixture of magnet and resin powders filled in a rubber mold according to the present invention means that the density is at least 1.2 times the natural filling density, regardless of the kind of magnet and resin materials. The naturally filled density depends mainly upon the particle diameter of the magnet and resin powder.

The density of natural filling is the apparent density of the powder filled in a rubber mold under gravity. The method for measuring apparent density stipulated in the Japan Industrial Standard is a standard method for measuring the density of natural filling. However, the value obtained by this method is considerably remote from the density usually attained by the feeder box, or the measurement is impossible in extreme cases because the flowability of the magnet powder is very poor. According to the present invention, the density of natural filling is measured by filling the powder from the powder pan 90 shown in FIG. 2(A) until the top of the powder arrives at the upper frame 100 which prevents the powder 5 from overflowing from the rubber mold 10. The position of the powder pan 90 is such that the distance between the bottom end of the powder pan 90 and the bottom of the rubber mold 10 is 3.7 times the depth of the cavity of the rubber mold 10.

The natural filling density is 14% for the rare-earth cobalt magnets (including R-Co and R-Fe-B) having a particle diameter of from 3 to 4 $\mu m$, and 12% for the ferrite magnet having a particle diameter of approximately 0.7 $\mu m$. The high density of the rare-earth magnet attained by this invention and ferrite magnet is therefore at least 16.8% and 14.4%, respectively. The high filling density is preferably from 25% or more for rare-earth-iron-boron magnets and rare-earth cobalt magnets. The density is more preferably 29% or more both for rare-earth magnets and ferrite magnets. When the filling density exceeds 50%, the orientation becomes impossible under the ordinary intensity of magnetic field. The filling density is preferably 50% or less.

The rubber mold used according to the present invention has a bottom and consists of rubber at least in the side portions thereof. Such a rubber mold is hereinafter simply referred to as the rubber mold. The bottom of the rubber mold may be integrated with the other portions of the rubber mold. The lower punch or the bottom of a lower-closed die may constitute the bottom of the rubber mold. The rubber mold according to the present invention may be provided with a detachable cover consisting of metal or rubber. In this case, the cover is included in the rubber mold herein. The rubber mold may be provided with a plurality of cavities, so that a plurality of green compacts is produced at once.

In accordance with the first object of the present invention, there is provided a production method for a magnet, comprising a compacting step of magnet powder under magnetic field, characterized by: filling at a high density the magnet powder in a rubber mold outside a die-press machine by at least one means consisting of imparting vibration thereto and pressing the same with a pusher, or by preliminarily compacting the magnet powder and then inserting the preliminary compacted magnet powder into a rubber mold outside a die-press machine; setting the rubber mold in the die-press machine, into which the magnet powder is filled; and compacting the rubber mold and the magnet powder by a punch(es) of the die-press machine thereby obtaining a green compact of the magnet powder. The concept of "outside the die-press machine" herein indicates that the rubber mold is in a position shifted from the axial position of the punch(es) of a die-press machine but does not indicate that the rubber mold must be completely outside a die-press machine consisting of a punch(es), dies, a die-holder, a ram and the like.

In accordance with the first object of the present invention, there is also provided a production method for a magnet according to the above-described inventive method, further comprising the steps of: covering the upper open part of the rubber mold with a cover; and, subsequently, prior to the compacting step in the die-press machine, applying instantaneous magnetic field or applying the stronger static magnetic field than in the compacting step, to the magnet powder in the rubber mold.

In accordance with the second object of the present invention, there is provided a production method for a magnet comprising a compacting step of a magnet powder, characterized by: filling the magnet powder at a high density in a rubber mold outside a die-press machine by at least one means consisting of imparting vibration thereto and pressing the same with a pusher, or by preliminarily compacting the magnet powder and then feeding the preliminary compact of magnet powder into a rubber mold outside a die-press machine; covering the upper open part of rubber mold with a cover; prior to the compacting step in the die-press machine, applying an instantaneous magnetic field or a applying stronger static field to the magnet powder in the rubber mold than in the compacting step; setting the rubber mold in the die-press machine, into which the magnet powder is filled or compacted; and compacting the rubber mold and the magnet powder by a punch(es) of the die-press machine, without application of magnetic field, thereby obtaining a green compact of the magnet powder.

In accordance with the third object, there is provided a production method (hereinafter referred to as "the third method") of a magnet, wherein the magnet powder is compacted by a die-press machine provided with an upper punch, a filter and a water-suction channel formed in the upper punch, so as to shape the slurry in magnetic field, characterized by: filling the slurry into a rubber mold in or outside the die-press machine; setting the rubber mold in the die-press machine; setting the filter between the upper punch and the open upper portion of the rubber mold; and compacting the rubber mold and the slurry thereby sucking the water or solvent of the slurry through the filter and the water-suction channel.

In accordance with the first and second object of the present invention, there is provided a method (hereinafter referred to as "the fourth method"), characterized by repeatedly carrying out, in a circuit, the steps of: filling the magnet powder in a rubber mold at a high density outside the die-press machine; applying magnetic field to the magnet powder according to the first or second method; die-pressing; and, removing the mold from the die press machine.

The rubber used for the rubber mold is not limited but may be natural rubber, isoprene rubber, butadiene rubber, styrene-butadiene rubber, isobutylene rubber, ethylene-propylene rubber, butadiene-acrylonitrile rubber, chloroprene rubber, isobutylene-isoprene rubber, ethylene-propylene rubber, ethylene-propylene rubber, chlorosulfonated polyethylene rubber, polysulfide rubber, silicone rubber, fluorinated rubber, urethane rubber, polyurethane rubber, epichlorohydrin rubber, acryl rubber, ethylene-vinyl acetate rubber, polyester rubber, chlorinated butyl rubber, chlorosuofonated polyethylene rubber, chlorinated polyethylene rubber, poly-isoprene rubber, norbornene polymer, and the like.

Plastics and wooden material, which do not completely plastically deform under the pressure of a punch, may be used. They are for example urethane, silicone resin, melamine resin, unsaturated polyester resin, epoxy resin, diallyl phthalate resin, polyimide, polyethylen, polypropyrene, polystyrene, AS resin, AbS resin, polyvinyl chloride, polyvinylidene chloride, polyamide, polymethyl methacrylate, polycarbonate, polyacetal, polysuofonate, fluorine resin, cellulose acetate, and the like. Plasticizer may be added to the plastics.

In accordance with the fourth object, there is provided a production method (hereinafter referred to as the "fourth method") for a sintered compact having a density of 90% or more, comprising: preparing a rubber mold which consists of rubber at least in a side portion thereof; filling fine powder of a material other than magnet material, having average particle size of 50 μm or less and being essentially free of organic binder at a density at least 1.15 times the natural density defined below, in the rubber mold located outside the die-press machine; locating in the die-press machine the rubber mold, into which the fine powder is filled; compacting the rubber mold and the fine powder by a punch(es) of the die-press machine thereby obtaining a green compact; and sintering the green compact. The natural density is measured by filling the fine powder into the rubber mold from a powder pan until the top of the fine powder arrives at an upper frame which prevents the fine powder from the rubber mold, and a position of the top of the powder is such that distance between the bottom end of the powder pan and the bottom of the rubber mold is 3.7 times the depth of cavity of the rubber mold.

In accordance with the fifth object, there are provided the following production apparatus:

(a) An apparatus for production of a green compact comprising: a circuit for circulating rubber molds; a high-density filling device comprising a feeder of the powder into the rubber molds which comprise rubber at least in their side portions, and a pusher; a die-press machine; and, a device for removing a green compact from each rubber mold, said high-density filling device, die-press machine and removing device being successively arranged along the circuit.

(b) An apparatus for production of a green compact comprising: a circuit for circulating rubber molds which comprise rubber at least in their side portions; high-density filling device comprising a feeder for feeding powder into the rubber molds and a vibrator along with or instead of said pusher at the same place as said feeder; a die-press machine; and, a device for removing a green compact from each rubber mold, said high-density filling device, die-press machine and removing device being successively arranged along the circuit.

(c) An apparatus for production of a green compact, comprising: a circuit for circulating rubber molds which comprise rubber at least in their said portions; high-density filling device comprising a loader of a preliminarily compacted powder into the rubber molds and a pusher; a die-press machine; and, a device for removing a green compact from each rubber mold, said high-density filling device, magnetic-field generator, die-press machine and removing device being successively arranged along the circuit.

(d) An apparatus for production of a green compact, comprising: a circuit for circulating rubber molds which comprise rubber at least in their said portions; feeder of field generator: a die-press machine; and, a device for removing a green compact from each rubber mold, said feeder, said magnetic-field generator, die-press machine and removing device being successively arranged along the circuit.

(e) An apparatus for production of a green compact, comprising: a circuit, for circulating rubber molds which comprise rubber at least in their side portions; a loader of preliminarily compacted slurry into the rubber molds; a magnetic-field generator; a die-press machine; and, a device for removing a green compact from each rubber mold, said loader, said magnetic-field generator, die-press machine, and said removing device being successively arranged along the circuit.

(f) An apparatus for production of a green compact, comprising: a circuit for circulating rubber molds which comprise rubber at least in their side portions; a feeder of a slurry of magnet powder into the rubber molds; magnetic-field generator; a die-press machine; a device for removing a green compact from each rubber mold, and, a means for degassing treatment of the inside of the cavity of the rubber molds, said feeder, said magnetic-field generator, die-press machine, removing device and degassing means being successively arranged along the circuit.

(g) An apparatus for production of a green compact, comprising: a circuit for circulating rubber molds which comprise rubber at least in their side portions; a loader of preliminarily compacted slurry into the rubber molds, degassing means for degassing treatment of the inner surfaces of the rubber molds; said magnetic-field generator, die-press machine, removing device and said degassing means being successively arranged along the circuit.

(h) An apparatus for production of a green compact, comprising: a circuit for circulating rubber molds which comprise rubber at least in their side portions; a feeder of a slurry of magnet powder into the rubber molds: a means for degassing treatment of the inner surfaces of the rubber molds; a magnetic-field genertor: a die-press machine; a device for removing a green compact from each rubber mold; said feeder, said degassing means, said magnetic-field generator, die-press machine, are removing device being successively arranged along the circuit.

(i) An apparatus for production of a green compact, comprising: a circuit for circulating rubber molds which comprise rubber at least in their side portions; a loader for circulating rubber molds, as well as: a loader of preliminarily compacted slurry into the rubber molds; a magnetic-field generator; a die-press machine; a device for removing a green compact from each rubber mold; and a means for degassing treatment of the inner surfaces of the rubber molds, said loader, said magnetic-field generator, die-press machine, said removing device, and said degassing means being successively arranged along the circuit.

(j) A production apparatus of magnet, wherein a high-density filling device comprising a feeder for feeding magnet powder into a rubber mold which comprises rubber at least in a side portion thereof, and one or both of a pusher and a vibrator, die-press machine, and a device for removing a green compact are separately located on a straight passage, and, a rail is provided along said straight passage and mounts a reciprocating means thereon, and, further a palette, on which the rubber mold is detachably mounted, is reciprocated by said reciprocating means on the rail along said passage.

(k) An apparatus for production of a green compact comprising: a mold-supporting means having a configuration of an equilateral or scalene polygon; a high-density filling device comprising a feeder of the powder into the rubber molds which comprise rubber at least in their side portions and a pusher; a die-press machine; and, a device for removing a green compact from each rubber mold; said high-density filling device, die-press machine and removing device being located at either an apex region or side region of said polygon, or both regions, said apparatus further comprising a means for transporting the rubber mold in a linear movement between the adjacent apexes.

(l) An apparatus for production of a green compact, comprising: a mold supporting means having a configuration of equilateral or scalene polygon and rubber molds which comprise rubber at least in their side portions; a high-density filling device comprising a feeder for feeding powder into the rubber molds and a vibrator along with or instead of a pusher at the same place as said feeder; a die-press machine; and, a device for removing a green compact from each rubber mold; said high-density filling device, die-press machine and removing device being located at either an apex region or side region of said polygon, or both regions, said apparatus further comprising a means for transporting the rubber molds in a linear movement between the adjacent apexes.

(m) An apparatus for production of a green compact, comprising: a mold supporting means having a configuration of equilateral or scalene polygon as well as: a high-density filling device comprising a feeder of powder into rubber molds which comprise rubber at least in their side portions; a vibrator and a pusher; a die-press machine; and, a device for removing a green compact from each rubber mold, said high-density filling device, die-press machine and removing device being located at either an apex region or side region of said polygon, or both regions, said apparatus further comprising a means for transporting the rubber molds in a linear movement between the adjacent apexes.

(n) An apparatus for production of a green compact, comprising: a mold supporting means having a configuration of equilateral or scalene polygon as well as: a high-density filling device comprising a feeder of powder into rubber molds which comprise rubber at least in their side portions, a vibrator and a pusher; a die-press machine; and, a device for removing a green compact from each rubber mold, said high-density filling device, die-press machine and removing device being located at either an apex region or side region of said polygon, or both regions, said apparatus further comprising a means for transporting the rubber mold in a linear movement between the adjacent apexes.

First and Fourth Methods

Referring to FIG. 2, the powder 5 which may be magnet powder or a powder of ordinary materials, is filled at a high density by imparting vibration thereto. The powder 5, whose weight has been preliminarily measured, is naturally filled into the rubber mold 10 by flowing it down from the powder pan 90 (FIG. 2(A)). The powder 5 stacks higher than the upper surface of the rubber mold 10 up to the interior of the guide frame 100 fixed to the upper surface of the rubber mold 10. The rubber mold 10 is subsequently placed on the vibrator 41 which imparts vibration to the rubber mold during or after the powderfeeding (FIG. 2(B)). The vibrator 41 may be of a magnetic-type or a crank-type and may generate horizontal or vertical vibration. The vibration frequency is not limited but is, for example, from 1 to 60 Hz.

Figure 2C:
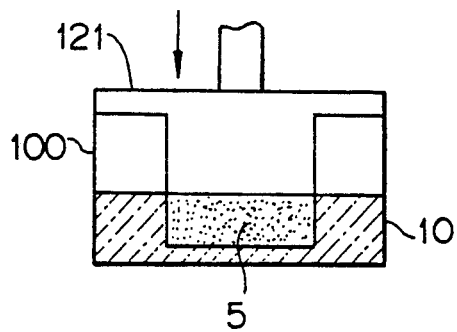
Figure 2D:
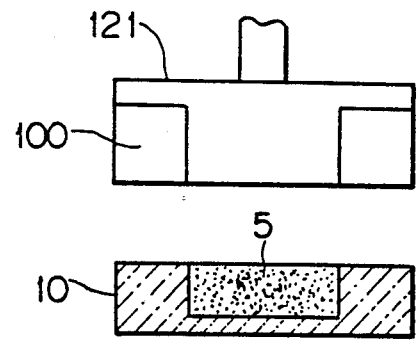
Figure 3A:
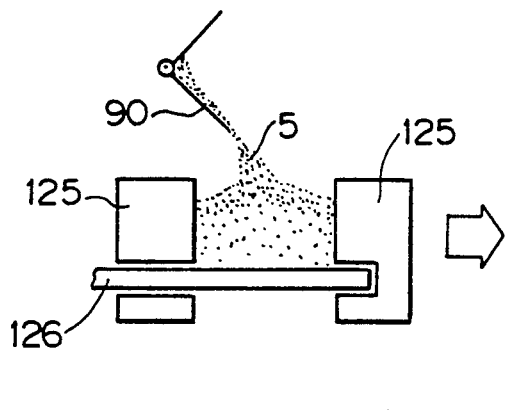
FIGS. 3(A) through (D) illustrate a preliminary compacting method of powder.
Figure 3B:
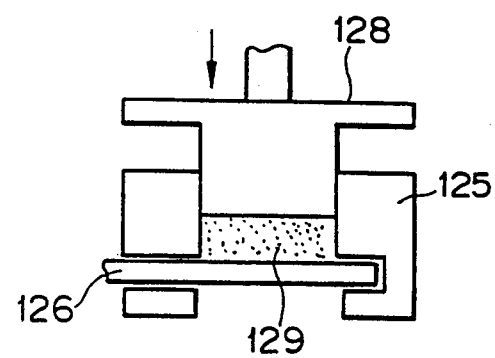
Figure 3C:
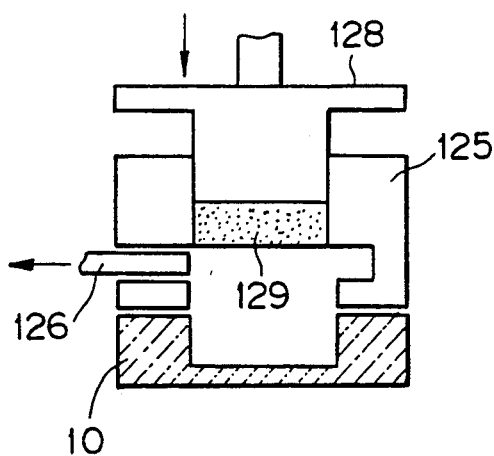
Figure 3D:
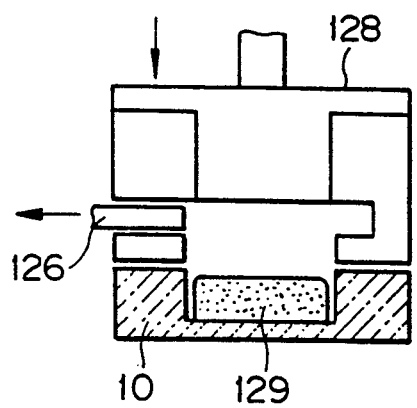

Pusher 121 forces down the powder 5 rising above the upper surface of the rubber mold 10, until the upper surface of the powder 5 is lowered to the same level as the upper surface of the rubber mold 10 (FIG. 2(C)). The pusher 121 and the guide frame 100 are then lifted above the rubber mold 10 (FIG. 2(D)).

In the present invention, not the (uncompacted) powder but the preliminarily compacted powder may be subjected to the compacting by a die-press machine. The preliminary compacting to a high density is carried out by using a pressing device, such as a die-press machine. The attained density of a preliminarily compacted powder is preferably from 25 to 50% in the case of rare-earth magnets and from 20 to 50% in the case of ferrite magnets.

Referring to FIG. 3, a precompacting device comprises a die 125, a die bottom 126 consisting of a movable bottom plate, and a punch 128. The powder 5, which has been preliminarily weighed, is naturally filled into the die cavity by means of flowing it down from the powder pan 90 (FIG. 3(A)). The powder 5 is then compacted under the pressure in the range of from 15 to 100 kg/cm² (FIG. 3(B)). The rubber mold 10 is then transferred beneath the pre-compacting device, the bottom 126 is pulled away from the die 125, and the punch 128 is further pushed down (FIG. 3(D)). The pre-compact 129 then falls down into the rubber mold 10. The pre-compact is preferably smaller than the inner dimension of the rubber mold 10, because the magnetic-field pulse can be effectively applied to the pre-compact 129.

The filling at high density as illustrated in FIGS. 2 and 3 is carried out outside a die press-machine because the rubber mold with filled powder can be immediately compacted, as soon as it is loaded in the machine, thereby enhancing productivity. A die (not shown in FIGS. 2 and 3) may be integrally connected with the rubber mold 10. In this case the die and the rubber mold 10 with the filled powder are set together in a die-press machine.

Figure 4:
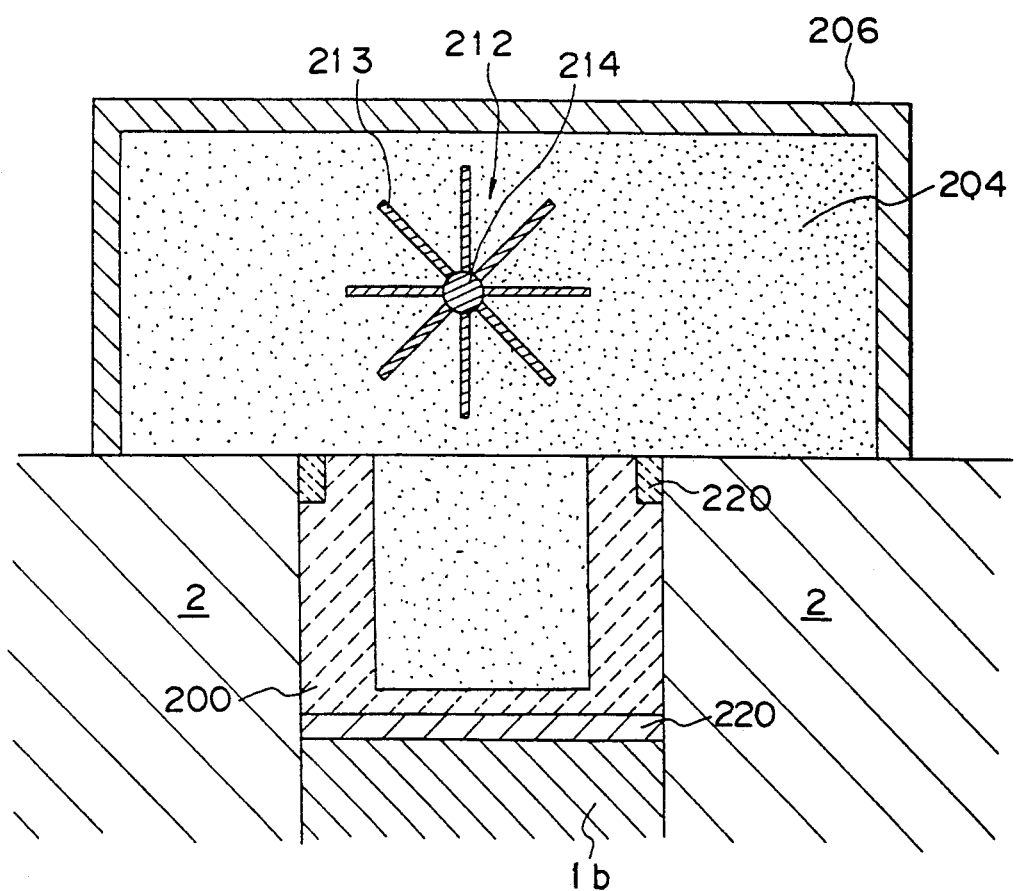
FIGS. 4 through 12 illustrate several embodiments of filling the powder at high density.

According to an embodiment of the method for filling illustrated in FIG. 4, a feeder box 206 is slidably located directly on the die 2. The powder 204 falls from the feeder box 206 into the rubber mold 200 via the open top of the rubber mold 200. During the dropping of the powder 204, it is stirred by the stirrer 213. The stirrer 213 consists of rotary blades 213 secured around a shaft, and is installed within the feeder box 206, thereby eliminating the bridging of the powder 204 stacking at the open top of the feeder box 206 and hence smoothly dropping such powder into the rubber mold 200.

Figure 5:
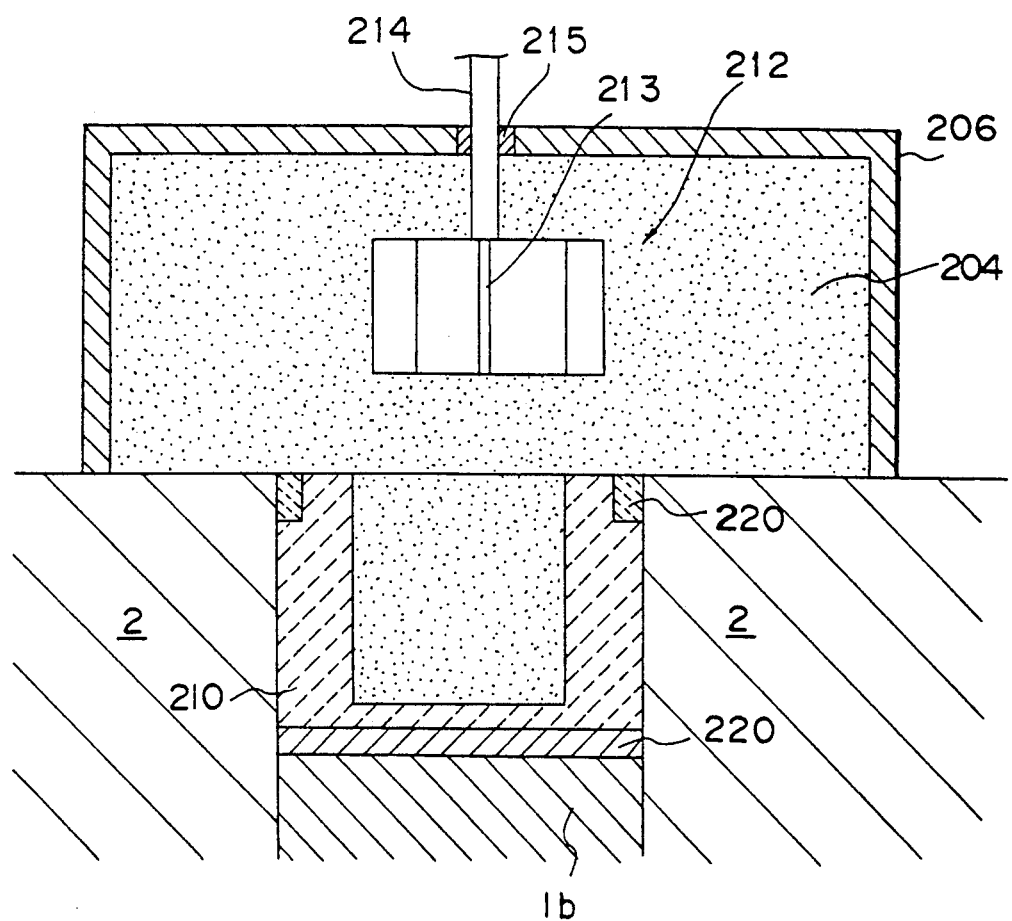

According to another embodiment illustrated in FIG. 5, the rotary blades 212 consist of blades 213 rotating around a horizontal plane. The 0-ring 215 is fitted on the top part of the feeder box 206 and clearance between the shaft 215 and the feeder box 206 is gas-tightly sealed.

Figure 6A:
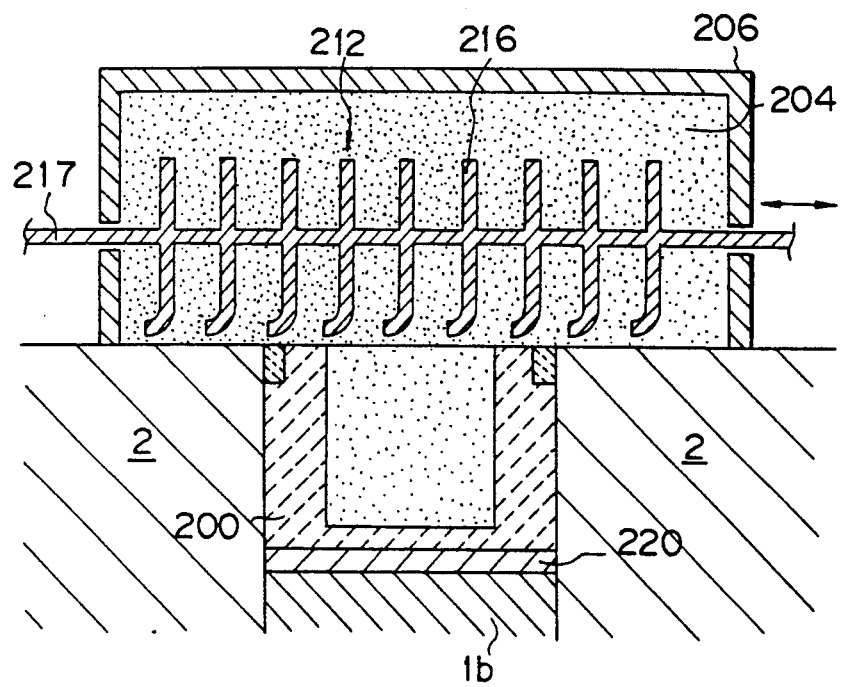
Figure 6B:
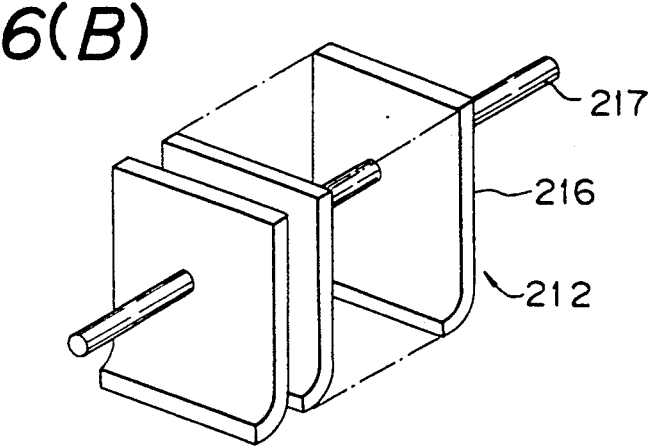
Figure 6C:
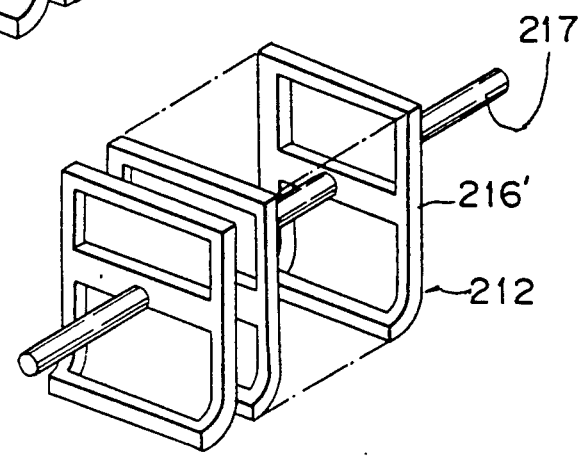

FIG. 6 illustrates another embodiment of the feeding method with the same reference numerals for the parts which are the same as shown in FIG. 4. The stirrer 212 consists of the blades 216 and pusher rod 217 which is secured to the blades, so that the wide surfaces of the blades 216 can move horizontally along the longitudinal direction of the feeder box 206. The bottom edges of the blades 216 are curved to enhance the stirring efficiency. When each blade 216 passes over the die cavity of the rubber mold 200, the powder 204 is forced downwards by the vertical component of the force applied from the blade to the powder 204. The blades 216 may not only consist of plates as shown in FIG. 6(B) but may consist of frames 216' as shown in FIG. 6(C) or consist of rotary blades (not shown).

Figure 7:
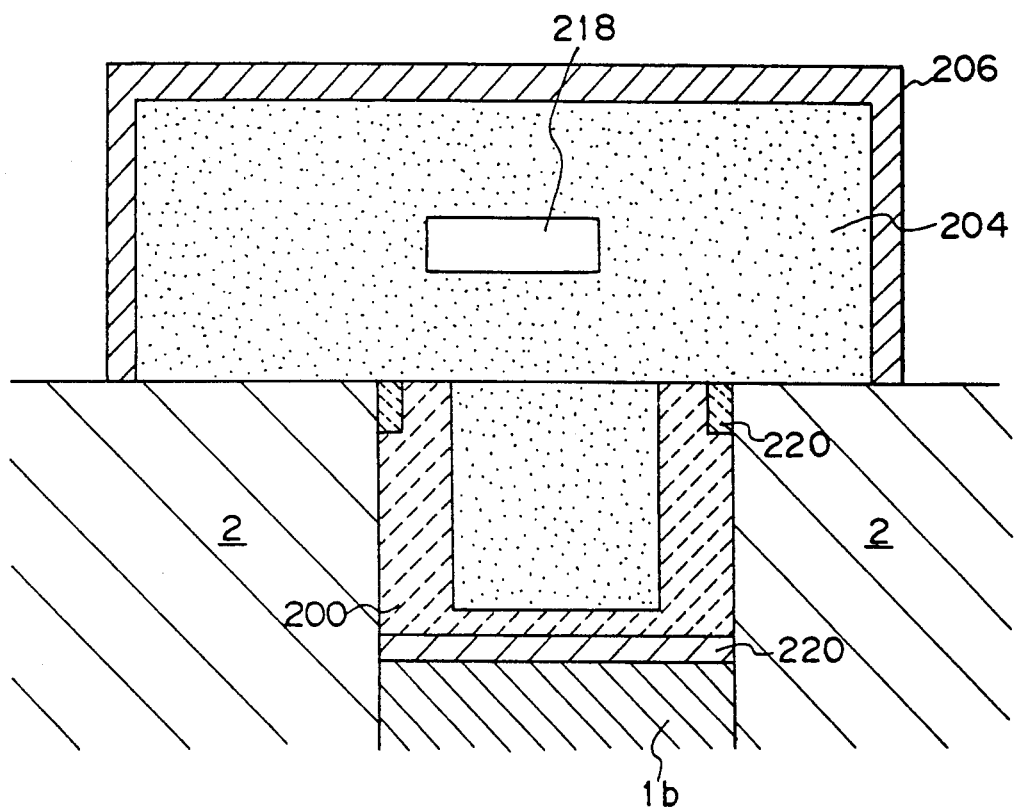

FIG. 7 illustrates an embodiment in which instead of the stirrer as shown in FIG. 4 through 6, a vibrator 218 is installed within the feeder box 204 so as to apply directly the vibration to the powder 204. The vibrator 218 may be attached to the outer surface of the feeder box 206 so as to vibrate the feeder box 206 and then indirectly the powder 204.

Figure 8:
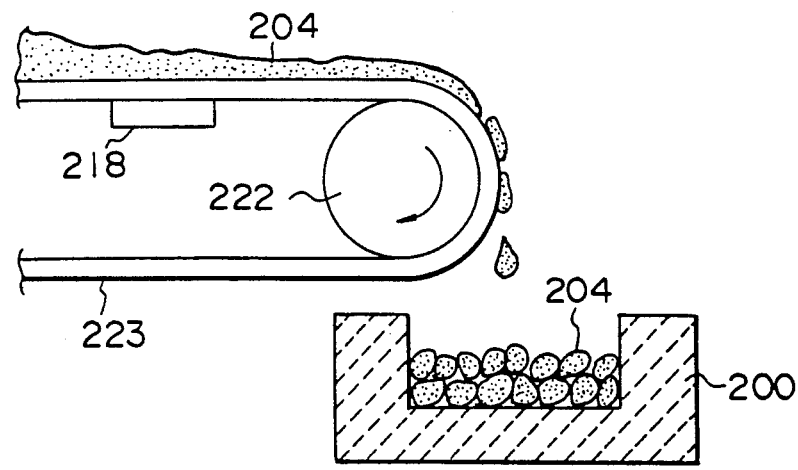

Referring to an embodiment illustrated in FIG. 8, the powder 204 is fed on the upper side of the conveyor 223 wound around the wheels 222 and is then converted to the layer along with the circulating movement of the conveyor 223. A vibrator 218 is brought into contact with the lower side of the conveyor 223 and imparts the vibration to the powder 204 being conveyed, thus enhancing its density. The powder having high density is dropped from the end of the conveyor 223.

Figure 9:
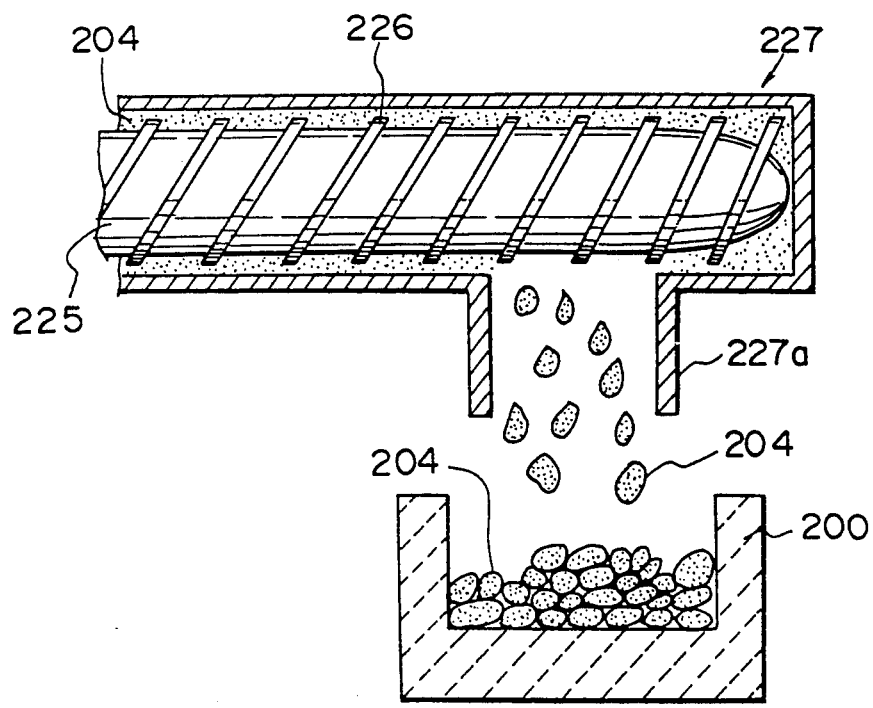

Referring to an embodiment illustrated in FIG. 9, a screw rod 225, around which blades 226 are spirally secured, is mounted coaxially in the container 227. When the screw rod 225 is rotated anti-clockwise, the powder 204 is stirred in the container 227, caught between the blades 226 and fed into the direction of the outlet 227a of the container 227. Since the flowability of the magnet powder is poor and, further, the friction between the powder particles and between the powder and inner wall of the container is great, the powder moves more slowly than the rotation of the blades 226. The powder far behind each blade moves more rapidly than the powder directly behind each blade, forcing it to push into the latter powder due to the rotation of blades. The powder is pressed also due to the principle of reaction which is in opposite direction to the movement of the powder. In the embodiment shown in FIG. 9, the density of the powder is enhanced due to both the stirring and the principle of reaction.

Figure 10:
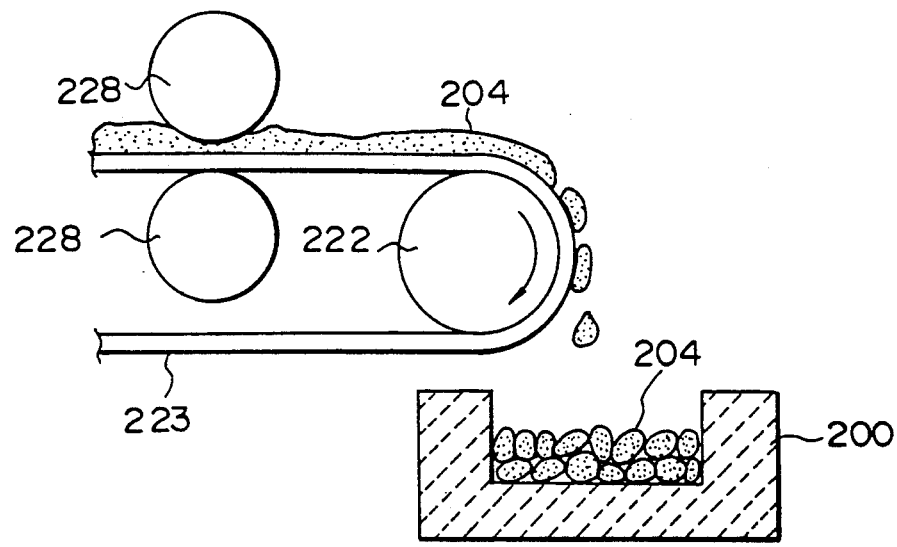

Referring to FIG. 10, the parts which are the same as those shown in FIG. 8 are denoted with the same reference numerals. The powder 204 is pressed between a pair of rolls 228 to enhance its density, and is then dropped into the rubber mold 200.

Although not shown in the drawings, the powder may be pressed in a metal die or by rolls to form a compact in the form of a sheet, which is then crushed to form granules. Such granules may be filled in the rubber mold.

The powder subjected to the processes as illustrated in FIGS. 4 through 10, may be preliminarily subjected to degassing so as to enhance density.

Figure 11:
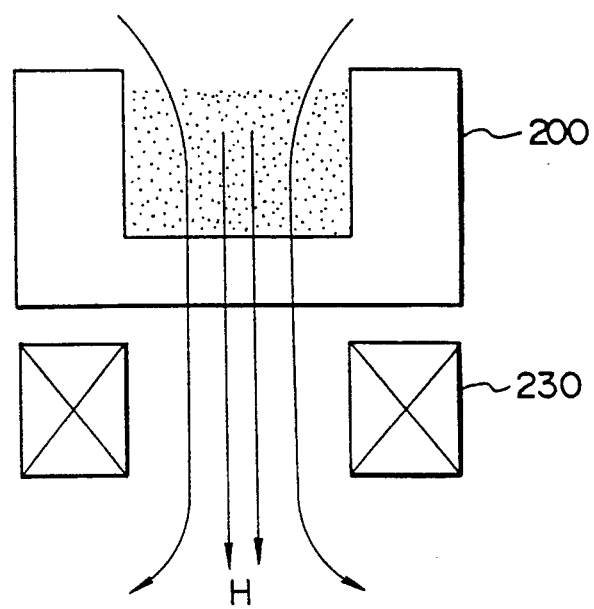

According to an embodiment illustrated in FIG. 11, the powder is filled under gravity as well as magnetic field generated by the electromagnetic coils 230. The magnetic field having an intensity of preferably from 0.1 to 1T attracts the powder into the bottom of the rubber mold 200 to enhance the density.

Figure 12:
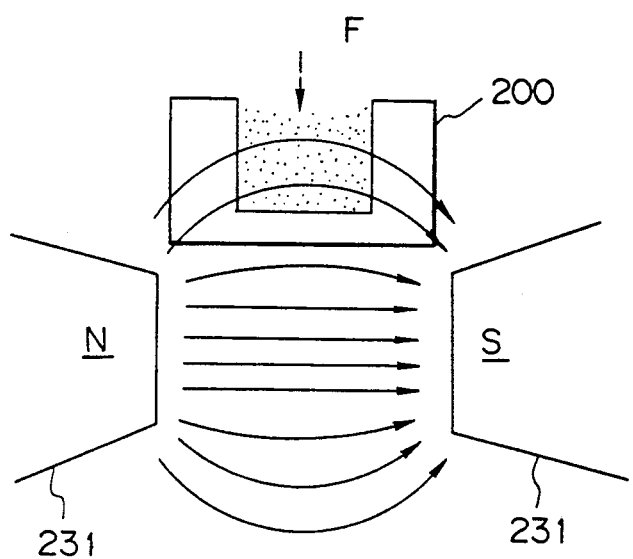

According to an embodiment illustrated in FIG. 12, the electromagnets 231 are placed beneath the rubber mold 200 so as to generate the gradient magnetic field in the rubber mold 200 and hence the force F in a direction perpendicular to the gradient, attracting the powder into the bottom of the rubber mold 200. Instead of the electromagnets 231, permanent magnets generating a flux of intensity from 0.1 to 3T may be used.

Figure 13:
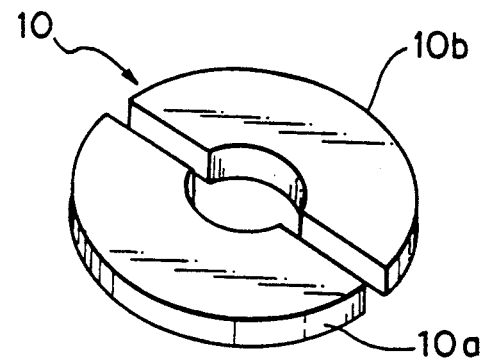
FIGS. 13 through 15 illustrate embodiments of a rubber mold.
Figure 14:
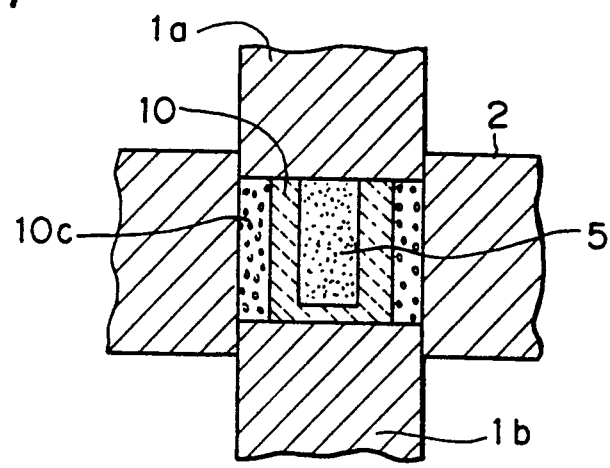
Figure 15:
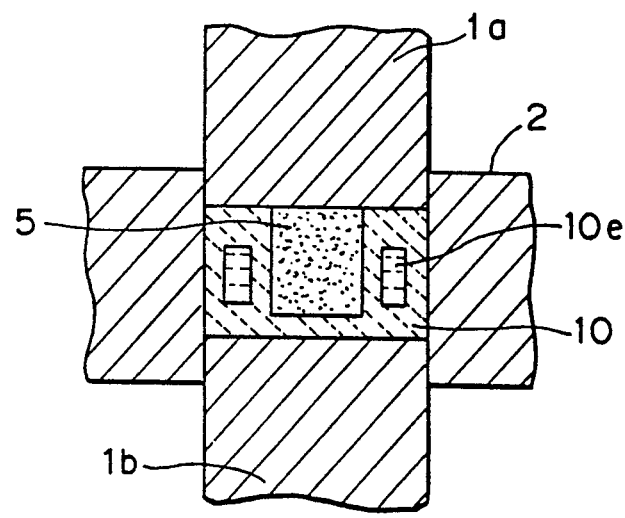

The rubber mold must be a continuous body or comprise continuously connected sections. In the latter case, the rubber mold may be a separable type as shown in FIG. 13, although the friction at the partition surfaces of the mold-sections 10a, 10b is not favorable. Furthermore, as shown in FIG. 14, portions 10c of a rubber mold 10 not in direct contact with the powder 5 may consist of granular, liquid, gel or powdery rubber, although such a structure of the rubber mold 10 is unfavorably complicated. The punches and the die of a die-press machine are denoted in FIG. 14 by reference numerals 1a, 1b and 2, respectively. Referring to FIG. 15, water, oil, or liquid rubber is filled in the die cavity 10e formed within the rubber mold 10. This would contribute to creating a compacting force as uniform as possible which is applied to the powder 5.

Figure 16:
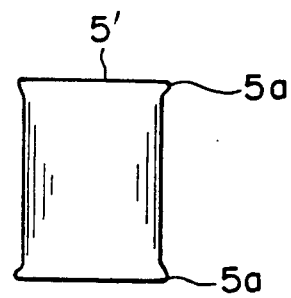
FIG. 16 illustrates a defect, the so-called "elephant leg" of the green compact.
Figure 17:
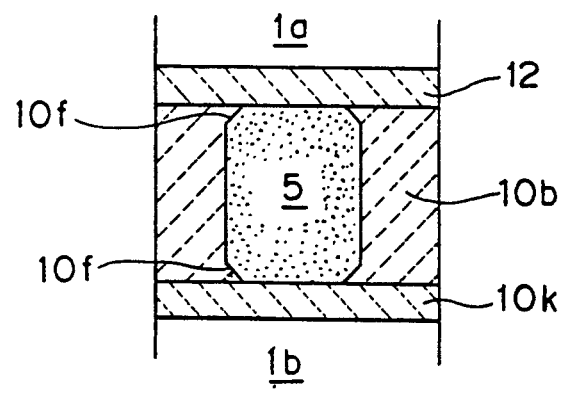
FIGS. 17 through 23 illustrate embodiments of a rubber mold.

Referring to FIG. 17, the cylindrical side portion 10b of the rubber mold 10b is tapered (10f) at the inner, upper and lower edges. This taper 10f is preferable for preventing the elephant legs 5a, 5b shown in FIG. 16 from occurring. The cover and bottom of the rubber mold are denoted by 12 and 10k, respectively. Instead of the taper 10f, a curved edge may be formed to prevent a crack of green compact on the edge.

In the production of the most ordinary, disc type anisotropic magnet, a rubber mold located in the die cavity is in contact with the inner peripheral wall of the die. The compacting force of a punch is converted by the rubber mold to a radial compacting force directed inwards. The rubber mold must smoothly slide on the inner peripheral wall of the die and be thoroughly compacted in order to generate strong compacting force. It is therefore preferable to apply a lubricant or anti-abrasive material between the rubber mold and die.

The lubricant, such as BN (boron nitride), may be applied on the inner wall of the rubber mold to lessen the adherence of the powder on the rubber and hence to prevent the cracks in a green compact due to the adherence. In addition, a thin rubber film may cover the inner surface of the rubber mold. This rubber film relieves inner stress of a green compact which is generated when a punch is lifted up and which may cause cracks in a green compact.

The static magnetic field is applied to the green compact of magnet powder being compacted and is in the range of from 8 to 12 kOe, as in the conventional method. After the compacting step under magnetic field, demagnetization is carried out as in the conventional method.

Preferred compacting conditions are now described by using the following parameters.

Compacting ratio $A_1$: compacting ratio of powder in the direction perpendicular to the moving direction of a punch(es), i.e., the decrease in the cross-sectional area of green compact due to compacting divided by the cross-sectional area of the green compact before deformation by the punch.

Compacting ratio $S_0$: compacting ratio in the moving direction of a punch(es), i.e., the dimensional decrease in the moving direction of a punch(es) divided by the dimension of powder before deformation by the punch(es). The dimension in this context is the average dimension in the direction of punch motion.

(1) Axial Die-Pressing

Preferably $0 < A_1 \leq 6S_0$, more preferably $0.4S_0 A_1 \leq 4S_0$, most preferably $S_0 < A_1 \leq 3.6S_0$.

When $A_1$ is virtually zero, the magnetic properties are not at all improved. $0 < A_1 < 0.4S_0$ is such a range that the magnetic properties are not improved outstandingly but an ultra-thin green compact or a green compact having an irregular shape can be produced. The magnetic properties are outstandingly improved at $0.4S_0 < A_1$, preferably $4S_0 < A_1$. However, at $A_1 > 6S_0$, the compacting pressure becomes impractically high.

Theoretically, the compacting condition $0 < A_1$ is always fulfilled, provided that the thickness of the rubber mold in the moving direction of a punch(es) is not zero but a finite value. However, if such thickness is very small, the rubber mold buckles and cannot shape the green compact during the pressing. The thickness of the rubber mold in the moving direction of a punch(es) should therefore be selected appropriately considering the elastic ratio of rubber so as not to incur buckling and to realize the preferable $A_1$.

(2) Perpendicular Die-Pressing $0 < A_1 \leq 4S_0$, more preferably $0 < A_1 \leq 3S_0$, most preferably $0 < A_1 \leq 2.4S_0$.

Since a clearance is formed between the rubber mold and a compact in perpendicular die-pressing, the friction between the green compact and the rubber mold is small when the green compact is removed from the rubber mold. It is therefore possible to produce an irregular-shaped compact or an ultra-thin compact, whose production is impossible by conventional die-pressing. Similarly, as in the axial die-pressing, thickness of a rubber mold should be selected so as not to cause buckling of the rubber mold and to attain such a preferable value of $A_1$ as not to increase the required pressing pressure to an excessively great value.

The preferable value of $A_1$ for obtaining outstanding improvement of the magnetic properties is lower than that of the axial die-pressing.

The pressure applied through a punch(es) is preferably in a range of from 50 to 5000 kg/cm$^2$, more preferably in a range of from 100 to 1000 kg/cm$^2$. These ranges partially overlap with those of the conventional die-pressing. But their low level is lower than the conventional ranges because of entire circumference of the powder is compacted due to the use of a rubber mold, which easily promotes densifying of a green compact.

The size of magnet is not at all limited. The magnet may range from an ultra-small-sized one, such as the rotor magnet of a wrist-watch and the rotor of an electronic cylinder lock, to a small-sized magnet, such as an ultra-thin magnet used in an OA (Office Automation) machine, a stepping motor-magnet, the direct-current motor of a video camera, and the actuator of a robot, and to a large-sized magnet used in an MRI (magnetic resonance image) apparatus.

Figure 18:
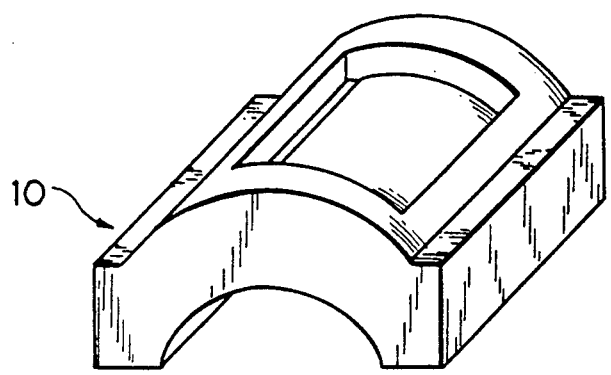
Figure 19:
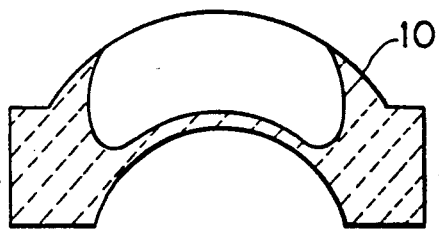

An arc-shaped segment magnet can also be produced by the method of the present invention as is illustrated in FIGS. 18 and 19, which show an elevational view and a cross-sectional view of a rubber mold. The upper and lower punches (not shown) have the same concave and convex surfaces as the upper and lower surfaces of the arc-shaped green compact, respectively.

Figure 20:
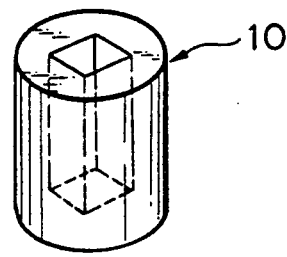
Figure 21:
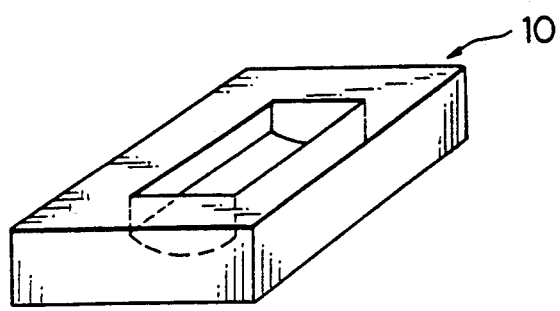

A prismoid can be produced by using a rubber mold 10 shown in FIG. 20. A rectangular compact having an arc-shaped top surface can be produced by using a rubber mold 10 shown in FIG. 21. A frustum of pyramid can be produced by using a rubber mold 10 shown in FIG. 22. A green compact having a flat sheet-shape with a groove through the center can be produced by using a rubber mold 10 shown in FIG. 23.

A rubber mold for producing a green compact having a complicated shape can be designed by computer simulation for shaping such a complicated shape while using the dimension data of green compacts which are produced by using rubber molds with a similar but simpler shape than the complicated shape.

The following described method, which is a simple designing method, enables to estimate the approximate shape of a rubber mold when a green compact has a simple shape and the outer shapes of the green compact and the rubber mold are the same.

The simplified designing of a rubber mold is based on these premises: the volume of the rubber mold is unchanged before and after the compression (premise 1); and the ratio of apparent density of uncompacted magnetic powder to the apparent density of a green compact is constant (premise 2).

Figure 24:
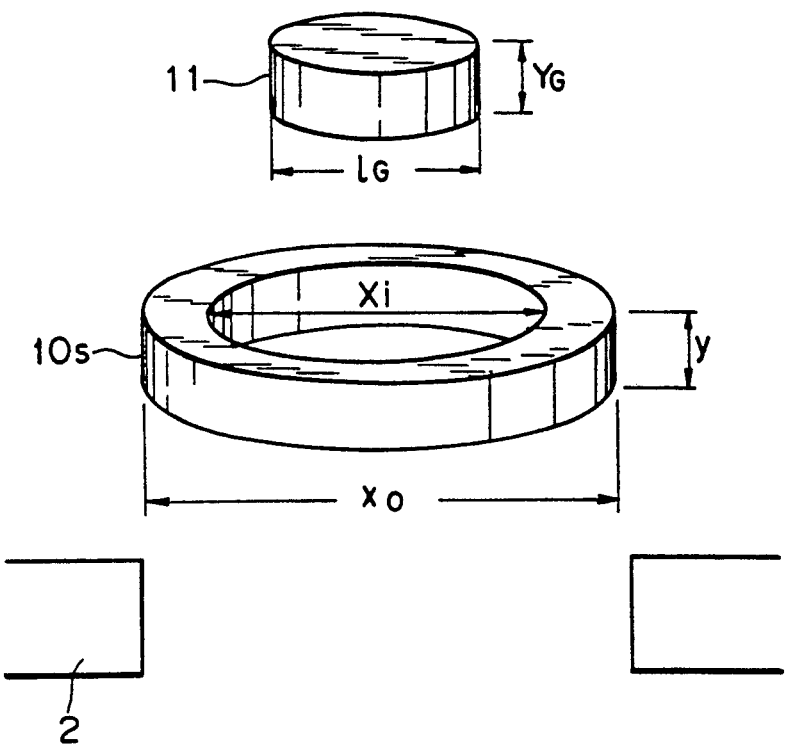
FIG. 24 illustrates dimensions of a rubber mold.

When a rubber mold 10 consists of an annular mold 10s and is used for shaping a disc-shaped green compact 11 as is shown in FIG. 24, the following formula exists according to premise 1.

$$y\pi\{(x_0/2)^2 - (x_1/2)^2\} = Y_G\pi\{(x_0/2)^2 - (1_G/2)^2\} \qquad (1)$$

Premise 2 is realized for the dry and ungranulated ferrite-powder to be approximately 1.9:1. The following equation is therefore obtained.

$$y\pi(x_1/2)^2 \cdot Y_G(1_G/2)^2 = 9:1 \qquad (2)$$

The approximate dimension of the side portion 10s of a rubber mold can be designed based on the above two equations. The design and trial production are repeated several times, so as to modify the dimension of the side portion 10s in order to allow easy removal of the green compact from the rubber mold, and to enhance dimension accuracy of the green compact. In this modification, deformation of the rubber mold and hardness of the rubber are also taken into consideration.

The die-press machine used in the present invention may be a hydraulic or a mechanical one. All types of die-press machines from a small-sized manual one to an automatic type can be used in the present invention. Preferred die-press machines are a twin-punch type machine, in which the upper and lower cylinders move and compact simultaneously, or a die-float type machine and a withdrawal type machine, in which only one of the upper or lower cylinders moves but the die moves synchronously to the movement of the cylinder.

Preferred Embodiments of First Method

The orientation of a magnet, which is generally defined by $Br/4\pi Is$ (Br -residual flux density, $4\pi Is$ -saturation flux density), is improved by the first method as described above.

Now, a preferred embodiment of the first method is described. When the magnet powder is filled in a rubber mold at a considerably high density, particularly 29% or more, the friction force between the powder particles is greater as the filled density is higher. It is therefore difficult to provide by the static field amounting to 8 to 12 kOe used in the ordinary die-pressing under magnetic field a satisfactory rotational force for overcoming the friction of the powder particles and hence to orient the powder particles. The orientation of magnet powder tends therefore to be lowered. According to a preferred embodiment of the first method, an instantaneous magnetic field is applied to the magnet powder in the rubber mold prior to the die-pressing in magnetic field. Alternatively, a stronger static field than that of the die-pressing under magnetic field is applied to the magnetic powder in the rubber mold, prior to die-pressing under magnetic field. The preliminarily applied magnetic field generates a rotational force which is sufficient for reorientation of the magnet powder. The magnet powder filled in a rubber mold is set in a die-press machine and is magnetized under pulse or static field. Extremely high orientation is attained by this magnetization with good reproducibility, notwithstanding an extremely high filling density as high as 29% or more.

Rotational force preferably imparts impact to the magnetic powder being preliminarily magnetized, so as to enhance the orientation degree thereof. The magnetic field having intensity of from 5 to 10 kOe, particularly 10 kOe or more, more particularly 15 kOe or more, is imparted to the magnet powder at least once, preferably twice or more. The intensity of pulse magnetic field must change greatly at the initial stage. When the specified intensity of the magnetic field is attained, it may keep a constant value or may decrease gradually.

If the magnet powder is filled in a rubber mold at very high density, there are local differences in density of the powder in the mold. If such powder is compacted without preliminary application of magnetic field, locally non-uniform deformation of a compact may occur. If a green compact has such a shape that cracks are liable to occur, the local difference in the density easily cause cracks and crazing of the green compact or deformation of the sintered compact. The deformed sintered compact must be machined at a great machining cost. The above-described drawbacks resulting from the very high density can be solved by the preliminary application of the magnetic field to the magnet powder, because the agglomerated powder particies are disintegrated and uniformized thereby.

The preliminary compact can also be treated by the preliminary application of the magnetic field as described above and can advantageously attain very high density without causing cracks or the like in a green compact.

Figure 25:
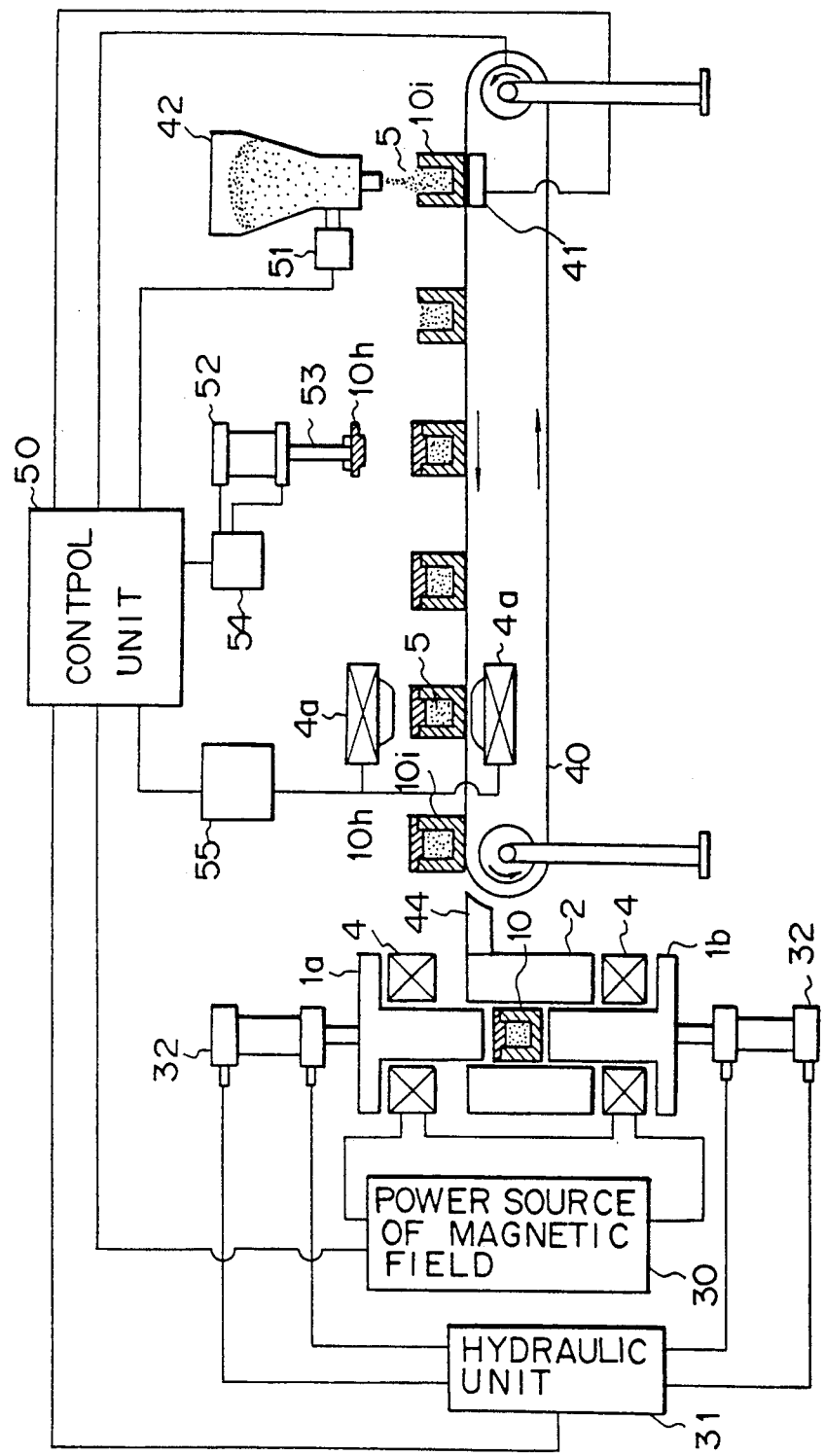
FIG. 25 illustrates a dry die-press apparatus.

FIG. 25 illustrates an apparatus for preliminary application of magnetic field and die-pressing under mangetic field. The right part of the drawing illustrates a line for filling the magnet powder in a rubber mold and loading it in a die-press machine. The electro-magnetic coil, which generates pulse, and disintegrates and orients the agglomerated powder particles outside the die-press machine, is denoted by reference numeral 4a. The conveyor is denoted by 40. The vibrator 41 is in slidable contact with the conveyor 40 at its rear surface. The vibrator may be in slidable contact with the conveyor 40 at its side surface. The feeder 42 feeds magnetic powder into a rubber mold 10i provided with a bottom (hereinafter referred to as "the rubber mold 10i"). The feeding is carried out by pouring the powder 5 when the conveyor 40 stops. Simultaneously with the feeding of the powder, the rubber mold 10i is shaken by the vibrator 41 to enhance the filling density of the powder. When the conveyor 40 rotates in the direction shown by the arrow, the rubber mold 10i is moved upto the position where a cover 10h is attached, where the conveyor 40 again stops. A piston rod 53 driven by the hydraulic cylinder 52 is pushed down to tightly insert the cover 10h into the rubber mold 10. The conveyor 40 then again rotates to move the rubber mold 10i provided with the cover 10h (hereinafter referred to as "the rubber mold 10h,i") to an intermediate position between the magnetic field coils 4a, 4a, which then impart the magnetic field-pulse to the powder 5. A pusher (not shown) pushes the rubber mold 10h,i, in which the oriented magnet-powder is contained, so that it slides on the conveyor 40 and the table 44, which is located on the same level as the upper portion of a die 2, toward the die 2. The time necessary for the above-described series of movements is as follows.

(a) Pouring from the feeder 42: 0.5–30 seconds
(b) Vibration: 1–30 seconds
(c) Rotation of the conveyor (from the feeder 42 to the hydraulic cylinder 52): 1–10 seconds
(d) Inserting of a cover 10h: 1–30 seconds
(e) Rotation of the conveyor (from the hydraulic cylinder 52 to the position of the magnetic coils 4a, 4a): 1–10 seconds
(f) Imparting of the magnetic-field pulse: 1–10 seconds
(g) Rotation of the conveyor (from the position of the magnetic coils 4a, 4a to the die 2): 1–10 seconds The control unit 50 controls the time-sequence and duration of the above-mentioned series of operations (a)

through (g). More specifically, the control unit 50 generates such a command that: the conveyor 40 does not rotate during the operations (a), (b), (c) and (d); and, further, these operations are initiated when the conveyor 40 stops. In addition, operations (c), (e) and (g) must occur synchronously with each other. Since operation (f) can be the shortest and operation (b) can be the longest in the above-described case, the conveyor rotation according to (c) does not begin even if (b) is completed, until completion of (f). The control unit 50 also commands such holding and starting of the operations as described above.

The control unit 50 also commands the rotation of a motor 51 for rotating a screw rod (not shown) in the feeder. When the screw rod rotates at a specified revolution per minute, the powder is caught between the clearances of the screw and is fed into the rubber mold 10i in an amount which is specified by the total revolution of screw. The control unit 50 specifies the power, and energization-sequence and time of the power source 55 for applying the magnetic-field pulse to the powder.

Upon transmitting the end signal of the powder feeding from the motor 51, this signal is input in the control unit 50. One of the conditions for moving the conveyor is thus fulfilled. Upon inputting the end signals from operations 41, 54 and 55 to the control unit 50, all of the conditions for moving the conveyor are fulfilled. The conveyor 40 moves in the direction of the arrow for a specified distance and then stops.

The conveyor 40 may consist of a plurality of metal chains or belts arranged successively in the conveying direction. An electro-magnetic switch or a dielectric sensor is provided at each clearance between the metal chains or the like. When the electro-magnetic switch or the like detects mechanically or physically a rubber mold 10h,i, the signal is generated from the electromagnetic switch or the like to stop the conveyor 40. The rubber molds 10h, i can be accurately stopped at a specified position.

After die-pressing, the rubber mold 10h, i is lifted up by means of the lower punch lb and is then transferred away from the die-press machine in a direction perpendicular to the drawing.

Preferred Embodiments of Fourth Method

The fine powder of ordinary materials has preferably average particle diameter of 50 $\mu$m or less, more preferably 30 $\mu$m or less, furthermore preferably 20 $\mu$m or less. The obtained sintered green compact can have a density of 95% or more based on the true theoretical density of the ordinary materials. The ordinary materials do not include magnet powder but may be such metals as Fe, Co, Ni, Cu, Mo, Al, Mg and Ti, and their alloys as well as compounds such as TiC and WC. The Fe or Fe based fine powder is prepared in most cases by atomizing the material with water or inert gas, and is occasionally provided in the form of carbonyl iron. The Al or Al-based fine powder is prepared by gas-atomizing or melt-quenching. The Ti or Ti-based fine powder is prepared in most cases by repeated hydrogen adsorption and dehydrogenation. Mechanically milled fine powder may also be used. Such hard fine-powders as Fe-Co and Ti alloy-powder, whose compactibility is poor, can advantageously be compacted by the fourth method without adding a binder or lubricant. In addition, since the rubber mold prevents the direct contact of the fine powder with a die, the fine powder is not seized by the die. As a result, the lubricant need not be used at all. However, the binder in an amount of 1% by weight or less can be used, provided that the remaining carbon does not exert a detrimental influence upon the properties of a sintered compact.

When the fine powder is filled in a rubber mold under gravity, the difference in the density of the filled powder locally varies. In addition, the green compact may crack as is described with reference to FIGS. 1(A) through (C). It is therefore necessary to fill the fine powder at a high density, i.e., at least 1.15 times the natural density described with reference to FIG. 2(A). The filling density is preferably 1.3 times when the green compact has an elongated shape or great unevennesses. When the fine powder is filled in a rubber mold, it should not be so seriously deformed that a desired shape of green compact is not obtained. This may occur at an extremely high-density filling, for example more than 60% of the true density.

Figure 52:
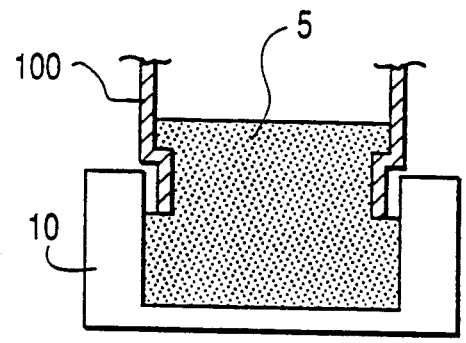
FIG. 52 is a drawing of a guide frame.

As is shown in FIG. 52, the bottom of the guide frame 100 may have such a shape that it is virtually coincident with the top shape of the rubber mold 10. The top of the guide frame 100 may be somewhat expanded to facilitate the powder feeding.

When a conventional shaker-type feeder is used for feeding the fine powder into a rubber mold through a guide frame, the filled weight of fine powder greatly varies because of its poor flowability. It is therefore preferred to preliminarily weigh the fine powder to provide a predetermined weight and then charge the fine powder thus weighed into a rubber mold. In this embodiment, the unit weight of green compacts can be controlled very accurately. In addition, when such green compacts are sintered, the shrinkage ratio is constant, because the fine powder exhibits a constant shrinkage ratio. The green compacts having net shape can therefore be stably produced.

Figure 53:
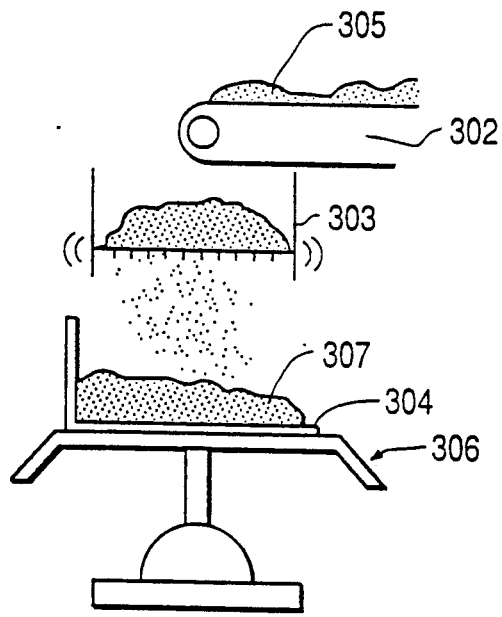
FIG. 53 illustrates a method for weighing the powder.

Referring to the method illustrated in FIG. 53, the fine powder 5 is conveyed by the conveyor 302 and is fallen from the conveyor 302 onto the vibrating mesh 303. The agglomerated particles of the fine powder 305 are disintegrated by the vibrating mesh 303 and therefore do not fall in the form of lumps. The weighing instrument 306, positioned below the vibrating mesh 303, is provided with a container 304 which receives the fine powder 305. The weight of the fine powder 305 stacked on the container 304 is monitored to collect a predetermined amount of the fine powder 5.

During a stopping period of the vibrating mesh 305, the fine powder 5 virtually does not fall through the vibrating mesh 305. It is therefore possible by means of repeating ON and OFF of the vibration of the vibrating mesh 305 to very accurately control the dropping amount of the fine powder 5 into the container 304. Instead of measuring the weight, the volume of the fine powder may be measured. In addition, instead of the container 304, a rubber mold or a rubber mold provided with a guide frame may be located on the weighing instrument so as to weigh and fill the fine powder.

Figure 54:
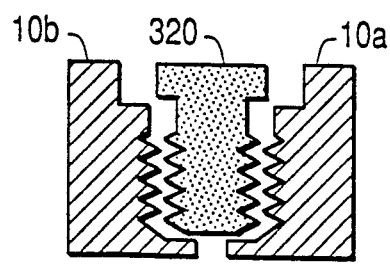
FIG. 54 is a drawing of a rubber mold for forming a screw.

When the load from a punch(es) is relieved, a rubber mold restores its shape. The green compact can therefore be removd from the rubber mold. However, when the filling density of the fine powder in a rubber mold is very high, or when the green compact is somewhat uneven, the clearance between the green compact and the die may not be sufficient enabling the removal of a green compact. In order to enable the withdrawal of a green compact in such cases as above, a rubber mold may consists of separated side parts 10a, 10b as shown in FIG. 54. Two or more parts of a rubber mold 10 may be divided when removing a green compact 320 from a rubber mold 10. Furthermore, the rubber mold 10 may have a cut plane 311 at a portion of the side wall.

Figure 55A:
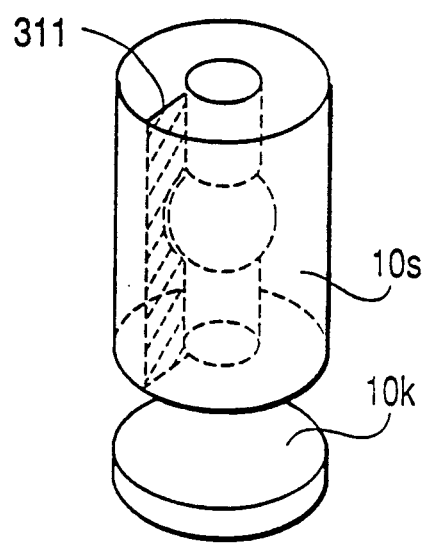
FIGS. 55(A) and (B) illustrate the rubber molds consisting of separable parts.
Figure 55B:
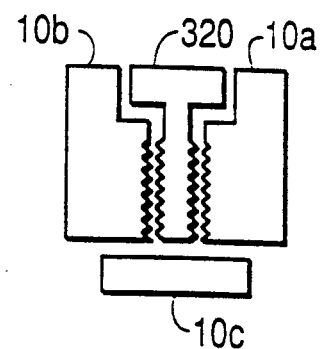

When a green compact is withdrawn from the rubber mold 10, it is enlarged at the cut plane 311 so as facilitate withdrawal. In addition, the side portions 10a, 10b and the bottom 10c may be divided from each other. It is however to be noted that the rubber molds shown in FIGS. 54 and 55 have the following disadvantages. The fine powder may be seized at the cut plane 311 or the divided parts of the molds. Furthermore, the rubber mold may be twisted during the compacting, resulting in non-uniform deformation of the green compact. The setting time of these rubber molds in a die is long.

In order to eliminate the disadvantages as described above, the clearance between the green compact and the die is preferably enlarged when the green compact is withdrawn from the rubber mold. The enlarging of the clearance can be carried out by means of applying pressure of, for example, gas to the inner surface of the rubber mold, and/or reducing the pressure of the outer surface of the rubber mold. By these measures, a pressure difference between the inner and outer surfaces of a rubber mold is created to enlarge the clearance.

Figure 56:
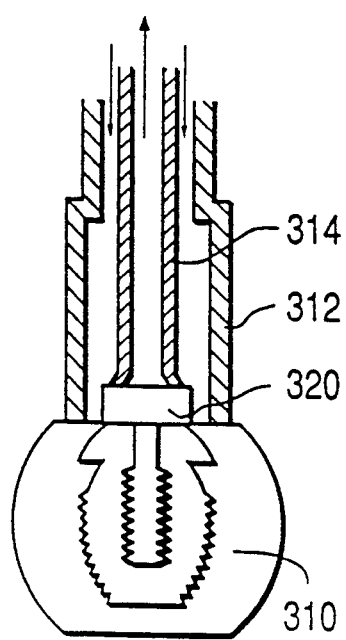
FIGS. 56 and 57 illustrate a method for expanding a rubber mold.

Referring to FIG. 56, a cylindrical cover 312 is rigidly attached to the top of a rubber mold 310 having bottom. The rubber mold 310 and the cylindrical cover 312 are sealed therebetween. Pressurized gas having pressure of from 1 to 5 atmosphere is admitted into the cylindrical cover 312 so as to expand the rubber mold. A suction pipe 314, which is protruded in the rubber mold 310, is lowered so that the front end of the suction pipe 310 is pressed against the top of the green compact 320. The green compact is then sucked by the suction pipe 314. When the green compact is a magnetic body, it may be attracted by an electro-magnet.

Figure 57:
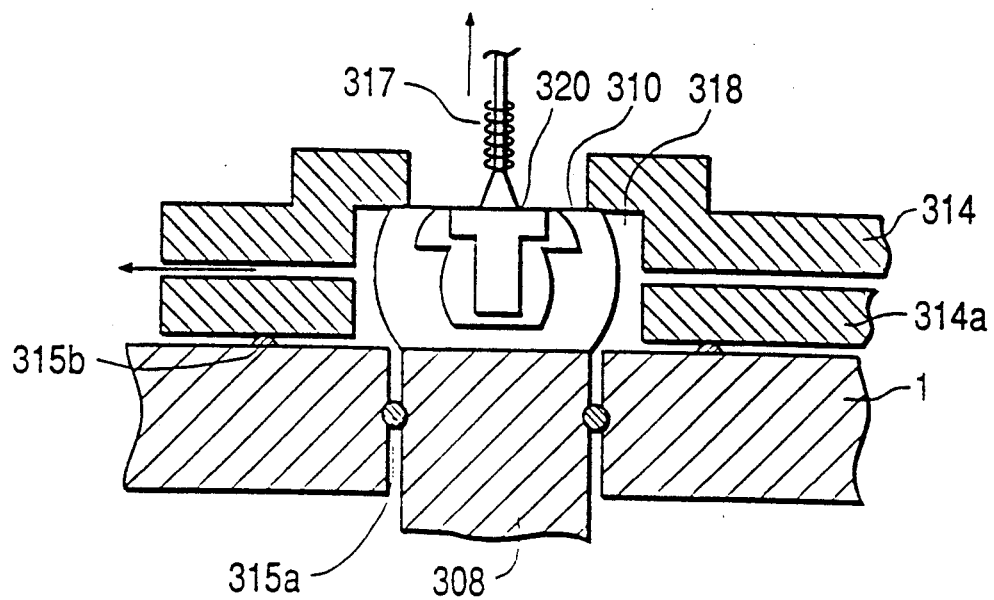

Referring to FIG. 57, the pressure applied to the outer surface of a rubber mold is reduced. A sealing cover 314 is pressed on the die I via the O rings 315b. The rubber mold 310 is pressed upwards on the sealing cover 314 by the lower punch 308. An O ring 308 is fitted around the lower punch 308 and between the lower punch 308 and the die 1. Therefore, when the gas is evacuated through the gas-evacuation channel 314a, the vacuum space 318 is created around the outer surface of the rubber mold 310. The rubber mold 310 therefore expands to enlarge the clearance between the rubber mold 310 and the green compact 320. The electromagnet 317 attracts then the green compact 310.

After die-pressing, a rubber mold may be turned upside down, and the clearance between a green compact and the rubber mold may be created to allow the green compact to fall out of the rubber mold.

The Second Method

In the second method, the preliminary application of amagnetic field is carried out as described hereinabove and the die-pressing of powder or precompact filled at a high density is carried out under no magnetic field. The apparatus for carrying out the second method is the one shown in FIG. 25, in which the magnetic coils 4 and power source 55 are omitted or modified so that they only generate a low magnetic field and demagnetize the green compact. This apparatus has a simple construction in the case the parts 4 and 55 are omitted. The efficiency is high because the magnetic field is not applied during the compacting in a die-press machine, thereby shortening the pressing time. The demagnetization may be omitted, when the remaining magnetization does not cause cracking and the like of a green compact. The omission is therefore determined taking the shape and dimension of the green compact into consideration. The feature "no field" in the second method means that no provision for orienting, such as a coil, is used, but also means that the powder may be exposed to unavoidable magnetic field, such as the leakage flux from a pulse-magnetic field generator adjacent to the die-press machine, or geomagnetism.

The preliminary application of a magnetic field causes the orientation of powder and enables, without application of magnetic field during die-pressing, to attain the magnetic properties of a green compact as good as in the conventional axial die-pressing. This may be sufficient for several applications. In the present invention, the compacting of powder in a direction perpendicular to the moving direction of a punch is realized and does not cause buckling of the powder particles, with the result that the preliminary orientation is not disordered by the movement of a punch. Contrary to this, when the die-pressing is carried out in the die-cavity without a rubber mold, the pressure of the punch is directed to the same direction as the orientation direction of the powder particles. In this case, buckling of the powder particles occurs, thereby disordering the orientation. In the present invention, the direction of the powder particles parallel to the moving direction of a punch is essentially maintained due to the effect of the rubber mold as described above. Incidentally, when the magnetic field is applied to the powder being compacted in a die-press machine (the first method), good orientation is stably obtained with very slight variance of the orientation.

The description hereinafter can be applied both to the first, second and fouth methods, unless otherwise mentioned.

Back-up Plate

The back-up plate is elastic material, which is harder than the rubber mold, and is located between the rubber mold and one or both of the upper and lower punch(es).

Referring to FIG. 26, several embodiments of the back-up plate are illustrated.

When a rubber mold 10 located in a die 2 is directly pressed by the punches 1a and 1b, the rubber plastically flows into the clearances between the die 2 and punches 2a, 2b (FIG. 26(A)), particularly when the rubber is soft. The rubber is therefore caught in the clearances. The withdrawing of the punches 1a, 1b from the die 2 therefore becomes difficult. In addition, the rubber mold 10 may be damaged. A back-up plate 12, which consists of harder elastic material than the rubber mold, is therefore located between the upper punch 1a and the rubber mold 10, and another back-up plate 12 is located between the lower punch 1b and the rubber mold 10. The back-up plates 12 are elastically deformed by the pressing by the punches 1a, 1b and seal the clearances between the punches 1a, 1b and die 2. A back-up plate 12 may be provided only between the upper punch 1a and the rubber mold 10. In addition, as shown in FIG. 26(C), a recess may be formed on the edge of each punch 1a, 1b to attach there an annular back-up plate 12. Furthermore, as shown in FIG. 26(D), the back-up plates 12 may be attached to the recesses formed around the edges of a rubber mold 10. When the pressing pressure is very high, the back-up plate is preferably chamfered on the edges which face the punch and die, to prevent plastic flow of the back-up plate in the clearance between the die and punch(es). The chamfered surface may be concave, convex, straight or "L" shaped.

Circulating Type Apparatus

Figure 28:
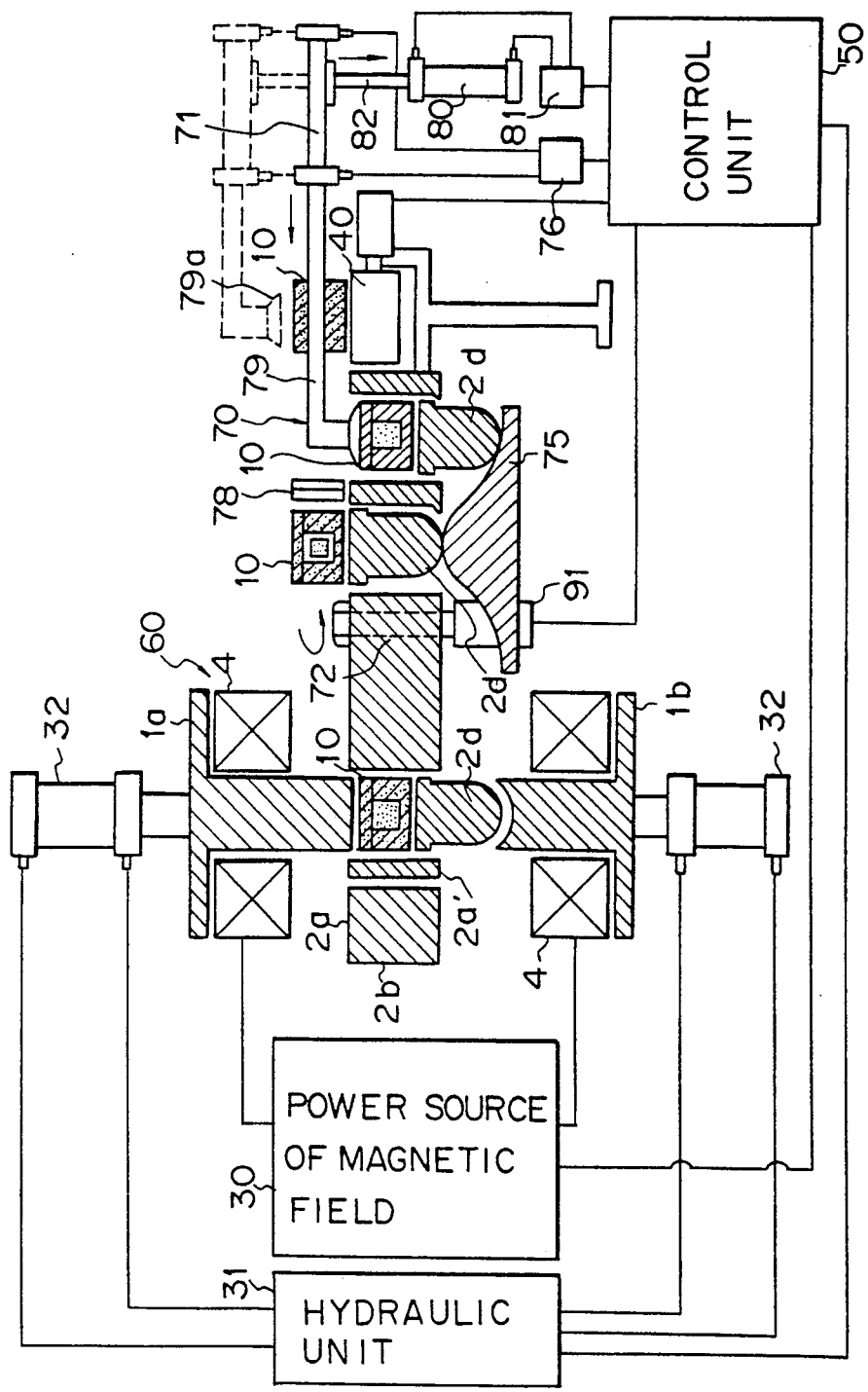
FIG. 28 is a partial cross sectional view of the apparatus shown in FIG. 27.

Referring to FIGS. 27 and 28, an embodiment of the apparatus according to the invention is illustrated by the top view and the side and partially cross-sectional view.

In this embodiment, the die is embodied as a rotary disc type-die with a plurality of cylindrical through-holes (hereinafter referred to as the "dies"). Only two through-holes are shown but there may be three or more. The motor 91 rotates the rotary die 2a so that the dies move around the circular passage. The upper and lower punches 1a, 1b are inserted into each die from above and below, respectively, at position $P_1$. The rubber mold 10s together with powder is filled into each die at position $p_2$, where the mold loader 70 is set. A rubber mold 10 containing a green compact is removed from the rotary die 2a at position $P_3$, where the removers 78, 84 are set. The rotary die 2a is rotated by the motor 91 so that each die passes through the positions $P_2$, $P_1$ and $P_3$, successively.

The rotary die 2a need not be totally made of expensive die steels but only at the contacting portions with the punches. Plastics, iron and the like can be used for the non-contacting portions so as to reduce the weight and cost of the rotary die 2a. The mold loader 70 is driven by two cylinders 71 and 80. The cylinder 70 reciprocates a hollow rod 79, on whose front end a suction piece is attached. A rubber mold 10 is loaded in the die 2 as shown in FIG. 28. The cylinder 70 is secured to the piston rod 82 of cylinder 80 and is therefore lifted or lowered as a whole by the cylinder 80. When the cylinder 70 is in a lifted position as shown by the dotted line, a rubber mold 10 is sucked by the suction piece above the conveyer. While the cylinder 70 steys in the lifted position, the piston 79 advances up to a position above the die 2. The cylinder 71 is then lowered to position the rubber mold 10 into the die 2. The hydraulic units 76 and 81 drive the cylinders 70 and 80, respectively.

While the rotary die 2a rotates, the stationary cam 75 guides the liftable bottom 2d which is inserted in the die 2. The movement of the liftable bottom 2d is determined by the upper surface-profile of the stationary cam 75 as illustrated in FIG. 29. First, during the die-pressing, the die is completely remote from the stationary cam 75 (FIG. 29(A)). The liftable bottom 2d then rides on the skirt portion of the stationary cam 75 (FIG. 29(B)) and further rises along the slanted surface (FIGS. 29(C) and (D)). When the liftable bottom 2d arrives at the flat top of the stationary cam 75, the rubber mold 10, in which a green compact has been compacted, arrives at the same level as the upper surface of the rotary die 2a. At this moment, the rubber mold 10 is in the position $P_3$ (FIG. 28). The liftable bottom 2d then lowers to open the die cavity, where uncompacted powder can again be loaded.

As shown in FIG. 27, a conveyor 40, whose end is in the vicinity of position $P_2$, conveys the rubber molds in which the powder is filled. A powder-feeder 42, a cover-mounting device 89 and a magnetic-pulse generator, e.g., the electromagnetic coils 4a, are provided at the different positions of the conveyor 40, as shown in FIG. 27.

A second conveyor 140 is provided at such a position that its end is in the vicinity of the position $P_3$. Along with the rotary movement of rotary disc 2a, the rubber molds 10 are guided along the removing plate 78 and slide on the stationary table 84, so that the rubber molds 10 are transferred to the second conveyor 140.

Powder-filling in Inert Atmosphere

Figure 30A:
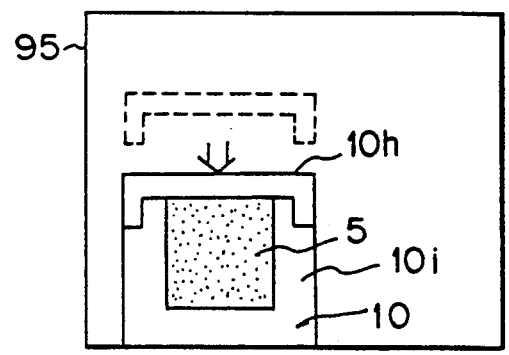
FIGS. 30 (A) through (C) illustrate a method of die-pressing the magnet powder in a rubber mold under inert-gas atmosphere.
Figure 30B:
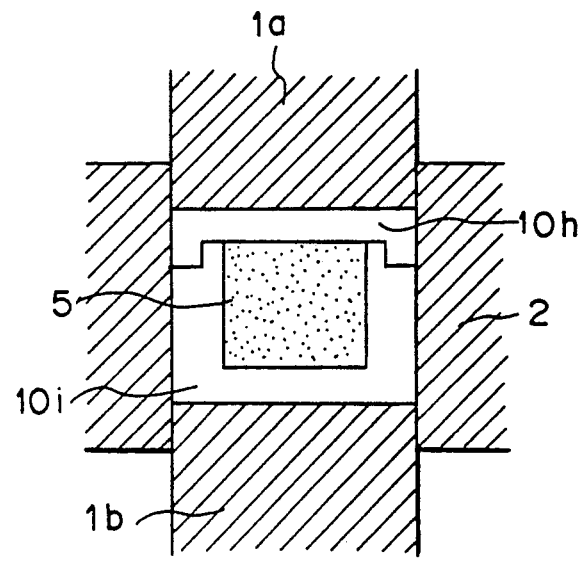
Figure 30C:
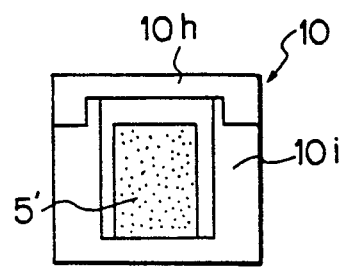

The powder of rare-earth magnets is preferably filled or loaded into a rubber mold in an inert atmosphere, thereby preventing oxidation of the powder during the filling or loading. In this embodiment, the methods illustrated in FIGS. 2 and 3 are carried out in chamber 95 (FIG. 30) filled with inert gas as shown in FIG. 30. A cover 10h is tightly fitted on the rubber mold 10 in the inert gas atmosphere. The rubber mold 10 is then set in a die-press machine as shown in FIG. 36(B). After die-pressing, the rubber mold 10 is removed from the die-press machine as shown in FIG. 30(C). The method illustrated in FIG. 30 is advantageously applied for rare-earth alloy powders crushed by a jet mill and in a non-oxygen atmosphere, for example, a nitrogen atmosphere having oxygen content of less than the limit detectable by analysis. Such powder has an extremely low oxygen content so that the magnet produced using such powder exhibits excellent magnetic properties. The powder is, however, extremely active so that it is readily flammable in air. Its handling is therefore difficult. The method illustrated in FIG. 30 can extract the excellent magnetic properties from the highly active powder as described, while enhancing the magnetic properties due to the compacting in a rubber mold.

The green compact produced by the above-described methods are sintered by the known method, and is then heat-treated, if necessary, so as to produce a sintered magnet. The magnet powder and resin may be compacted together to produce a resin-bonded magnet.

Method and Apparatus using Circuit

Figure 32:
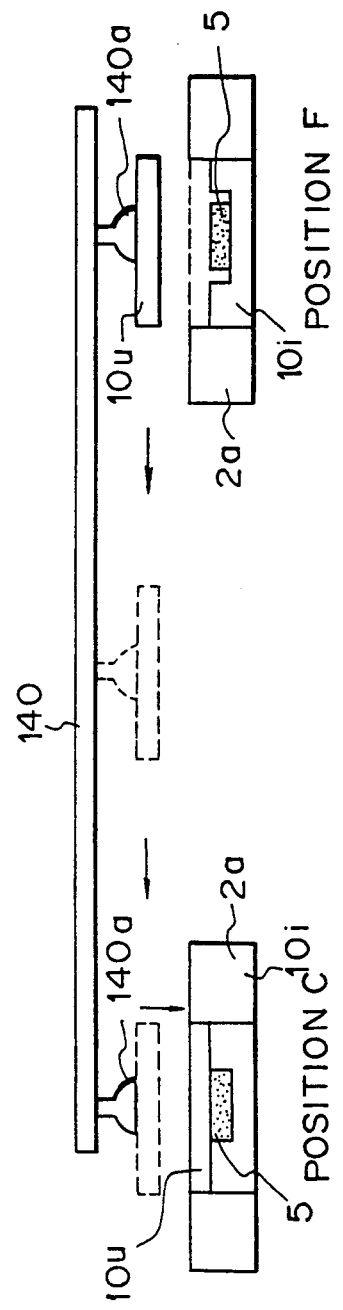
FIG. 32 illustrates the movement of a linear transporter used in the apparatus shown in FIG. 31.

FIG. 31 illustrates an embodiment of the fourth method. In this embodiment, a rubber mold 10i consists of a cylindrical body without a bottom. Its bottom is, however, closed with the rotary die 2a. A portion of the rotary die 2a therefore constitutes the bottom of the rubber mold. While the rubber molds 10i move successively along the circular passage along with the rotation of rotary die 2a, the powder is fed by a feeder 42 into each rubber mold 10i; the filling density of the powder is enhanced by vibration and compacting by a pusher; a cover 10u (not shown in FIG. 31 but shown in FIG. 32) is inserted at position C, the magnetic field is applied by means of the electromagnetic coils 4a to orient the powder; die-pressing by the die-pressing apparatus is carried out with or without the application of magnetic field; the cover 10u is removed at position F; and the green compact is removed by the removing device 62.

The removed cover 10u is returned by the linear transporter 140 (FIG. 32) to its inserting position C. The linear transporter 140 comprises a rail which guides the suction piece 140a which is in turn connected to a suctiion pump. A motor (not shown) is movably mounted on the rail and displaces the suction piece 140a to which the cover 10u is secured.

The removing device 62 comprises an arm 64, such as an electromagnet, capable of swivelling around the shaft 65 at a specified angle. When the electromagnet is energized and is swivelled, the magnetically anisotropic green compact is attracted to the arm 64 positioned above the conveyor 40. The arm 64 performs such a movement that it is swivelled back toward the position above the other conveyor 66 and is then de-energized. The green compact is therefore placed on the conveyor 66.

Since the rubber mold reverts to its initial shape after the compacting, an annular clearance 10r is formed around the green compact and between it and the rubber mold. The annular clearance 10r is sufficiently large to allow removal of the green compact from the rubber mold by the magnetic attraction.

The conveyor 66 is driven by a step motor 67 which is controlled by the control unit 50. This control unit 50 controls the above-described operation of the electromagnet 64 as well as the conveyor 66, i.e., the intermittent movement upon the placing of a green compact on it.

In FIG. 31, a cleaning device consisting parts 150–153 is provided. These are an air-piston 150, an air-unit 151, an electromagnet 152, and a power source 153 for energizing the electromagnet 152. When a green compact is removed from the rubber mold, the electromagnet 152 is displaced above the rubber mold and is then energized by the power source 153. The powder remaining in the rubber mold is attracted by the electromagnet 152 thus cleaning the rubber mold.

According to the method as illustrated in FIG. 31, the die-press machine 60 carries out only the compacting with or without the application of magnet field, that is, neither setting nor removal of a rubber mold are carried out in the die-pressing machine 60. This method is therefore more efficient than the method where die-pressing and setting and removal of a rubber mold are all carried out in the die-press machine. One pressing cycle is therefore short in the former method. The apparatus as shown in FIG. 31 is appropriate for large-scale production.

When the endless-type die-pressing method as illustrated in FIG. 31 is used for large-scale production of magnets, the time required for respective steps may be as follows.

(a) Powder feeding, vibration, pushing (at position A) and movement up to step (b):15 seconds (b) Attachment of cover (at position C): 5 seconds (c) Application of magnetic-field pulse (at position D): 15 seconds (d) Die-pressing (at position E): 15 seconds (e) Removal of cover (at position F): 5 seconds (f) Removal of a green compact and cleaning of a rubber mold (at position G): 10 seconds Since the longest operation takes 15 seconds, and, further, the conveying time from each of the steps (a) through (f) to the next step is 2 seconds, the time period for producing one green compact is 17 seconds.

Next is described the time required for the respective steps of the conventional die-pressing method, in which the powder is filled into the die-cavity of a die-press machine.

(a) Powder feeding by a feeder: 10 seconds (b) Lowering of an upper punch (the lower punch shunts when feeding the powder, and then lowers from the shunting position into the die): 5 seconds.

(c) Pressing (application of static magnetic field, compacting by the upper and lower punches, and application of inverse magnetic field): 27 seconds.

(d) Adjusting of shunting: 5 seconds (e) Removal of a green compact: 10 seconds

The total time of the steps (a) through (e) is 57 seconds. The first step (a) cannot be initiated for the next compact until all of the steps (a) through (e) are finished for the previous compact. Therefore, as long as 57 seconds is necessary for producing one green compact.

PREFERRED EMBODIMENTS IN VIEW OF PROPERTIES OF MAGNETS

In the present invention, the powder is preferably fed into a rubber mold and is filled at a high density at the same place. If the powder-feeding by a guide frame 100 is carried out at a different place from the high densification place by a pusher or the like, the guide plate must be transferred from the former position to the latter position. As a result, the number of the guide plates required increases, and hence the structure of the pressing apparatus is complicated.

The powder should not be fed directly from the feeder into a rubber mold but should be fed via a mesh and another container; that is, the powder is first fed to the mesh, which sieves the aggregates of powder, and then is fed to another container. After accurately weighing the powder, it is fed from the container into a rubber mold. Since the flowability of the magnet powder is very poor, it is difficult to feed an accurate amount of the powder from the feeder into the rubber mold. The method of feeding the powder via the mesh and container is therefore preferred for feeding the magnet powder.

The circulating apparatus is preferably located in a chamber filled with inert gas, so as to prevent oxidation of the powder, such as $Nd_2Fe_{14}B$ or Sm-Co powder. The chamber may be in the form of a dome or an annular tunnel covering the rotary die.

A green compact of magnet material may be demagnetized until or after it is withdrawn from a rubber mold. The demagnetization is however unnecessary when the magnetization of the green compact is low.

According to a preferable demagnetization method, a green compact is demagnetized in a rubber mold while the load from a pusher(s) is relieved but is still applied on the green compact. This demagnetization method drastically lessens the stress due to the magnetization and hence danger of cracking the green compact.

Wet Die-pressing

The above-described constitutions of the present invention are applied to the third method, i.e., the wet die-pressing with the use of a rubber mold and a slurry of powder and solvent i.e., water or organic solvent. The proportion of the powder to solvent is not limited but is preferably from 2 to 4 weight parts of solvent to from 8 to 6 weight parts of powder. A feature employed in the wet-die pressing with the use of a rubber mold is that the rubber mold is open at the top, because the water or the like must be withdrawn from the mold interior through a filter and a suction channel of the upper punch, during the pressing with the use of the upper punch. Since the rubber mold is open at the top, the compacting is less isostatic than in conventional pseudo CIP. Note, however, this CIP is a dry type, in which the powder is completely surrounded by the pressure medium, i.e., the rubber. But a satisfactory orientation is attained due to the presence of a solvent which reduces the friction between the powder particles. Furthermore, the pressure from the lateral portion of the rubber mold promotes removal of the solvent and, hence, the draining speed of the solvent is high. The pressing efficiency is therefore very high.

The slurry may be preliminarily injected into a rubber mold outside a die-press machine and the rubber mold is then loaded in the die-press machine; or, the rubber mold may be preliminarily loaded in a die-press machine and the slurry may be injected into the rubber mold. The injection of slurry into a rubber mold may be carried out by the following methods: preliminarily evacuating the rubber mold to a vacuum and the slurry is then injected; after injecting the slurry into a rubber mold, the slurry is exposed to vacuum or reduced pressure; or the slurry is injected into a rubber mold at a high pressure. These methods prevent blow holes from remaining on the surface of a rubber mold and hence prevent failure of products due to the blow holes.

Figure 33:
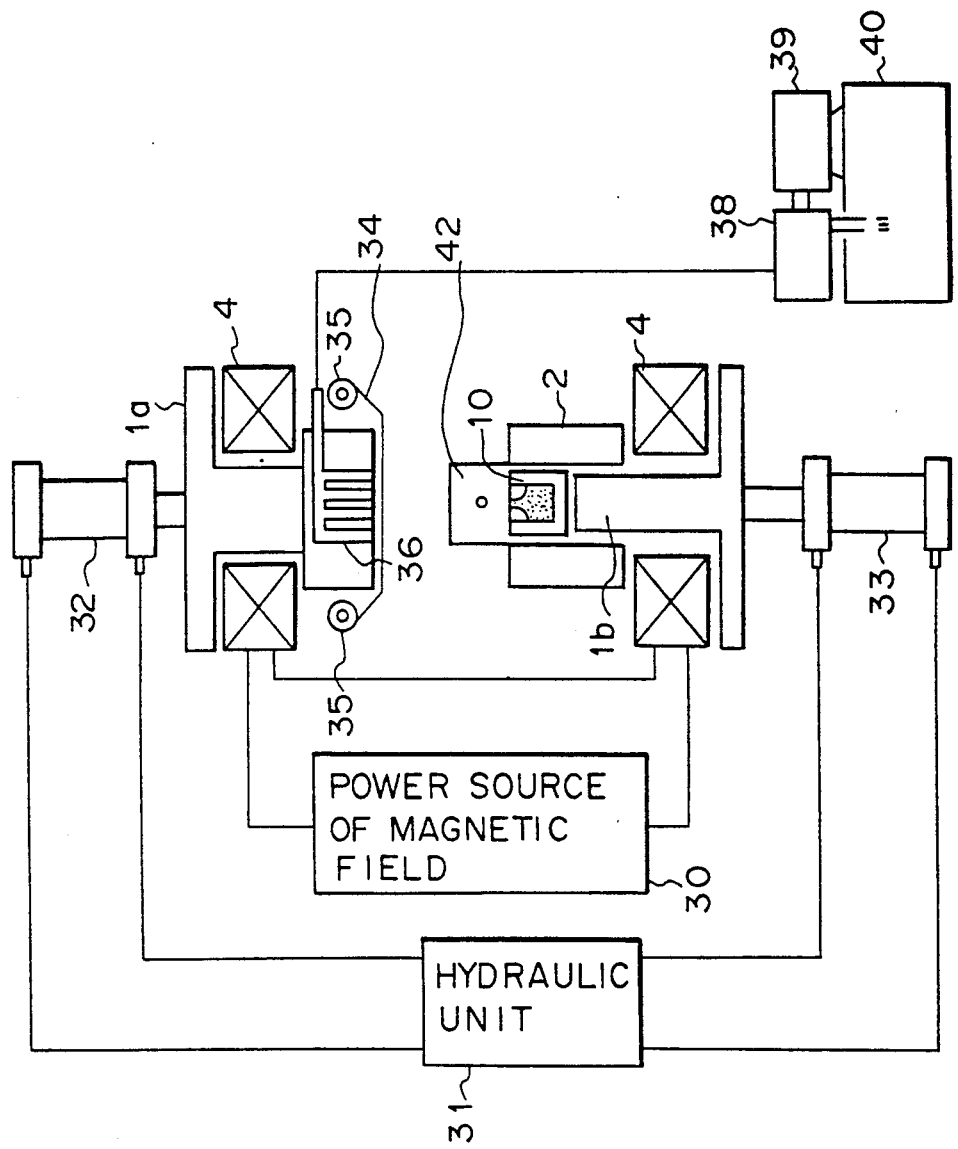
FIG. 33 illustratets a wet-type die-press apparatus according to the present invention.

Referring to FIG. 33 an embodiment of the wet die-pressing apparatus according to the present invention is illustrated. The wet die-pressing apparatus comprises: a power source 30 for generating the magnetic field; a hydraulic unit 31; hydraulic cylinders 32, 33; a filter 34 consisting of filter paper or cloth; rolls 35 for winding the filter 34; suction channel 36 formed through the upper punch 1a; a water-suction pump 38; a motor 39 for driving the water-suction pump; and a feeder 42 of the powder materials. The apparatus also comprises parts other than the above mentioned; these are denoted by the same reference numerals as shown in FIG. 16.

The suction channel consists of through-holes having a diameter of 1 mm or more so as to enhance the suction efficiency of the pump. The feeder 42 is connected with a source of the pressurized air-source (not shown), if it is necessary to feed the slurry with pressure. When the feeder 42 completes feeding of slurry into the rubber mold 10, the feeder shunts outside the compacting region of the punches 1a, 1b. The hydraulic unit 31 feeds the pressure medium into the hydraulic cylinder 32 and forces the upper punch 1a and the filter 34 to move down until the filter 34 covers the open top of the filter 34 to move down until the filter 34 covers the open top of the rubber mold 10. The lower punch 1b is then pushed upwards. Simultaneously, the suction pump 38 is operated to suck the water through the suction channel 36. When the suction of water is completed, the lower punch 1b is further pushed upwards. When the space between the upper punch 1a and the die 2 is closed, the power source 30 energizes the electromagnetic coils 4, which generates then the magnetic flux permeating through the upper and lower punches 1a, 1b. The compacting of powder by the upper and lower punches 1a, 1b is then carried out. Upon completion of the die-pressing, the steps, which are in reverse sequence to those described above, are carried out. The rolls 35 are rotated to reel the filter 34 and to expose an unused section of the filter 34.

Figure 34:
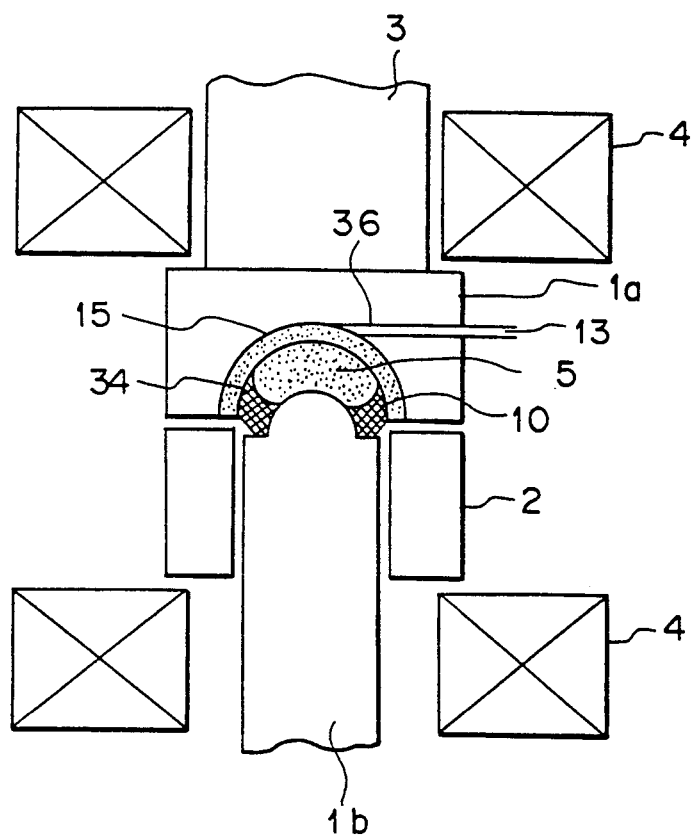
FIG. 34 is a partial view of another wet-type die-press apparatus according to the present invention.

FIG. 34 illustrates the essential part of another embodiment of the wet-type die-pressing apparatus according to the present invention. This apparatus is the same as illustrated in FIG. 33, except that the filter 34 is a ceramic filter. The continuous pores in the ceramic, which communicate its inner and outer surfaces with one another, are utilized as water-sucking channels. After die-pressing, high-pressure air is blown through the pores to remove the powder remaining there and hence to prevent clogging. The ceramic filter 34 is therefore used a number of times. A plaster filter, which is very inexpensive and is easily available, can be used as the ceramic filter 34. A filter which has a two-layer structure for enhancing the durability and water-suction property can also be used as the ceramic filter 34.

Figure 35:
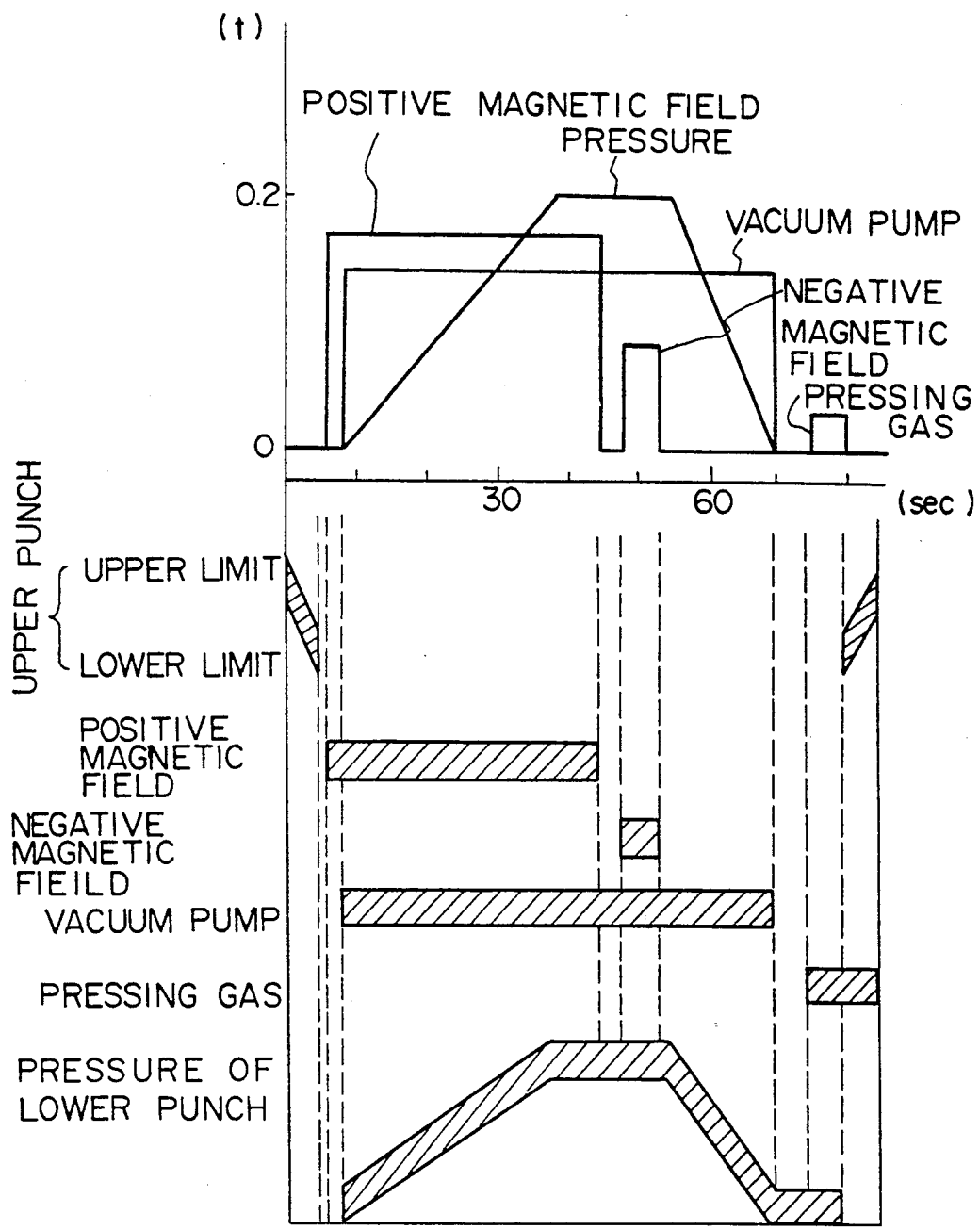
FIG. 35 illustrates the movement or energization of the parts of the apparatus shown in FIG. 33.

Referring to FIG. 35, operation of the apparatus with the use of a ceramic filter is illustrated.

First, the upper punch is lowered from the upper limit to the lower limit, and then stops. At virtually the same time as the descending movement of the upper punch stops, the power source is switched on. Immediately thereafter, the suction pump is energized, that is, a positive magnetic field is applied with the aid of the power source to the powder to orient it, while the water is removed by the suction pump from the slurry during the orientation. Simultaneously with the energization of the vacuum pump, the lower punch is pushed upwards to remove water from the slurry. The lower punch is further pushed upwards until the upper limit so as to compact the powder to the desired density. The power source is then switched off and is then again switched on to generate a negative magnetic field which is weaker than the positive magnetic field. This negative magnetic field reduces the remaining magnetization of a green compact to facilitate its subsequent handling. During the operations as described above, the suction pump is kept energized to further remove the water. The suction pump, power source and lower punch are all de-energized. After this, the upper punch is pushed upwards and the pressurized gas is blown through the filter to remove the clogging. The above series of operations is controlled by a microcomputer or sequence apparatus. For example, 20 seconds is necessary for one cycle consisting of the above steps, while in the conventional wet die-pressing approximately 90 seconds are necessary for one cycle. In the present invention, the period of one cycle is shorter than in the conventional method, because the water removeal speed is high and the friction between the powder and die is excluded.

A noticeable phenomenon, discovered in the wet-die pressing with the use of a rubber mold, is that a green compact may crack when the powder is filled to a point lower than the upper surface of a rubber mold. Another noticeable phenomenon is that, when the upper surface of powder filled in a rubber mold, particularly in one having a concave configuration of the upper surface, rises higher than the upper surface of the rubber mold, the rising portion of powder is pushed out of the die cavity onto the upper surface of the rubber mold, thereby forming a burr. In order to decrease incidence of these phenomena described above, the slurry is preferably injected into a rubber mold such that the profile of its upper surface is coincident with the profile of the lower surface of the upper punch. Preferred methods for such injection are: increasing the water content of the slurry to as high as 60% by weight or more; and using a guide-plate 105 shown in FIG. 36. The slurry is injected through the inlet 107 into the rubber mold 10. Subsequently, the guide-plate 105 is moved in the direction of the arrow to rub off the slurry, or is lifted up.

Another phenomenon discovered is that the slurry and air in the cavity of the rubber mold are liable to form bubbles on the wall surface of the rubber mold, and, further, surface defects such as indentations and the like are formed on the green compact. A preferred method for decreasing the incidence of such phenomena is to add into the slurry such defoaming agents as methyl alcohol and ethyl alcohol. Another preferred method is to treat, before or after filling a rubber mold with slurry, the inside of a rubber-mold cavity with reduced pressure. A rubber mold may be placed in a gas-tight chamber and exposed to vacuum in this chamber.

Figure 37:
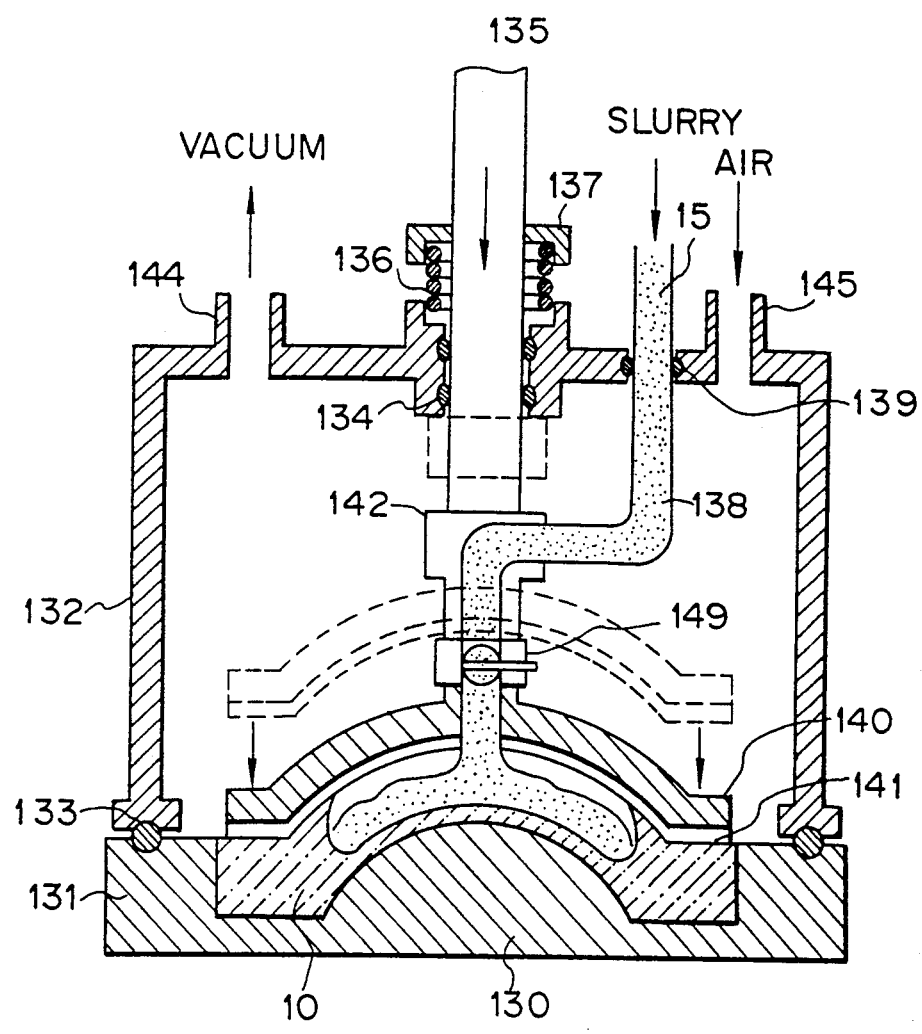
FIG. 37 illlustrates an embodiment of the apparatus for fluidizing and filling the slurry in a rubber mold located in a reduced-pressure atmosphere.

FIG. 37, illustrates an apparatus for injecting the slurry, adjusting the upper profile of the slurry, and treating the rubber mold with reduced pressure.

A rubber mold 10 is fixed to the pedestal 130 and side-holder 131. A vacuum-container 132 made of acryl resin is fixed gas-tightly to the side-holder 131 via the packing 133. A piston 135 is gas-tightly and reciprocatively mounted in the central top aperture of the container 132 via the packing 134. A collar 137 is secured to the piston 135 at a place outside the vacuum-container 132. A spring 136 is fitted between the collar 137 and the top of vacuum-container 132 to normally bias the piston 135 upwards. A stopper 142 is attached to the front end of the piston 135, and a conduit 138 for feeding the slurry is secured in the stopper 142. The conduit 138 is gas-tightly attached to the vacuum-container 132 via the packing 139 and is displaced in and retracted from the vacuum-container 132. The conduit 138 therefore moves vertically along with the vertical movement of the piston 135. A detachable plate 140, which is secured to the stopper 142, is strengthened by a partition plate 141, which consists of material, such as fluorine plastic whose water-wettability is small. The strengthened plate 140 has in the central top part a passage which can be closed by the electromagnetic valve 149. The lower surface of the partition plate 141 has the same shape as the lower surface of the upper punch.

The apparatus shown in FIG. 37 is operated as follows.

The electromagnetic valve 149 is closed. The partition plate 141 is attracted by the piston 135 and both are lifted into a position shown by the dotted lines. The opening 145 for introducing air is closed, and the vacuum container 132 is evacuated through the opening 144. The piston 135 is then pushed downwards so as to press the strengthened plate 140 against the rubber mold 10 and hence to bring the plate 140 into contact with the rubber mold 10. The electromagnetic valve 141 is then opened by remote control outside the vacuum container 132. The slurry is then fed through the conduit 138 into the rubber mold 10 with the aid of high-pressure gas. Air is then introduced into the vacuum container 132 through the opening 145. The piston 135 is then lifted above to lift the vacuum container 132 by hanging it on the stopper 142.

Figure 38A:
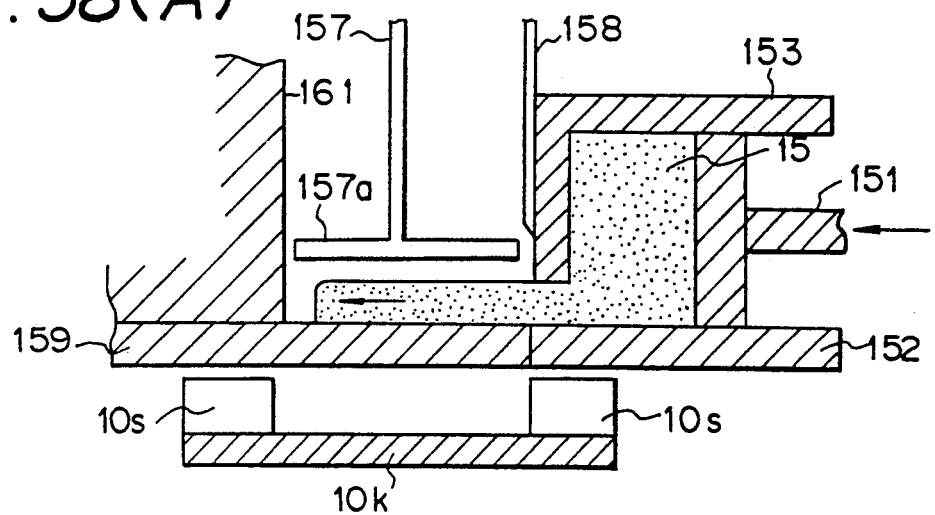
FIGS. 38(A) through (C) illustrate a pre-compacting method of slurry.
Figure 38B:
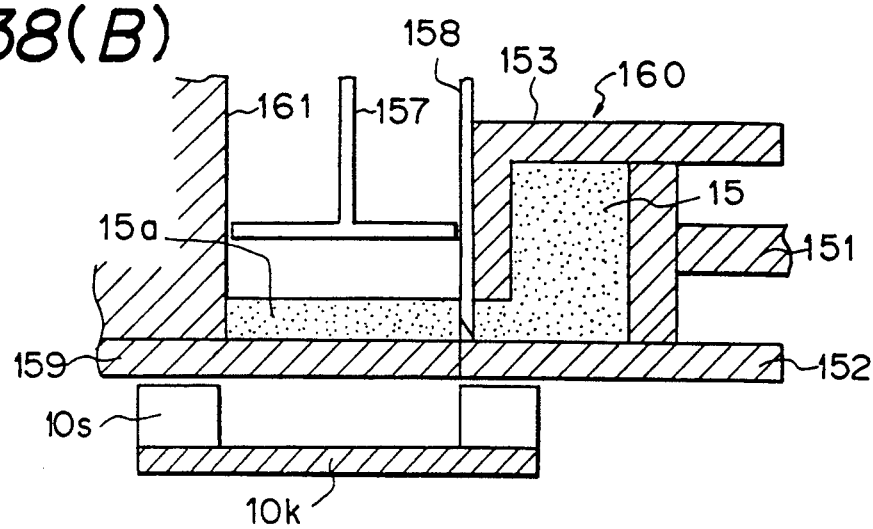
Figure 38C:
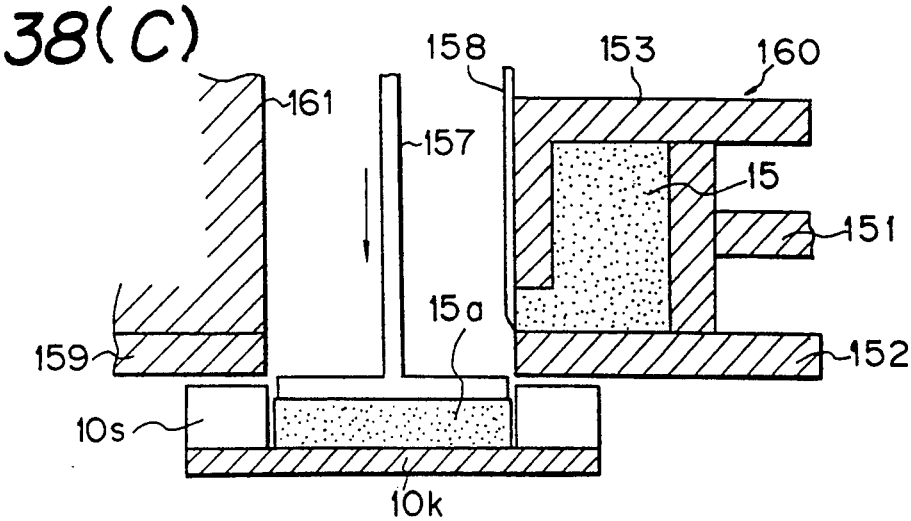

The slurry may, however, not only be injected as illustrated in FIGS. 33 and 37 but may be preliminarily compacted and then filled in a rubber mold 10 as illustrated in FIG. 38.

A piston 151 slides on the walls 152, 153 of a slurry-extruder 160, compresses the slurry 15 and extrudes it through the outlet of the slurry-extruder 160 as the pre-compact 15a. The pre-compact 15a is extruded onto the retractable bottom 159 and is then cut by lowering a cutter 158. After cutting, the pusher 157 is lowered by sliding it on the cutter 158 and the wall 161. The pusher 157 is stopped when its bottom surface strikes the upper surface of the precompact 15a. The retractable bottom 159 is then retracted, and the pre-compact is pushed into the rubber mold 10s, 10k by means of the pusher 157.

Figure 22:
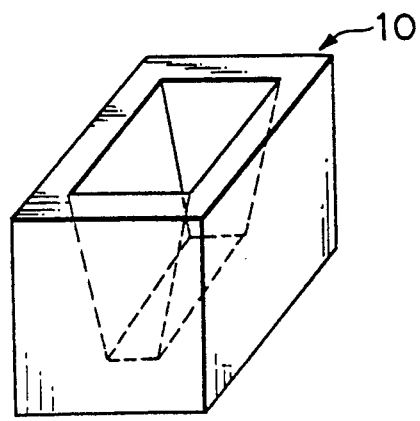
Figure 23:
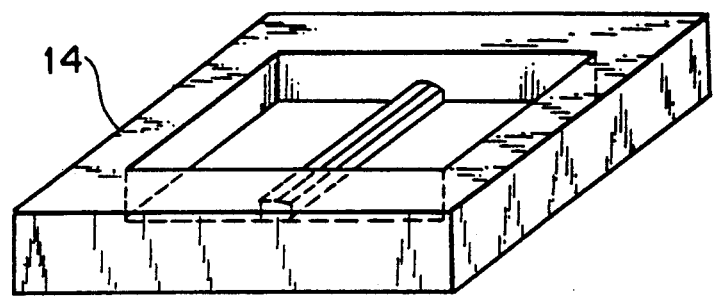

FIG. 39 illustrates a circulating type apparatus for wet-die pressing. The same parts as those shown in FIGS. 22 and 28 are denoted by the same reference numerals. A slurry-filling device shown in FIG. 28 or a loading device of a pre-compact shown in FIG. 29 is installed at position A. The filling of slurry and vacuum-suction are carried out at position A by the source of high-pressure air 166. Alternatively, only the filling of slurry is carried out at position A and the vacuum suction is carried out at position B by the vacuum-pump 165. Vacuum chambers 132 may be installed at positions A and/or B to locate the rubber molds therein.

Rubber Molds

Figure 40:
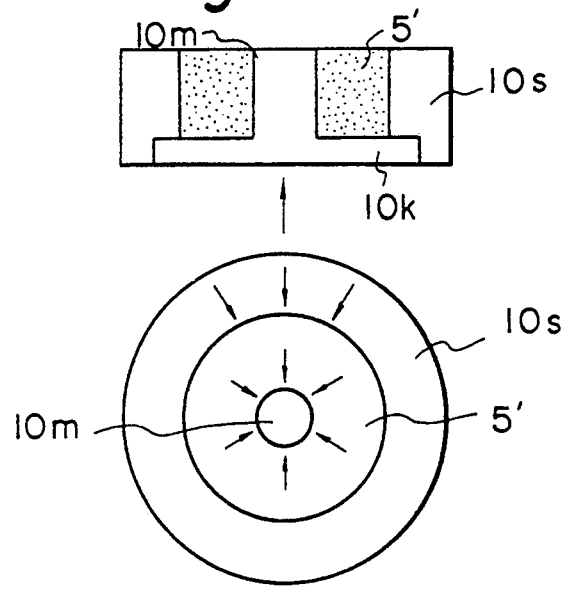
FIGS. 40 and 41 illustrate several embodiments of a rubber mold for producing a hollow green compact.
Figure 41:
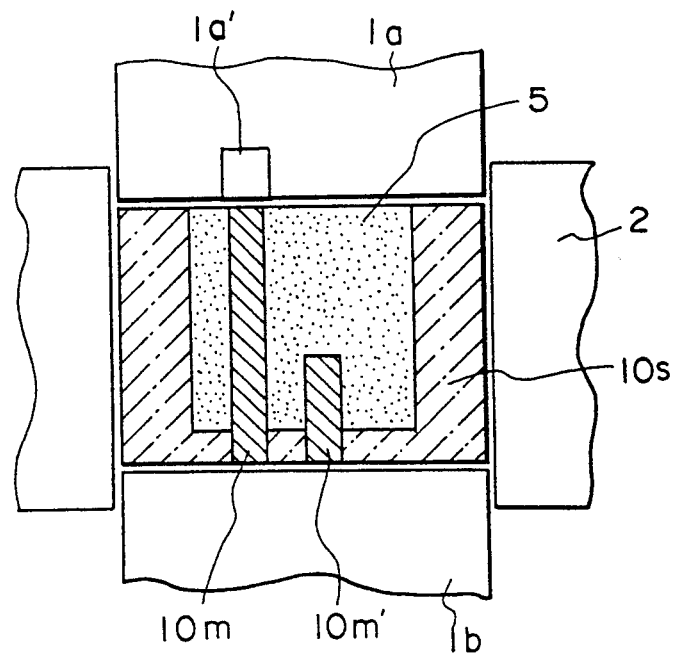

A rubber mold according to the present invention for forming a hollow green compact comprises a mandrel which is harder than the other portions of the rubber mold. If the mandrel of the rubber mold is softer than the other portions of the rubber mold, the mandrel 10m (FIG. 40) shrinks in the radially inner direction when pressure is applied by the punch(es) to the rubber mold. When the punch(es) is later retracted, the load applied to the rubber mold 10 and powder is relieved, with the result that the mandrel 10m, which has been shrunk once, pushes the green compact and expands to enlarge the hole of a green compact 5. The green compact 5 may therefore crack. The rubber mold according to the present invention lessens the shrinkage of the mandrel 10m and hence prevents the cracking of a green compact. The hollow green compact can be either radially or axially oriented.

A rubber mold for forming a hollow green compact may be provided with two mandrels 10m, 10m'. The upper punch 1 is provided with a recess 1a' for guiding the mandrel 10m. The mandrels 10m, 10m' may consist of metal.

Preferable structures of the rubber mold used for both dry and wet die-pressing methods according to the present invention are now described. In this description the upper, lower and side portions of a rubber mold are referred to as the top, bottom and side wall, respectively. In addition, at least the surface part of the above portions in contact with the powder should consist of materials, or have hardness, as described hereinafter.

Figure 42:
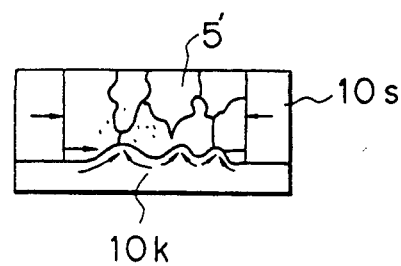
FIG. 42 illustrates how cracks are generated in a green compact formed bu a rubber mold.

According to one of the preferable rubber molds, at least either the top or bottom is harder than the wall part. If, on the contrary, the wall part is harder than the top and/or bottom, such incidence as is schematically shown in FIG. 42 occurs. That is, the deformation of the side wall 10s causes a considerable shrinkage of the (soft) bottom 10k to form wrinkles on it. These wrinkles act as the starting points of cracks 5'. In addition, the soft bottom 10k is liable to seize the powder, and the friction between the bottom 10k and the powder is great. When the pressure of a punch(es) is relieved, the bottom 10k tends to be restored to its original shape and hence to deform in the reverse direction from that during the compacting. At the reverse deformation, since the seizure between the bottom 10k and the green compact has occurred during the compacting, the green compact 5' follows the deformation of bottom 10k. The green compact 5' may therefore crack.

When the bottom 10k is of the same hardness as the side wall 10s, then the cracks are formed as described with reference to FIG. 42, when the degree of deformation is high. The preferable rubber mold therefore consists of a hard bottom and/or top made of metal or hard rubber or resin.

Figure 43:
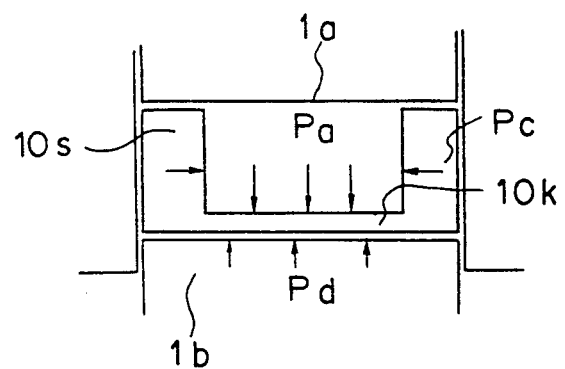
FIG. 43 illustrates the dimensions of a rubber mold.

According to another preferable rubber mold, at least either the top or bottom has a thickness (t, unit-mm) defined by $t \leq 16\, h/D$ (h is thickness of a green compact in mm, and D is the positive root of cross-sectional area (mm$^2$) of the green compact). The thickness of a bottom and the thickness of a green compact mean those in the pressing direction by a punch(es). The cross-sectional area of a green compact is the area of the cross section in the direction perpendicular to the pressing direction by a punch(es). As the area of a green compact becomes greater (smaller value for the right side of the formula above), the inverse deformation force of a rubber mold becomes greater, thereby causing the green compact to crack easily. The thickness of the top and/or bottom is therefore decreased. The effect of the thickness (h) to prevent cracks is illustrated in FIG. 42. The bottom 10k is compressed by the upper punch 1a generating the pressure Pa (FIG. 43) and the lower punch 1b generating the pressure Pd in the other direction. The pressure Pc is the shrinking stress reducing the cross-sectional area or the side wall 10s and the green compact. The wrinkles are generated by the pressure Pc. The thinner the bottom 10k, the greater is the pressure Pa and Pb, thereby holding stronger the bottom 10k. When the holding force exceeds the pressure Pc, wrinkles do not generate.

The coefficient "16" of the above formula was obtained from the following experiments. That is, the coefficient "16" was confirmed to be critical for the incidence of cracks of green compacts formed with the use of rubber molds shown in FIGS. 36 (E) and (F) and having dimensions of $30 \times 30 \times 5$ mm and $h/D = 0.17$. Powders of Nd-Fe-B and Fe-Co magnets were compacted under the pressure of 1.0 ton/cm$^2$.

The above-described two preferable rubber molds can be embodied as examples shown in FIG. 44. In this drawing, the hatched part consists of metal or hard rubber. The thickness of the top and/or bottom satisfying the above equation is referred to as "thin".

In FIG. 44(A), the top 10u, side wall 10s and bottom 10k consist of soft rubber, soft and hard rubber, or metal.

In FIG. 44(B), the top 10u, side wall 10s and bottom 10k consist of soft rubber, soft and hard rubber, or metal.

In FIG. 44(C), the thin top 10u, side wall 10s and bottom 10k consist of soft rubber, soft and hard rubber, or metal.

In FIG. 44(D), the thin top 10u, and the integral side wall 10s and bottom 10k consist of soft rubber.

In FIG. 44(E), the top 10u, and the integral side wall 10s and bottom 10k consist of hard rubber or metal and soft rubber, respectively.

In FIG. 44(F), the top 10u, and the integral side wall 10s and thin bottom 10k consist of soft rubber.

In FIG. 44(G), the top 10u consists of hard rubber or metal, and the integral side wall 10s and thin bottom 10k consist of soft rubber.

In FIG. 44(H), the thin top 10u, and the integral side wall 10s and thin bottom 10k consist of soft rubber.

In FIG. 44(I), the top 10u, side wall 10s and bottom 10k consist of hard rubber or metal, soft and hard rubber, or metal.

In FIG. 44(J), the side wall 10s and bottom 10k consist of soft and hard rubber or metal, respectively, and the bottom 10k is rigidly inserted in the recess formed in the side wall 10s.

In FIG. 44(K), the side wall 10s and bottom 10k consist of soft and hard rubber or metal, respectively, and the bottom 10k is rigidly inserted in the recess formed in the inner side surface of the side wall 10s.

In FIG. 44(L), the top 10u is provided with a projection protruding downwards and consists of hard rubber or metal. The side wall 10s and the bottom 10k consist of soft and hard rubber or metal, respectively.

The top 10u consisting of metal as shown for the example in FIG. 44(E) can be embodied in the upper punch of a die-press machine. In addition, the bottom 10k consisting of hard metal can be embodied in the lower punch of a die-press machine.

Figure 58:
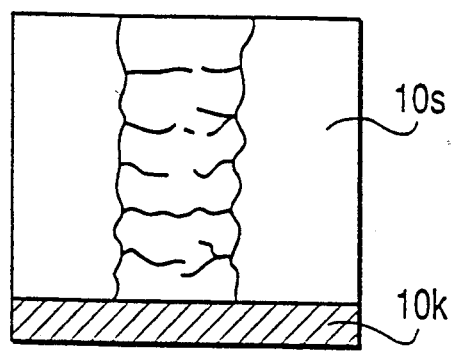
FIG. 58 illustrates laminar cracks.

The above described relationship of hardness and thickness of the portions of a rubber mold are not preferable for an elongated green compact, because the phenomena occurring during the compacting are just opposite to the one described above. The elongated compact is one having a length two times greater than the width thereof. The flat compact is one having a width two times greater than the length thereof. The width is defined as the positive square root of the cross-sectional area of a green compact. In the compacting of a flat green compact, the compression from the wide opposite ends, where the area is greater than the side surface, is decisive for preventing the cracks. Contrary to this, in the compacting of an elongated green compact, the compression of powder from the side surface is decisive for preventing the cracks, specifically the laminar cracks shown in FIG. 58. It is therefore preferred to construct a rubber mold for a flat green compact such that either top or bottom or both of a rubber mold, which face(s) the punch(es) of a die-press machine be harder than the side portion of the rubber mold. It is therefore preferred to construct a rubber mold for an elongated green compact so that the side portion of a rubber mold is harder than either top or bottom or both of a rubber mold.

Preferably, a rubber mold has a dual-layer structure, such that a portion of a rubber mold in contact with the fine powder consists of hard material and the other portion, distant from the die cavity, consists of soft rubber. In this dual-layer structure, the fine powder is not seized by the hard rubber, thereby facilitating withdrawal of the green compact from the rubber mold.

The harder rubber herein indicates that is harder than the softer rubber by at least 10% in terms of hardness A stipulated in JIS. However, when the so determined hardness is greater than 100, the above relationship is not observed but the harder rubber has a hardness A of 100.

The dual-layer rubber mold can be produced by molding or injection molding the hard and soft materials. The side, top and/or bottom portion can have the dual-layer structure. The dual-layer structure can be provided by applying hard material on the inner surface of a rubber mold, which has been preliminarily produced. The dual-layer structure may be such that the portion of a rubber mold in contact with the fine powder has a low coefficient of friction. Lubricant, such as molybdenum disulfide and the like, may be incorporated in the rubber or resin. Alternatively, polyethylene tetrafluoride (PTFE) and other resin having a low coefficient of friction may be used as the inner layer of the rubber mold.

In the production apparatuses of a magnet described above, the rubber mold 10 and the die 2, which is detachably mounted in the circuit, may be circulated together.

In an embodiment where the rubber molds are circulated by rotation through the positions where such members (42, 4a, 60, 65, 132) of the apparatus for treating the magnet powder are arranged, a motor must be intermittently activated and stopped accurately at the positions, particularly the die-pressing position. At this position, the punch and the die must be aligned very accurately, so that the requirement accuracy in the stopping position of the rubber mold can be very strictly observed.

According to a preferred embodiment which eases such strict requirements for accuracy in activating/stopping the motor, the circuit has the configuration of an equilateral polygon or scalene polygon, and said members are located at the apex region and/or side region of said equilateral or scalene polygon. There is also provided a means for transporting the rubber mold in a linear movement between the adjacent apexes. The linear movement can be easily attained by means of a hydraulic cylinder or the like. A particular advantage of the scalene polygonal configuration is that the distance between the adjacent apexes, where the successive two treatments are carried out, can be appropriately determined taking into consideration the size of said members, treatment time at each step and the like. One or more treatments may be carried out at each apex.

According to a preferred embodiment of the polygonal circuit, it is of quadrilateral configuration. In this case, a means for transporting a rubber mold may comprise rails extending between the adjacent apexes and at least two palettes slidably mounted on the rails and supporting the rubber mold and the die. In this embodiment, said members are arranged in such a manner that by the circulating movement of the transporting means the magnet powder is transferred to the successive treating positions.

FIGS. 46 through 51 show preferred embodiments of the production apparatus for making magnets.

The palette 201 (FIG. 46) is a quadrilateral plate for carrying the rubber mold 10 and the die 2. The palette 201 is carried on the rail 241 via the ball bearings 242. The palette 201 is provided with downward projections 243, in which the ball bearings 242 are rotatably mounted. Instead of the ball bearings, a wheel 241 (FIG. 47) may be guided along the rail 248. The wheels 248 may be secured at the four corners of the palette 201.

The palette 201 (FIG. 47) comprises a movable stage 202 inserted vertically slidably therein and supporting the die 2 on its top surface. The movable stage 202 is resiliently mounted on the body of the palette 201. For this resilient mounting, the springs 245 are inserted between the horizontally protruding portion of the movable stage 202 and the L-shaped section rigidly secured to the bottom of the palette 201.

Figure 48:
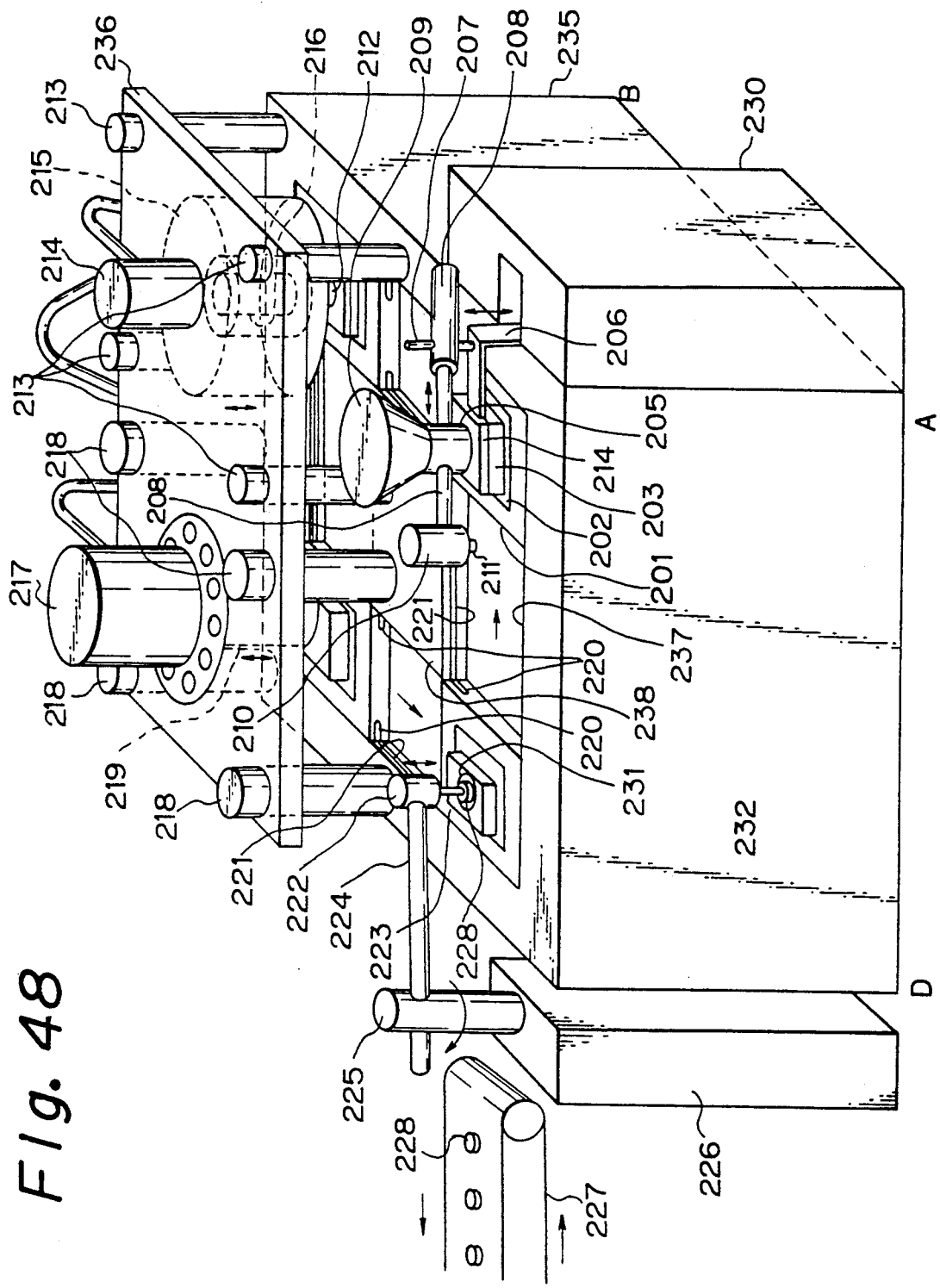
FIG. 48 is a Drawing showing a linear arrangements of the devices for producing a green compact.

The feeder of powder, the removing device, the magnetic-field generator, the precompacting device, and the die-press machine are linearly arranged on the straight passage at positions A, B, C, D, and E (FIG. 48). A pallete (not shown) therefore moves from A position via C, D and E to B position and stops at the respective positions for the respective treatment. The order of arrangement of the feeder and the like is not restricted.

Figure 46:
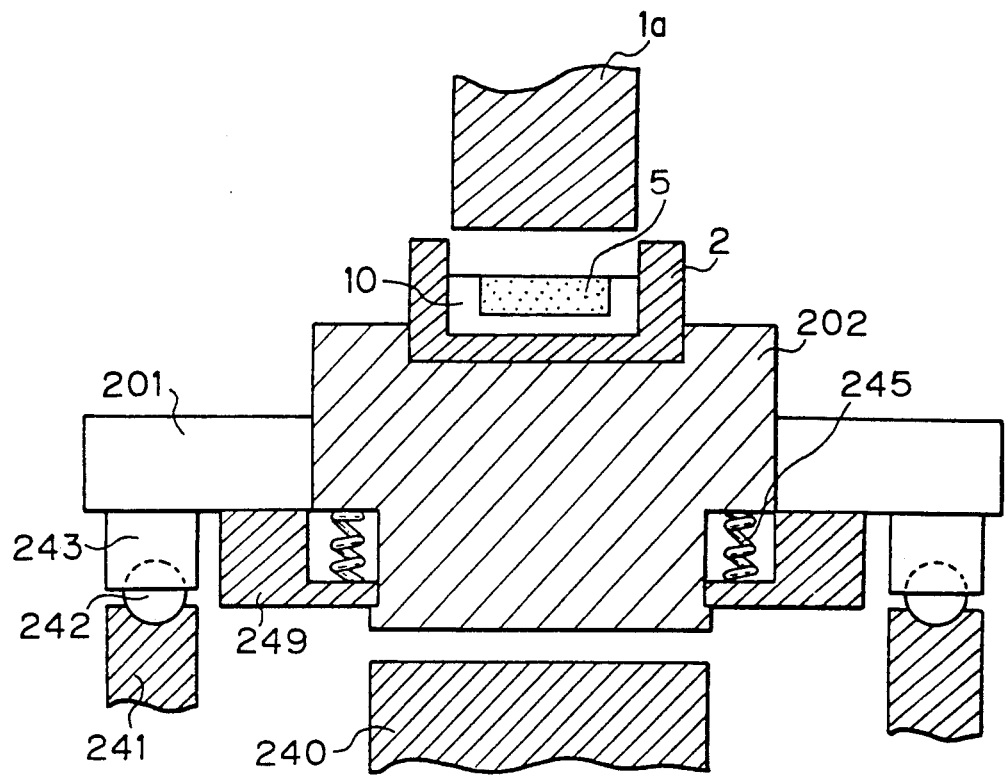
FIG. 46 is a schematic cross sectional view of a palette and a movable stage.
Figure 47:
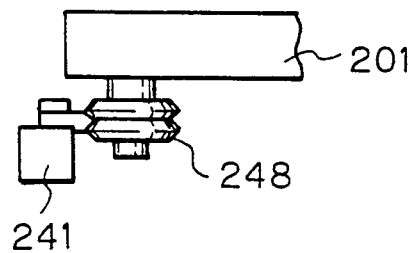
FIG. 47 is a drawing showing a rail carrying the palette.

The upper punch 1a (FIG. 46) lowers to be brought into contact with the movable stage 202, while compressing the springs 245. When the movable stage 202 further lowers, it pushes the metal plate 240. The compacting of the powder then starts. The resilient mounting as is shown in FIG. 46 therefore mitigates the force of the upper punch 1a and hence prevents trouble from occurring due to excessive load during the die pressing.

Figure 49:
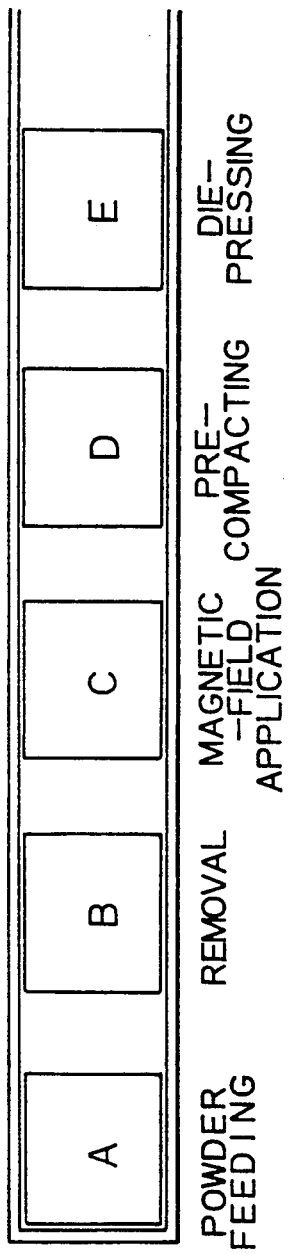
FIG. 49 is a elevational view of an embodiment of the magnet production-apparatus using palettes and quadrilateral transferring passage.

The operation of the apparatus shown in FIG. 49 is now described.

The guide plate 214 covers the palette 202. The arm 206 is secured to the guide plate 214, and the pneumatic piston 208 is secured on the arm 206 via a vertical column 207. The pneumatic cylinder 208 is provided with horizontally movable piston rod 208' and actuates the piston rod 208'. A hopper of powder 209 is secured on the piston rod 208' and is hence horizontally displaced relative to the palette 202. The pneumatic cylinder 210 actuates the pusher 211 and is horizontally displaced by the pneumatic cylinder 208. The four palettes 201 are carried by the frame 232.

The driving means of the arm 206 is denoted by the reference numeral 230.

When the palette 202 is positioned directly below the guide plate 214, the arm is driven downwards to press the guide plate 204 against the rubber mold. Then, the powder is fed from the hopper 209 via the feeder 205 which is tightly attached to the guide plate 204, into the rubber mold. The pneumatic cylinder 208 is then actuated to retract the hopper 209 and simultaneously advance the pusher onto the position directly above the guide plate 204. The pneumatic cylinder 210 is then actuated to lower the pusher 211, which then slides along the side wall of the guide plate 204 and presses the powder into the rubber mold. The pusher 211 is then elevated. The arm 206 is elevated to retract the hopper 209 and guide plate 204 upwards. The palette 202 is then transferred from the position A to the position B.

In position B, the pulse coil 215 is carried on the frame which is held by the vertical columns 213. The pulse coil 215 is lowered by a hydraulic cylinder 214 to cover the die. The cover 216 is simultaneously lowered to shield the die so as to prevent the powder from scattering outside the die during the magnetization. After the magnetization, the pulse coil 215 is lifted. The palette 202 is then transferred from position B to position C.

At position C, the die-press machine comprising the upper punch 219 and the hydraulic cylinder 217 is located. These members are carried by a frame which is held by the vertical columns 218. The pressing as is illustrated with reference to FIG. 46 is carried out at position C.

The palette 202 is transferred from position C to position D, where the green compact 228 is taken out of the rubber mold by the method as is described with reference to FIG. 31. A magnetic pole in the form of a pin 223 is lowered by the pneumatic cylinder 222 to magnetically attract the green compact 228 which has been compacted in the rubber mold 231. The pneumatic cylinder 222 is secured on the arm 224 which is swivelled around the shaft 225 by motor 226. The green compacts 228 are conveyed by the conveyor 227.

Figure 50:
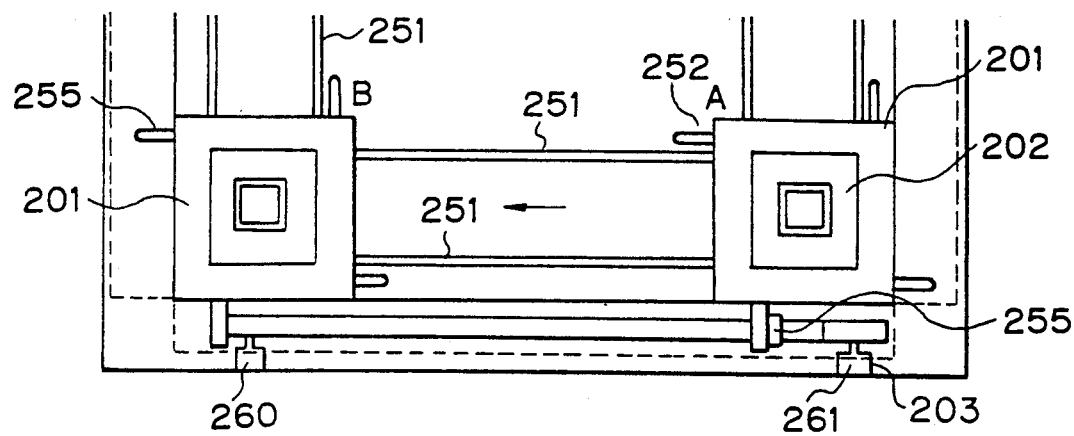
FIGS. 50 and 51 illustrate a means for transporting the palette.
Figure 51:
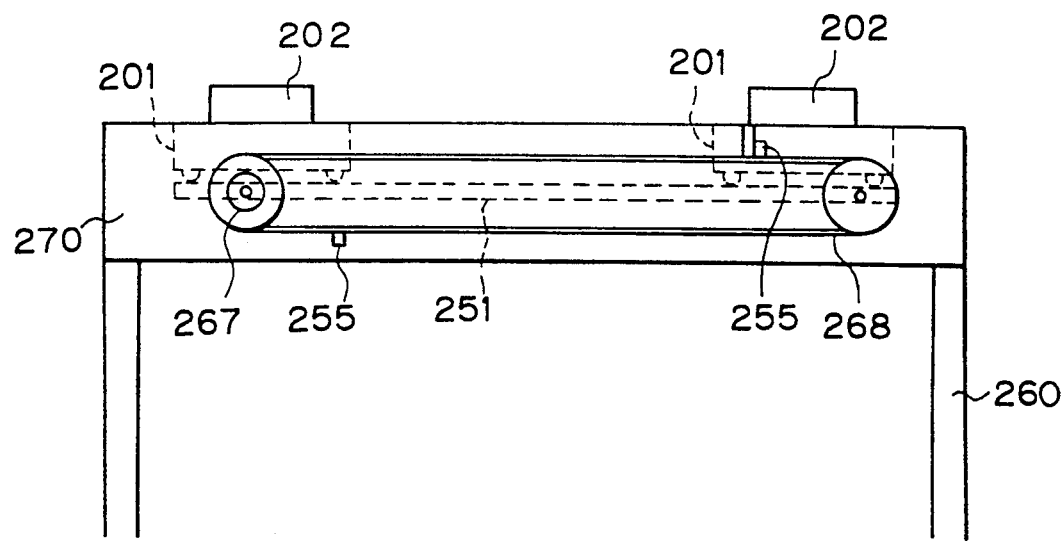

FIGS. 50 and 51 illustrate a means for transferring the palette 201. A motor 260 for driving the transferring of the palette 201 is secured to the upper frame 270. The upper frame 270 is supported by the lower frame 268. The gear 267 is driven directly by the motor 260, and a chain 268 is wound around the gear 267 and the other gear 261 which is secured to the upper frame 270. The chain 268 is provided with clicks 255.

The palettes 201 are also provided with clicks 252 at the four corners at such a position that they 252 can be engaged with the clicks 255 on the chain 268. The palettes 201 are carried via the wheels on the rails 251, which are extended along each side of the upper frame 270.

The palettes 201 can therefore be transferred between, for example, positions A and B. When the click 255 is displaced to an extreme position, for example position B in FIG. 50, it pushes the palette 201 so that an appropriate clearance is formed therebetween 201 and 255, thereby making it possible to move the click 255 along the gear 267 toward the lower side of the chain 268. The click 255 further moves and stops at position A. The click 255 stops there until the time of the next transfer.

The present invention is hereinafter described by way of Examples.

Example 1 (Nd-Fe-B Sintered Magnet)

Figure 45:
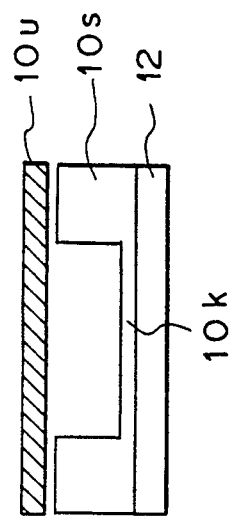
FIG. 45 illustrates the rubber mold used in the Examples.

The rubber mold shown in FIG. 45 was used. The cover 10u was made of metal. The side wall 10s and the bottom 10k were made of integral soft urethane rubber (hardness 40 in JIS A). The back-up plate 12 made of hard urethane rubber (hardness 90) was located under the bottom 10k, so as to prevent the rubber of the bottom from being seized in the clearance between the die and the punch(es). The dimension of mold cavity was 30 mm, 30 mm and 5 mm.

Metallic neodymium (Nd), electrolytic iron (Fe), metallic boron (B) and metallic dysprosium (Dy) were blended to provide a composition of $Nd_{13.8}Dy_{0.4}Fe_{78.2}B_{7.6}$ and were then arc-melted in argon gas to provide an ingot. The ingot was then roughly crushed by a stamp mill to provide an average particle-diameter of 20 $\mu$m and, then finely milled by a jet mill to provide an average-particle diameter of 3.0 $\mu$m. The so-provided fine powder was filled in the rubber mold 10s, 10k by means of vibration and pressure by a pusher, so that a filling density of from 1.0 to 4.2 g/cm$^3$ (13–56%) was attained. The rubber mold 10s, 10k was covered with the upper cap 10u, and then pulse magnetic field of 40 kOe was applied five times, each for 5$\mu$ seconds. Subsequently, the rubber mold was located in a die-press machine. The axial pressing was carried out under pressure of 0.8 ton/cm$^2$ and magnetic field of 12 kOe. The obtained green compacts were sintered at 1100° C. for 2 hours. The sintered compacts were aged at 650° C. for 1 hour. The magnetic properties of the sintered compacts and the quality of the green compacts are given in Table 1.

TABLE 1

| Filling Density (g/cc) | 1.0 | 1.4 | 1.8 | 2.2 | 2.6 | 3.0 | 3.4 | 3.8 | 4.2 |
|---|---|---|---|---|---|---|---|---|---|
| Cracks and Crazings | C | B | A | A | A | A | A | A | A |
| Deformation | C | B | B | B | A | A | A | A | A |
| Br(kG) | 12.5 | 12.5 | 12.5 | 12.5 | 12.5 | 12.5 | 12.3 | 12.0 | 9.4 |
| (BH)$_{max}$ | 37.2 | 37.2 | 37.2 | 37.2 | 37.2 | 37.2 | 36.0 | 34.3 | 21.0 |
| iHc(kOe) | 14.2 | 14.2 | 14.2 | 14.2 | 14.2 | 14.2 | 14.4 | 14.6 | 14.7 |

The filling density of 1.0 g/cc corresponds to the comparative example, in which the filling was natural filling.

The criteria of the cracks and fracture were as follows.

A: Neither cracks nor fracture

B: Cracks and fracture less than 10% of the total number of the green compacts

C: Cracks and fracture 10% or more of the total number of the green compacts

The criteria of deformation of green compacts were as follows:

A: Virtually no non-uniform deformation. Slight non-uniformity may remain in a green compact. In this case, a virtually complete green compact can be obtained by modifying the inner shape of the rubber mold.

B: Some non-uniform deformation but to such an extent that can be corrected by subsequent machining.

C: Non-uniform deformation is so serious that it is impossible to adjust the dimension of the green compacts by subsequent machining. Improvement is difficult even by improving the rubber mold.

The above criteria are used also for the subsequent examples unless otherwise mentioned.

Example 2 (Sintered Sm-Co magnet)

The rubber mold used in Example 1 was used. The ingot used had a composition of $Sm(Co_{0.72}Fe_{0.2}Cu_{0.06}Zr_{0.03})_{7.3}$. This ingot was roughly crushed by a stamp mill to provide an average particle-diameter of 25 $\mu$m and then finely milled by a jet mill to provide an average-particle diameter of 3.5 $\mu$m. The so-provided fine powder was filled in the rubber mold 10s, 10k by means of vibration and pressure by a pusher, so that a filling density of from 1.1 to 4.9 g/cm$^3$ (13–58%) was attained. The rubber mold 10s, 10k was covered with the cover 10u, and then pulse-magnetic field of 40 kOe was applied five times, each for 5$\mu$ seconds.

Subsequently, the rubber mold was placed in a die-press machine. The axial pressing was carried out under pressure of 0.8 ton/cm$^2$ and magnetic field of 12 kOe. The obtained green compacts were sintered at 1215° C. for 1 hour. The sintered compacts were aged at 805° C. for 2 hours and then cooled gradually.

The magnetic properties of the sintered compacts and the quality of the green compacts are given in Table 2.

TABLE 2

| Filling Density (g/cc) | 1.1 | 1.6 | 2.1 | 2.6 | 3.1 | 3.6 | 4.1 | 4.6 | 4.9 |
|---|---|---|---|---|---|---|---|---|---|
| Cracks and Crazings | C | B | A | A | A | A | A | A | A |
| Deformation | C | B | B | A | A | A | A | A | A |
| Br(kG) | 11.2 | 11.2 | 11.2 | 11.2 | 11.2 | 11.1 | 10.9 | 10.0 | 8.4 |
| (BH)$_{max}$ | 30.9 | 30.9 | 30.9 | 30.9 | 30.9 | 30.3 | 29.3 | 24.6 | 17.4 |
| iHc(kOe) | 17.2 | 17.2 | 17.2 | 17.2 | 17.2 | 17.3 | 17.5 | 17.6 | 17.6 |

The filling density of 1.1 g/cc corresponds to the comparative example, in which the filling was natural filling.

Example 3 (Sintered Ferrite Magnet)

The rubber mold used in Example 1 was used. The raw materials used were commercial strontium carbonate (SrCO$_3$) and commercial ferric oxide (Fe$_2$O$_3$). The respective raw materials were blended in a molar proportion of 1:5.9 and were then crushed and mixed for 5 hours. The mixture was calcined at 1270° C. for 1 hour.

The magnetic properties and the quality of the green compacts are given in Table 4.

TABLE 4

| Filling Density (g/cc) | 1.5 | 2.0 | 2.5 | 3.0 | 3.5 | 4.0 | 4.5 | 5.0 | 5.5 |
|---|---|---|---|---|---|---|---|---|---|
| Cracks and Crazings | C | B | A | A | A | A | A | A | A |
| Deformation | C | B | B | B | A | A | A | A | A |
| Br(kG) | 7.40 | 7.40 | 7.40 | 7.40 | 7.40 | 7.20 | 7.00 | 6.50 | 5.55 |
| (BH)$_{max}$ | 13.5 | 13.5 | 13.5 | 13.5 | 13.5 | 12.8 | 12.0 | 10.4 | 7.59 |
| iHc(kOe) | 15.4 | 15.4 | 15.4 | 15.4 | 15.4 | 15.5 | 15.6 | 15.7 | 15.7 |

The calcined sample was roughly crushed by a stamp mill to provide an average particle diameter of 8 μm and subsequently finely milled by a ball mill to provide an average particle-diameter of 0.7 μm. The finely milled powder was dried in air, and subjected to dry pressing. The so-provided fine powder was filled in the rubber mold 10s, 10k by means of vibration and pressure by a pusher, so that a filling density of from 0.6 to 2.8 g/cm$^3$ (13–58%) was attained. The rubber mold 10s, 10k was covered with the cover 10u and the magnetic field of 40 kOe was applied five times each for 5u seconds. Subsequently, the rubber mold was placed in a die-press machine. Axial pressing was carried out under pressure of 0.8 ton/cm$^2$ and magnetic field press-forming was carried out under pressure of 0.8 ton/cm$^2$ and magnetic field of 12 kOe. The obtained green compacts were sintered at 1200° C.

The magnetic properties of the sintered compacts and the quality of the green compacts are given in Table 3.

TABLE 3

| Filling Density (g/cc) | 0.6 | 0.8 | 1.0 | 1.2 | 1.4 | 1.6 | 1.8 | 2.0 | 2.2 |
|---|---|---|---|---|---|---|---|---|---|
| Cracks and Crazings | C | B | A | A | A | A | A | A | A |
| Deformation | C | B | B | A | A | A | A | A | A |
| Br(kG) | 3.80 | 3.93 | 4.02 | 4.02 | 4.02 | 3.92 | 3.82 | 3.61 | 3.02 |
| (BH)$_{max}$ | 3.44 | 3.63 | 3.80 | 3.80 | 3.80 | 3.60 | 3.43 | 3.06 | 2.14 |
| iHc(kOe) | 2.8 | 2.8 | 2.8 | 2.8 | 2.8 | 2.8 | 2.9 | 2.9 | 3.0 |

The filling density of 0.6 g/cc corresponds to the comparative example, in which the filling was natural filling.

EXAMPLE 4

Figure 36:
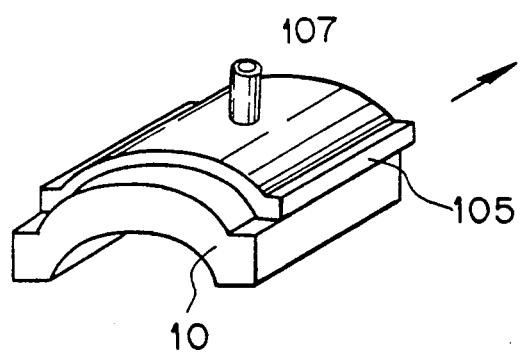
FIG. 36 illustrates an embodiment of rubber mold used in the wet die-pressing.

The raw-material powder used was the one prepared for a resin-bonded magnet and had a composition of Sm(Co$_{0.72}$Fe$_{0.2}$Cu$_{0.06}$Zr$_{0.03}$)$_{7.3}$, 20 μm of average particle-diameter and coercive force (iHc) of 15.5 kOe. This powder together with epoxy-resin powder was filled in the rubber mold 10s, 10k (c.f. FIG. 36) by means of vibration and pressure by a pusher, so that filling density of from 1.4 to 5.5 g/cm$^3$ (18–65%) was attained. The rubber mold 10s, 10k was covered with the cover 10u, and then pulse magnetic field of 40 kOe was applied five times, each for 5μ seconds.

Subsequently, the rubber mold was placed in a die-press machine. The axial pressing was carried out under pressure of 1 ton/cm$^2$ and magnetic field of 12 kOe. The obtained green compacts were cured at 120° C. for 1 hour.

The magnetic properties and the quality of the green compacts are given in Table 4.

The filling density of 1.5 g/cc corresponds to the comparative example, in which the filling was natural filling.

EXAMPLE 5

The raw-material powder used was the ferrite powder prepared for a resin-bonded magnet and had 1.35 μm of average particle-diameter and coercive force (iHc) of 2.7 kOe. After disintegrating the aggregates of powder, 0.5 % by weight of epoxy resin was added to the ferrite powder. The ferrite powder together with epoxy-resin powder was subjected to the same process as in Example 4, except that the die-pressure was 0.8 ton/cm$^2$ and curing time was 2 hours.

The magnetic properties and the quality of the green compacts are given in Table 5.

TABLE 5

| Filling Density (g/cc) | 0.6 | 0.8 | 1.0 | 1.2 | 1.4 | 1.6 | 1.8 | 2.0 | 2.2 |
|---|---|---|---|---|---|---|---|---|---|
| Cracks and Crazings | C | B | A | A | A | A | A | A | A |
| Deformation | C | B | B | A | A | A | A | A | A |
| Br(kG) | 2.20 | 2.26 | 2.33 | 2.33 | 2.33 | 2.26 | 2.19 | 1.98 | 1.75 |
| (BH)$_{max}$ | 1.13 | 1.19 | 1.27 | 1.27 | 1.27 | 1.19 | 1.13 | 0.92 | 0.72 |
| iHc(kOe) | 2.69 | 2.69 | 2.69 | 2.69 | 2.69 | 2.69 | 2.70 | 2.71 | 2.71 |

The filling density of 0.6 g/cc corresponds to the comparative example, in which the filling was natural filling.

EXAMPLE 6 (COMPARATIVE EXAMPLE)

The process of Examples 1 through 5 was repeated except for the following items: the powders were filled in a conventional die of the press machine (without a rubber mold); the filling density of the powders was adjusted as given in Table 6; and the pressure of axial die-pressing was 1.5 ton/cm . The results are given in Table 6, as "Axial Die Pressing", while the results of Examples 1 through 5 are given in Table 6 as "GDP".

Since the composition and production process of the magnet powders in Examples 1 through 5 are the same as those of the comparative example, the 4π Is of the magnetic powders of the comparative example is the same as that of Examples 1 through 5. The Br of Examples 1 through 5 is higher than that of the comparative example by approximately 7%. This clearly indicates that the orientation of various magnets can be enhanced by the inventive method more than by axial die pressing. With regard to iHc, there is approximately a 1% difference between the inventive method and the axial die-pressing, which difference is not appreciable because iHc is very likely to scatter.

TABLE 6

| Material | Pressing Method | Magnetic Properties | | | Filling Density | |
|---|---|---|---|---|---|---|
| | | Br(kG) | $(BH)_{max}$(MGOe) | iHc(KOe) | g/cc | % |
| Nd—Fe—B | Axial | 11.5 | 31.4 | 14.4 | 1.0 | 13 |
| Sintered | GDP | 12.5 | 37.2 | 14.5 | 2.2 | 29 |
| SmCo | Axial | 10.2 | 24.9 | 17.8 | 1.1 | 13 |
| Sintered | GDP | 11.2 | 30.9 | 17.2 | 2.6 | 31 |
| Ferrite (Dry, | Axial | 3.82 | 3.4 | 2.9 | 0.6 | 12 |
| Sintered) | GDP | 4.02 | 3.8 | 3.0 | 1.2 | 24 |
| SmCo | Axial | 6.92 | 11.8 | 15.6 | 1.5 | 18 |
| (Bond) | GDP | 7.40 | 13.5 | 15.4 | 3.0 | 35 |
| Ferrite | Axial | 2.05 | 1.0 | 2.7 | 0.6 | 12 |
| (Bond) | GDP | 2.33 | 1.27 | 2.69 | 1.2 | 24 |

GDP is the inventive examples with preliminary pulse magnetic field.

EXAMPLE 7

Metallic neodymium (Nd), electrolytic iron (Fe), metallic boron (B) and metallic dysprosium (Dy) were blended to provide a composition $Nd_{13.8}Dy_{0.5}Fe_{79.5}B_{7.0}$ and were then arc-melted in argon gas to provide an ingot.

The ingot was then roughly crushed by a stamp mill in inert-gas atmosphere to provide an average particle-diameter of 20 um. The roughly crushed powder was then finely milled by a jet mill in nitrogen atmosphere, whose oxygen concentration was less than detectable limit, to provide an average-particle diameter of 3.0 μm. The so-provided fine powder was filled in the rubber mold 10s, 10k by means of vibration and pressure by a pusher, so that filling density of 2.6 g/cm³ (34%) was attained. The filling of the fine powder was carried out while placing the rubber mold 10s, 10k in a chamber filled with nitrogen. The filling of the fine powder in air atmosphere was also carried out, but resulted in ignition of the powder thereby making it impossible to subject the powder to the subsequent process. Then the filled fine powder was subjected to the same process as in Example 1, except for aging at 630° C. for 1 hour. The magnetic properties of the sintered compact was: Br=13.9 kOe; $(BH)_{max}$=45.1 MGOe; and, iHc=12.8 kOe. The oxygen concentration of the sintered compact was 2680 ppm.

EXAMPLE 8 (WET FERRITE MAGNET)

Commercial strontium carbonate ($SrCO_3$) and commercial ferric oxide ($Fe_2O_3$) were blended in a molar proportion of 1:5.9 and were then milled by a ball mill for 6 hours. The mixture was calcined at 1260° C. for 2 hours. After calcining, the sample was roughly crushed and then finely milled to provide average particle-diameter of 0.75 μm. The obtained fine powder was rendered to slurry having slurry concentration of 71% (weight percentage of the ferrite powder based on the total weight of the slurry).

Arc-shaped green compacts as shown in FIG. 10 were produced using the wet-die press machine shown in FIG. 25 and provided with a filter 34 made of cloth or paper, a vacuum suction device and a slurry injection device and also using the wet-die press shown in FIG. 26 and provided with ceramic filter 34.

The methods employed for slurry injection were of injecting slurry from upper portion of the rubber mold preliminarily located in a die (FIG. 25), or of injecting slurry into the rubber mold outside the press machine and then setting the rubber mold in the press machine. The filling method employed in the conventional wet method, i.e., injecting of slurry into the die through an aperture formed in the side wall of the die, was not employed.

The respective steps of the compression forming were finely adjusted so that they did not interfere with one another and, further, excess idle time was almost avoided.

The compression forming was repeated one hundred times for each density and each filling method. For comparison purpose, the conventional parallel die-pressing (without rubber mold) was carried out one hundred times. In order to measure the density and magnetic properties of the sintered magnets, sampling of each sample was carried out for each five press cycles and the samples were sintered at 1235° C. for 1.5 hours. The samples for measuring the magnetic properties were cut from the arc-shaped sintered magnets and were subjected to measurement with a BH tracer. The average magnetic properties are given in Table 7.

TABLE 7

| Filter | Generation of Cracks (%) | Density (g/cm²) | iHc (kOe) | Br (kG) | $(BH)_{max}$ (MGOe) | Filling Method | Remarks |
|---|---|---|---|---|---|---|---|
| Paper, Cloth | 5 | 4.96 | 2.8 | 4.12 | 4.0 | within die | Comparative |
| Ceramics | 4 | 4.97 | 2.8 | 4.11 | 4.0 | within die | Comparative |
| Paper, Cloth | 1 | 4.96 | 2.8 | 4.32 | 4.4 | outside die | Inventive |
| Ceramics | 1 | 4.97 | 2.8 | 4.31 | 4.4 | outside die | |
| Paper, Cloth | 1 | 4.97 | 2.8 | 4.31 | 4.4 | within die | |
| Ceramics | 1 | 4.96 | 2.8 | 4.32 | 4.4 | within die | |

As is apparent from Table 7, cracks are decreased, and Br and $(BH)_{max}$ are increased according to the present invention.

EXAMPLE 9

The slurry used in Example 8 was dried and then the aggregates of powder were disintegrated for 1 hour in a ball mill, to provide dry powder. Measuring the bulk density of the dry powder revealed to be 0.80 g/cm³.

This dry powder was filled in a rubber mold made of silicone rubber, 23.95 mm in outer diameter, 12 mm in inner diameter, and 10 mm in height. The filling methods were the combination of the steps chosen from the group as mentioned below. The amount of the powder was so adjusted that it was filled up to the top edge of the rubber mold. Influence of the powder bulk-density in the rubber mold (g/cm$^3$) upon the molding under the magnetic field was investigated.

Filling Methods (1) The rubber mold is placed on the vibrator, and the filling density is enhanced by vibration.

(2) The rubber mold is loaded in a tapping machine, and the filling density is enhanced by vibration.

(3) Magnetic field is applied to the powder in a rubber mold to enhance the filling density due to the attraction force of the magnetic field and the attraction force of the magnetized particles of the powder.

(4) Powder granulated under magnetic field is used. The granulating degree is such that the particles of the granulated powder easily disintegrated under the magnetic field.

(5) Relatively strongly granulated and oriented powder was formed under a magnetic field.

(6) Magnetic powder was preliminarily compression-shaped at a pressure of a few tens kg/cm$^2$ to enhance the filling density.

Then the powder, whose filling density was enhanced by the above-mentioned method, was subjected five times to application of pulse magnetic field of 40 kOe for 5$\mu$ seconds for each time. The green compacts were sintered at 1230° C. for 2 hours. The quality of the green compacts and the maximum energy product (MGOe) of the sintered compacts are given in Table 8.

TABLE 8

| Filling Density | 0.8 | 0.9 | 1.0 | 1.1 | 1.2 | 1.3 | 1.4 |
|---|---|---|---|---|---|---|---|
| Cracks, Crazing | C | B | A | A | A | A | A |
| Deformation | C | B | B | A | A | A | A |
| (BH)$_{max}$ | 4.4 | 4.4 | 4.4 | 4.4 | 4.4 | 4.4 | 4.4 |

The criterion and cracks was as follows:
A: Virtually neither cracks nor fracture
B: 5% or less of cracks and fracture
C: More than 5% of cracks and fracture

EXAMPLE 10

The fine powder used in Example 1 was compacted by using the dry axial pressing machine whose schematic drawing is shown in FIG. 25. The magnetic field (H) was oriented to across the mold cavity. A hundred sintered magnets were produced under the same conditions as in Example 1. The magnetic properties of the sintered magnets are given in Table 9.

TABLE 9

| Magnetic Properties | | | |
|---|---|---|---|
| Br(kG) | (BH)$_{max}$(MGOe) | iHc(kOe) | Remarks |
| 12.6 | 38.2 | 13.5 | maximum |
| 12.3 | 36.5 | 12.8 | minimum |
| 12.5 | 37.3 | 13.1 | average |

It is possible by means of the method in this Example to continuously produce the magnets with stable properties and to attain automatic production of the magnets.

EXAMPLE 11

Commercially available raw material for preparing the ferrite-magnet slurry was used in the conventional axial die-pressing and inventive method in Example 3. The green compacts obtained by the respective methods were sintered. The magnetic properties of the sintered magnets are given in Table 10.

TABLE 10

| Example | Br (kG) | iHc (kOe) | (BH)$_{max}$ (MGOe) |
|---|---|---|---|
| Inventive | 4.52 | 2.95 | 4.86 |
| Comparative | 4.30 | 2.98 | 4.40 |

The magnetic properties of this inventive example are better than those of Example 3 given in Table 3. The magnetic properties of this comparative example are virtually equal to those of the inventive Example 8. Since ferrite powder having excellent magnetic properties was used in these inventive and comparative examples, the magnetic properties are excellent even in the comparative example. Since (BH)$_{max}$ of the present inventive example is higher than that of the present comparative example by approximately 10%, it is clear that extremely excellent (BH)$_{max}$ is obtained by using the magnet powder having excellent magnetic properties.

EXAMPLE 12

Commercially available raw material of Nd-Fe-B magnet was used in the axial die-pressing according to Example 1 and the conventional axial die-pressing. The green compacts obtained by the respective methods were sintered. The magnetic properties of the sintered magnets are given in Table 11.

TABLE 11

| Example | Br (kG) | iHc (kOe) | (BH)$_{max}$ (MGOe) |
|---|---|---|---|
| Inventive | 13.2 | 14.1 | 40.3 |
| Comparative | 12.3 | 14.3 | 35.2 |

Since the Nd-Fe-B powder used in Example 12 has excellent magnetic properties, the magnetic properties of conventional die-pressing are excellent. (BH) of the inventive die-pressing is better than that of the conventional die-pressing by 14%. It is therefore clear that extremely excellent (BH)$_{max}$ is obtained by using the magnet powder having excellent magnetic properties.

EXAMPLE 13

Influence of filling density and application of pulse magnetic field upon the magnetic properties were investigated in the process of Example 1.

TABLE 12

| Filling Density (g/cc) | Application Pulse | Magnetic Properties | | |
|---|---|---|---|---|
| | | Br (kG) | (BH)$_{max}$ (MGOe) | iHc (kOe) |
| 1.4 | no | 12.5 | 37.1 | 14.2 |
| | yes | 12.5 | 37.2 | 14.2 |
| 1.8 | no | 12.2 | 35.4 | 14.3 |
| | yes | 12.5 | 37.2 | 14.2 |
| 2.2 | no | 11.1 | 29.3 | 14.5 |
| | yes | 12.5 | 37.2 | 14.2 |
| 2.6 | no | 10.1 | 24.3 | 14.3 |
| | yes | 12.5 | 37.2 | 14.2 |

TABLE 12-continued

| Filling Density (g/cc) | Application Pulse | Magnetic Properties | | |
|---|---|---|---|---|
| | | Br (kG) | (BH)$_{max}$ (MGOe) | iHc (kOe) |
| 3.0 | no | 9.03 | 19.4 | 14.4 |
| | yes | 12.5 | 37.2 | 14.2 |

It is clear from Table 12 that the preliminary application of pulse magnetic field upon the highly densified magnet-powder is effective for enhancing its orientation degree.

EXAMPLE 14

Influence of filling density and application of pulse magnetic field upon the magnetic properties were investigated in the process of Example 2.

TABLE 13

| Filling Density (g/cc) | Application Pulse | Magnetic Properties | | |
|---|---|---|---|---|
| | | Br (kG) | (BH)$_{max}$ (MGOe) | iHc (kOe) |
| 1.6 | no | 11.2 | 30.9 | 17.3 |
| | yes | 11.2 | 30.9 | 17.2 |
| 2.1 | no | 10.9 | 29.3 | 17.3 |
| | yes | 11.2 | 30.9 | 17.2 |
| 2.6 | no | 9.9 | 24.1 | 17.4 |
| | yes | 11.2 | 30.9 | 17.2 |
| 3.1 | no | 9.0 | 20.0 | 17.5 |
| | yes | 11.2 | 30.9 | 17.2 |
| 3.6 | no | 8.4 | 17.4 | 17.5 |
| | yes | 11.1 | 30.3 | 17.3 |

It is clear from Table 13 that the preliminary application of pulse magnetic field upon the highly densified magnet-powder is effective for enhancing its orientation degree.

EXAMPLE 15

Influence of filling density and application of pulse magnetic field upon the magnetic properties were investigated in the process of Example 3.

TABLE 14

| Filling Density (g/cc) | Application Pulse | Magnetic Properties | | |
|---|---|---|---|---|
| | | Br (kG) | (BH)$_{max}$ (MGOe) | iHc (kOe) |
| 0.8 | no | 3.89 | 3.56 | 2.82 |
| | yes | 3.93 | 3.63 | 2.80 |
| 1.0 | no | 3.94 | 3.65 | 2.81 |
| | yes | 4.02 | 3.80 | 2.80 |
| 1.2 | no | 3.88 | 3.53 | 2.83 |
| | yes | 4.02 | 3.80 | 2.80 |
| 1.4 | no | 3.26 | 2.50 | 2.84 |
| | yes | 4.02 | 3.80 | 2.80 |
| 1.6 | no | 3.02 | 2.14 | 2.84 |
| | yes | 3.92 | 3.60 | 2.80 |

It is clear from Table 14 that the preliminary application of pulse magnetic field upon the highly densified magnet-powder is effective for enhancing its orientation degree.

EXAMPLE 16

The initial step and the subsequent steps until the fine milling step as well as the sintering step and subsequent steps were carried out according to the same method and under the same conditions as in Examples 1 through 5. The following methods were carried out in Comparative Example and Examples A and B.

Comparative Example—axial die-pressing under magnetic field (compacting pressure—1.5 t/cm², magnetic field 12 kOe)

Example A—A pulsed magnetic field of 40 kOe is applied to highly densified powder five times, 5μ seconds for each time. The die pressing was then carried out without the application of magnetic field. The compression pressure was 1.0 ton/cm². The compression direction was the same as application direction of pulse magnetic field.

Example B—A pulsed magnetic was field applied by the same method as in Example B. The axial die-pressing was then carried out without the application of magnetic field. The compacting pressure was 1.0 ton/cm². The compression direction was the same as the application direction of pulse magnetic field.

The magnetic properties of the obtained magnets are given in Table 15.

TABLE 15

| Material | Pressing | Filling Density (g/cm³) | Magnetic properties | | |
|---|---|---|---|---|---|
| | | | Br (kG) | (BH)$_{max}$ (MGOe) | iHc (kOe) |
| Nd—Fe—B Sintered | Comparative | 1.4 | 11.7 | 32.4 | 14.4 |
| | Example A | 2.6 | 12.3 | 36.1 | 14.3 |
| | Example B | 2.6 | 12.5 | 37.2 | 14.2 |
| Sm—Co Sintered | Comparative | 1.6 | 10.5 | 26.9 | 17.5 |
| | Example A | 3.1 | 11.0 | 29.5 | 17.3 |
| | Example B | 3.1 | 11.2 | 30.9 | 17.2 |
| Ferrite Sintered | Comparative | 0.8 | 3.73 | 3.32 | 2.9 |
| | Example A | 1.2 | 3.95 | 3.67 | 2.8 |
| | Example B | 1.2 | 4.02 | 3.80 | 2.8 |
| Sm—Co Bonded | Comparative | 2.0 | 6.94 | 11.9 | 15.6 |
| | Example A | 3.5 | 7.25 | 12.8 | 15.5 |
| | Example B | 3.5 | 7.40 | 13.5 | 15.4 |
| Ferrite Bonded | Comparative | 0.8 | 2.18 | 1.11 | 2.7 |
| | Example A | 1.2 | 2.29 | 1.23 | 2.7 |
| | Example B | 1.2 | 2.33 | 1.27 | 2.7 |

EXAMPLE 17

The rubber mold shown in FIG. 44(I) was used. The cover 10u and bottom 10k consisted of hard rubber (hardness 90). The side wall 10s consisted of soft rubber (hardness 40). The die cavity of the rubber mold had a dimension of 30×30×3 mm.

Figure 59:
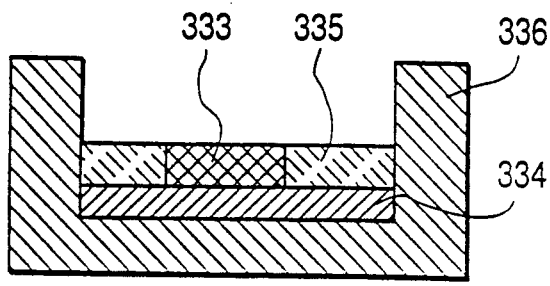
FIG. 59 illustrates a method for producing a rubber mold.

The rubber mold was produced as follows. The metal die 336 (FIG. 59), whose cavity had the same dimension as that of the rubber mold, was prepared. A hard urethane plate 334, which had been preliminarily cured and cut, was set on the bottom of the die cavity of the metal die 336. A core 33 was set on the hard urethane plate 334 at its center. Uncured rubber (two-pack type urethane rubber curable at normal temperature, product of Dainihon Ink Chemical Co., Ltd.) was defoamed under vacuum and molded on the hard urethane plate 334 to form the side wall 335.

The rubber molds used in the succeeding examples were also produced by the method as described above.

The fine powder compacted was the atomized powder of Fe-45 wt % Co (average particle diameter of 15 μm and true density of 8.3 g/cc). The fine powder was compacted under pressure of 1.0 ton/cm². The obtained green compacts were sintered at 1200° C. for 7 hours. Neither lubricant nor binder was added to the fine powder.

The results of compacting and sintering are shown in Table 16.

TABLE 16

| Filling Density (g/cc) | 2.50 | 2.80 | 3.10 | 3.40 | 3.70 | 4.00 |
|---|---|---|---|---|---|---|
| Density relative to True Density (%) | 30.1 | 33.7 | 37.3 | 41.0 | 44.6 | 48.2 |
| Filling Density/True Density | 1.00 | 1.12 | 1.24 | 1.36 | 1.48 | 1.60 |
| Filling Method | N | NV | NVP | NVP | NVP | NVP |
| Maximum Unit Weight of Green Compacts (g) | 6.85 | 7.57 | 8.38 | 9.18 | 9.99 | 10.8 |
| Minimum Unit Weight of Green Compacts (g) | 6.70 | 7.56 | 8.37 | 9.16 | 9.98 | 10.6 |
| Range of Unit Weight | 0.15 | 0.01 | 0.01 | 0.02 | 0.01 | 0.02 |
| Cracks and Crazings | C | C | B | B | A | A |
| Deformation | C | C | A | A | A | A |
| Density of Sintered Compact/True Density (%) | — | — | 94 | 94 | 94 | 94 |

(1) The left end column of Table 16 corresponds to the comparative example, where the fine powder is filled at the natural density. In this filling, the fine powder was fallen under gravity into the rubber mold, and then the rising powder above the rubber mold was rubbed off. The weight of the fine powder was not measured.

In the inventive examples, the weigth of the fine powder filled at various densities was measured with a tolerance of ±1%.

(2) The filling methods

N—The natural filling to provide the natural density as described above

NV—The fine powder was dropped into the rubber mold by guiding it with a frame, while imparting vibration to the fine powder. After filling, the upper surface of the filled powder was lightly pushed by a pusher so as to make the upper surface coincident with the upper surface of the rubber mold.

NVP—the fine powder was dropped into the rubber mold by guiding it with a frame, while imparting vibration to the fine powder. After filling, the upper surface of the filled powder was strongly pushed by a pusher so as to make the upper surface coincident with the upper surface of the rubber mold.

The criteria of the cracks and fracture were as follows.

A: Neither cracks nor fracture

B: Cracks and fracture less than 10% of the total number of the green compacts

C: Cracks and fracture 10% or more of the total number of the green compacts

The criteria of deformation of green compacts were as follows.

A: Virtually no non-uniform deformation. Slight non-uniform defromation may remain in a green compact. In this case, a virtually complete green compact can be obtained by modifying the inner shape of the rubber mold.

B: Some non-uniform deformation but to such an extent that can be corrected by subsequent machining.

C: Non-uniform deformation is so serious that it is impossible to adjust the dimension of the green compacts by subsequent machining. Improvement is difficult even by improving the rubber mold.

The above criteria are used also for the subsequent examples unless otherwise mentioned.

Ti fine powder (hydrogenated and the decomposed powder, average particle-diameter - 10 um, and true density - 4.5 g/cc) was compacted as in the case of Fe-Co powder at a pressure of 1.0 t/cm². The obtained green compacts were sintered at 1150° C. for 6 hours. The results are shown in Table 17.

TABLE 17

| Filling Density (g/cc) | 0.75 | 1.00 | 1.25 | 1.50 | 1.75 | 2.00 |
|---|---|---|---|---|---|---|
| Density relative to True Density (%) | 16.6 | 22.2 | 27.7 | 33.3 | 38.8 | 44.3 |
| Filling Density/True Density | 1.00 | 1.34 | 1.67 | 2.01 | 2.34 | 2.67 |
| Filling Method | N | NV | NVP | NVP | NVP | NVP |
| Maximum Unit Weight of Green Compacts (g) | 0.98 | 1.20 | 1.49 | 1.79 | 2.09 | 2.39 |
| Range of Unit Weight | 0.80 | 1.21 | 1.48 | 1.78 | 2.08 | 2.40 |
| Minimum Unit Weight of Green Compacts (g) | 0.18 | 0.01 | 0.01 | 0.01 | 0.01 | 0.01 |
| Cracks and Crazings | C | B | A | A | A | A |
| Deformation | C | B | A | A | A | A |
| Density of Sintered Compact/True Density (%) | — | 96 | 96 | 96 | 96 | 96 |

EXAMPLE 18

Figure 60:
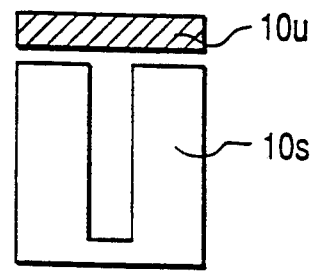
FIG. 60 is a drawing of the rubber mold used in Example 18.

The rubber mold shown in FIG. 60 was used. The cover 10u consisted of hard rubber (hardness 90). The side wall 10s with integral bottom consisted of soft rubber (hardness 40). The dimensions of the die cavity of the rubber mold were 47 mm in inner diameter and 17 mm in height. The fine powders used, compacting pressure and sintering conditions were as follows.

(1) Fe-2 wt % Si (average particle diameter-10 μm, the true density-7.7 g/cc)
 Compacting pressure-1.0 t/cm²
 Sintering temperature-1200° C.
 Sintering time: 6 hours (Table 18)

(2) Fe-0.3 wt % C (water-atomized then reduction by hydrogen. Average particle diameter-20 μm, the true density-7.8 g/cc)
 Compacting pressure-1.0 t/cm²
 Sintering temperature-1200° C.
 Sintering time: 6 hours (Table 19)

(3) Fe-0.3 wt % C (water-atomized then reduction by hydrogen. Average particle diameter-20 μm, the true density-7.8 g/cc)
 Compacting pressure-1.0 t/cm²
 Sintering temperature-1200° C.
 Sintering time: 6 hours (Table 20)

(4) Fe-42 wt % Ni (atomized powder, average particle diameter-30 μm, the true density-9.1 g/cc)
 Compacting pressure-1.0 t/cm²
 Sintering temperature-1200° C.
 Sntering time: 6 hours (Table 21)

(5) Fe-42 wt % Ni (atomized powder, average particle diameter-10 μm, the true density-8.1 g/cc)
 Compacting pressure-1.0 t/cm²
 Sintering temperature-1200° C.
 Sintering time: 6 hours (Table 22)

(6) Ti (hydrogenated and then decomposed powder, average particle diameter-10 μm, the true density-4.5 g/cc)
 Compacting pressure-1.0 t/cm²
 Sintering temperature-1150° C.
 Sintering time: 6 hours (Table 23)

(7) Al for sintering (atomized powder, average particle diameter-10 μm, the true density-2.7 g/cc)
 Compacting pressure-1.0 t/cm²
 Sintering temperature-600° C.
 Sntering time: 6 hours (Table 24)

TABLE 18

| Filling Density (g/cc) | 2.30 | 2.60 | 2.90 | 3.20 | 3.50 | 3.80 |
|---|---|---|---|---|---|---|
| Density relative to True Density (%) | 29.9 | 33.7 | 33.7 | 41.6 | 45.5 | 49.4 |

TABLE 18-continued

| Filling Density/True Density | 1.00 | 1.13 | 1.26 | 1.39 | 1.52 | 1.65 |
|---|---|---|---|---|---|---|
| Filling Method | N | NV | NVP | NVP | NVP | NVP |
| Maximum Unit Weight of Green Compacts (g) | 0.641 | 0.639 | 0.714 | 0.785 | 0.861 | 0.934 |
| Minimum Unit Weight of Green Compacts (g) | 0.483 | 0.634 | 0.708 | 0.780 | 0.857 | 0.928 |
| Range of Unit Weight | 0.158 | 0.005 | 0.006 | 0.005 | 0.004 | 0.006 |
| Cracks and Crazings | C | C | B | B | A | A |
| Deformation | C | C | B | A | A | A |
| Density of Sintered Compact/True Density (%) | — | — | 98 | 98 | 98 | 98 |

TABLE 19

| Filling Density (g/cc) | 2.45 | 2.75 | 3.05 | 3.35 | 3.65 | 3.95 |
|---|---|---|---|---|---|---|
| Density relative to True Density (%) | 31.4 | 35.3 | 39.1 | 42.6 | 46.8 | 50.6 |
| Filling Density/True Density | 1.00 | 1.12 | 1.25 | 1.37 | 1.49 | 1.61 |
| Filling Method | N | NV | NVP | NVP | NVP | NVP |
| Maximum Unit Weight of Green Compacts (g) | 0.637 | 0.675 | 0.750 | 0.822 | 0.896 | 0.969 |
| Minimum Unit Weight of Green Compacts (g) | 0.563 | 0.671 | 0.745 | 0.817 | 0.892 | 0.963 |
| Range of Unit Weight | 0.074 | 0.004 | 0.005 | 0.005 | 0.004 | 0.006 |
| Cracks and Crazings | C | C | C | B | A | A |
| Deformation | C | C | B | A | A | A |
| Density of Sintered Compact/True Density (%) | — | — | — | 92 | 92 | 92 |

TABLE 20

| Filling Density (g/cc) | 2.20 | 2.50 | 2.80 | 3.10 | 3.40 | 3.70 |
|---|---|---|---|---|---|---|
| Density relative to True Density (%) | 28.2 | 32.1 | 35.9 | 39.7 | 43.6 | 47.4 |
| Filling Density/True Density | 1.00 | 1.14 | 1.27 | 1.41 | 1.55 | 1.68 |
| Filling Method | N | NV | NVP | NVP | NVP | NVP |
| Maximum Unit Weight of Green Compacts (g) | 0.640 | 0.615 | 0.689 | 0.762 | 0.836 | 0.910 |
| Minimum Unit Weight of Green Compacts (g) | 0.477 | 0.609 | 0.684 | 0.765 | 0.830 | 0.903 |
| Range of Unit Weight | 0.162 | 0.006 | 0.005 | 0.007 | 0.006 | 0.007 |
| Cracks and Crazings | C | C | B | B | A | A |
| Deformation | C | C | B | A | A | A |
| Density of Sintered Compact/True Density (%) | — | — | 97 | 97 | 97 | 97 |

TABLE 21

| Filling Density (g/cc) | 2.60 | 2.90 | 3.20 | 3.50 | 3.80 | 4.10 |
|---|---|---|---|---|---|---|
| Density relative to True Density (%) | 32.1 | 35.8 | 39.5 | 43.2 | 46.9 | 50.6 |
| Filling Density/True Density | 1.00 | 1.12 | 1.23 | 1.35 | 1.46 | 1.58 |
| Filling Method | N | NV | NV | NVP | NVP | NVP |
| Maximum Unit Weight of Green Compacts (g) | 0.674 | 0.714 | 0.788 | 0.860 | 0.934 | 1.008 |
| Minimum Unit Weight of Green Compacts (g) | 0.600 | 0.708 | 0.781 | 0.854 | 0.926 | 1.002 |
| Range of Unit Weight | 0.074 | 0.006 | 0.007 | 0.006 | 0.008 | 0.006 |
| Cracks and Crazings | C | C | B | B | A | A |
| Deformation | C | C | B | A | A | A |
| Density of Sintered Compact/True Density (%) | — | — | 95 | 95 | 95 | 95 |

TABLE 22

| Filling Density (g/cc) | 2.35 | 2.65 | 2.95 | 3.25 | 3.55 | 3.85 |
|---|---|---|---|---|---|---|
| Density relative to True Density (%) | 29.0 | 32.7 | 36.4 | 40.1 | 43.8 | 47.5 |
| Filling Density/True Density | 1.00 | 1.13 | 1.26 | 1.38 | 1.51 | 1.64 |

TABLE 22-continued

| Filling Method | N | NV | NVP | NVP | NVP | NVP |
|---|---|---|---|---|---|---|
| Maximum Unit Weight of Green Compacts (g) | 0.646 | 0.652 | 0.726 | 0.799 | 0.874 | 0.947 |
| Minimum Unit Weight of Green Compacts (g) | 0.510 | 0.657 | 0.720 | 0.793 | 0.867 | 0.939 |
| Range of Unit Weight | 0.136 | 0.005 | 0.005 | 0.006 | 0.007 | 0.008 |
| Cracks and Crazings | C | C | C | B | A | A |
| Deformation | C | C | B | A | A | A |
| Density of Sintered Compact/True Density (%) | — | — | — | 98 | 98 | 98 |

TABLE 23

| Filling Density (g/cc) | 0.70 | 1.00 | 1.30 | 1.60 | 1.90 | 2.20 |
|---|---|---|---|---|---|---|
| Density relative to True Density (%) | 15.5 | 22.2 | 28.8 | 35.5 | 42.1 | 48.8 |
| Filling Density/True Density | 1.00 | 1.43 | 1.86 | 2.29 | 2.72 | 3.15 |
| Filling Method | N | NV | NVP | NVP | NVP | NVP |
| Maximum Unit Weight of Green Compacts (g) | 0.245 | 0.247 | 0.320 | 0.394 | 0.468 | 0.542 |
| Minimum Unit Weight of Green Compacts (g) | 0.123 | 0.244 | 0.317 | 0.390 | 0.464 | 0.539 |
| Range of Unit Weight | 0.122 | 0.003 | 0.003 | 0.004 | 0.004 | 0.003 |
| Cracks and Crazings | C | C | C | B | A | A |
| Deformation | C | C | B | A | A | A |
| Density of Sintered Compact/True Density (%) | — | — | — | 96 | 96 | 96 |

TABLE 24

| Filling Density (g/cc) | 0.50 | 0.70 | 0.90 | 1.10 | 1.30 | 1.50 |
|---|---|---|---|---|---|---|
| Density relative to True Density (%) | 18.5 | 25.9 | 33.3 | 40.7 | 48.1 | 55.6 |
| Filling Density/True Density | 1.00 | 1.40 | 1.80 | 2.20 | 2.60 | 3.01 |
| Filling Method | N | NV | NVP | NVP | NVP | NVP |
| Maximum Unit Weight of Green Compacts (g) | 0.159 | 0.172 | 0.222 | 0.271 | 0.319 | 0.368 |
| Minimum Unit Weight of Green Compacts (g) | 0.100 | 0.171 | 0.221 | 0.270 | 0.318 | 0.367 |
| Range of Unit Weight | 0.059 | 0.001 | 0.001 | 0.001 | 0.001 | 0.001 |
| Cracks and Crazings | C | B | A | A | A | A |
| Deformation | C | B | B | A | A | A |
| Density of Sintered Compact/True Density (%) | — | — | 95 | 95 | 95 | 95 |

EXAMPLE 19

The fine powders of various materials, whose average particle diameter (μm) was varied, were filled into the same rubber mold as in Example 18 by the method NV of Example 16. A guide frame, a vibrator and a pusher were used for the filling. The filling density is shown in Table 25. The compacting (GDP) and sintering were carried out under the same conditions as in Example 17, except for the Fe-45% Co powder which was compacted and sintered under the conditions in Example 23, below.

For the comparison purpose, the above fine powders were die-pressed (DP) by using a die, whose dimensions were adjusted so that a green compact having the same size as the one formed by the rubber mold was obtained. However, the filling of the fine powder into the die was impossible because the fine powder had a very poor flowability. The coarse powders shown in Table 25 were therefore naturally filled and then compacted at a pressure of 1.5 t/cm². The sintering was carried out under the same conditions for the fine powders. The filling density and the density of sintered compacts are shown in Table 25.

TABLE 25

| Materials | Particle Diameter | Compacting Method | Filling Density (g/cc) | Density of Sintered compact (%) |
|---|---|---|---|---|
| Fe-0.3 wt % C | 12 | GDP | 3.40 | 97 |
| | 20 | GDP | 3.65 | 93 |
| | 60 | DP | 3.05 | 86 |
| Fe-2 wt % Si | 12 | GDP | 3.50 | 98 |
| | 75 | DP | 2.90 | 87 |
| Fe-45 wt % Co | 15 | GDP | 3.70 | 94 |
| | 80 | DP | 3.10 | 85 |
| Fe-42 wt % Ni | 12 | GDP | 3.55 | 98 |
| | 70 | DP | 2.95 | 86 |
| Al | 10 | GDP | 1.30 | 95 |
| | 80 | DP | 0.80 | 85 |
| Ti | 10 | GDP | 1.90 | 96 |
| | 60 | DP | 1.50 | 87 |

EXAMPLE 20

Figure 61:
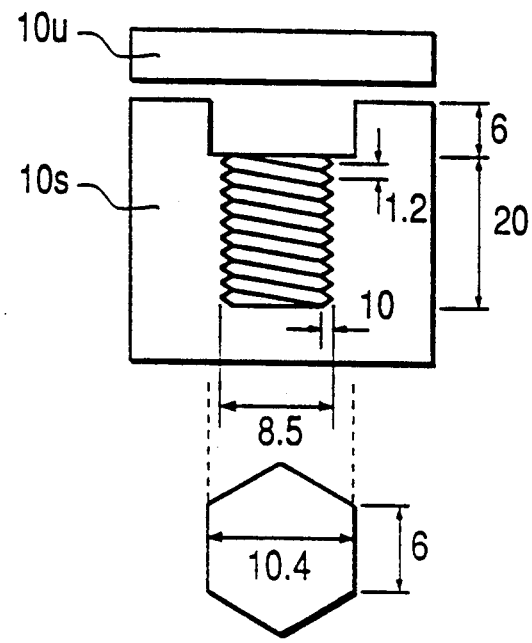
FIG. 61 is a drawing of the rubber mold used in Example 20.

The rubber mold shown in FIG. 61 was used to produce a green compact in the form of a screw. The cover 10u and side wall 10s consisted of soft rubber (JIS A hardness 40). The powders used were atomized Fe-2 wt % Si powder (average particle diameter-10 μm, the true density-7.7 g/cc, in Table 26), and the hydrogenated and then decomposed Ti powder (average diameter-10 um, true density-4.5 g/cc, in Table 27). The former powder was subjected to compacting at a pressure of 1.2 t/cm$^2$ and sintering temperature at 1150° C. for 6 hours. The latter powder was subjected to compacting at a pressure of 1.4 t/cm$^2$ and sintering temperature of 1150° C. for 6 hours. The results are shown in Tables 26 and 27.

When each of the two kinds of powder was naturally filled and compacted, the top of the thread were particularly seriously damaged. The screws broke between the screw head and the screws.

TABLE 26

| | | | | | | |
|---|---|---|---|---|---|---|
| Filling Density (g/cc) | 2.40 | 2.70 | 3.00 | 3.30 | 3.60 | 3.90 |
| Density relative to True Density (%) | 31.1 | 35.1 | 39.0 | 42.9 | 46.8 | 50.6 |
| Filling Density/True Density | 1.00 | 1.13 | 1.25 | 1.38 | 1.50 | 1.63 |
| Filling Method | N | NV | NVP | NVP | NVP | NVP |
| Maximum Unit Weight of Green Compacts (g) | 3.00 | 3.11 | 3.45 | 3.79 | 4.14 | 4.47 |
| Minimum Unit Weight of Green Compacts (g) | 2.40 | 3.10 | 3.44 | 3.78 | 4.12 | 4.45 |
| Range of Unit Weight | 0.60 | 0.01 | 0.01 | 0.01 | 0.02 | 0.02 |
| Cracks and Crazings | C | C | C | B | A | A |
| Deformation | C | C | B | A | A | A |
| Density of Sintered Compact/True Density (%) | — | — | — | 98 | 98 | 98 |

TABLE 27

| | | | | | | |
|---|---|---|---|---|---|---|
| Filling Density (g/cc) | 1.00 | 1.25 | 1.50 | 1.75 | 2.00 | 2.25 |
| Density relative to True Density (%) | 22.2 | 27.7 | 33.3 | 38.8 | 44.3 | 49.9 |
| Filling Density/True Density | 1.00 | 1.25 | 1.50 | 1.75 | 2.00 | 2.25 |
| Filling Method | N | NV | NVP | NVP | NVP | NVP |
| Maximum Unit Weight of Green Compacts (g) | 1.05 | 1.09 | 1.31 | 1.53 | 1.74 | 1.96 |
| Minimum Unit Weight of Green Compacts (g) | 0.70 | 1.08 | 1.30 | 1.52 | 1.73 | 1.95 |
| Range of Unit Weight | 0.35 | 0.01 | 0.01 | 0.01 | 0.01 | 0.01 |
| Cracks and Crazings | C | C | C | C | A | A |
| Deformation | C | C | C | B | A | A |
| Density of Sintered Compact/True Density (%) | — | — | — | — | 96 | 96 |

EXAMPLE 21

Figure 62A:
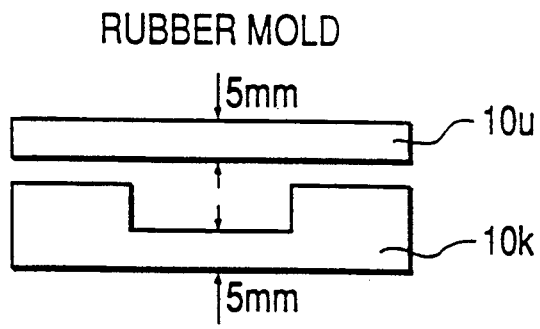
FIG. 62 is a drawing of the rubber mold used in Example 21.
Figure 62B:
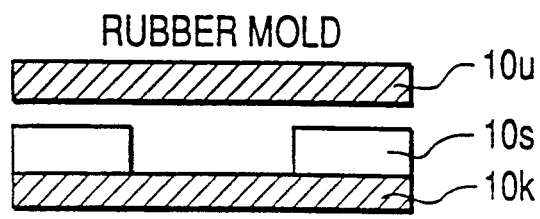

The rubber molds A and B shown in FIG. 62 were used to compact the Fe-45 wt % Co fine powder (average particle diameter-12 μm) to a filling density of 3.70 g/cc. The dimensions of the die cavity were 30×30×3 mm for every mold. The entire (10u, k) of the rubber mold A consisted of soft rubber (hardness 40). The side wall 10s of the rubber mold B consisted of the soft rubber mentioned above, while the other portions 10u, k consisted of hard rubber (hardness 90). The fine powder was preliminarily weighed and was then naturally filled in the rubber molds using a guide frame. Then, the forced filling was carried out by utilizing vibration and pushing.

Compacting was repeated ten times under the compacting pressure of 1.0 t/cm$^2$. Every green compact produced by using the rubber mold A cracked, while every green compact produced by using the rubber mold B did not crack and attained excellent shaping.

EXAMPLE 22

Figure 63A:
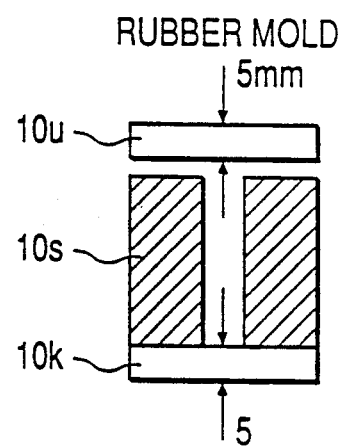
FIG. 63 is a drawing of the rubber mold used in Example 22.
Figure 63B:
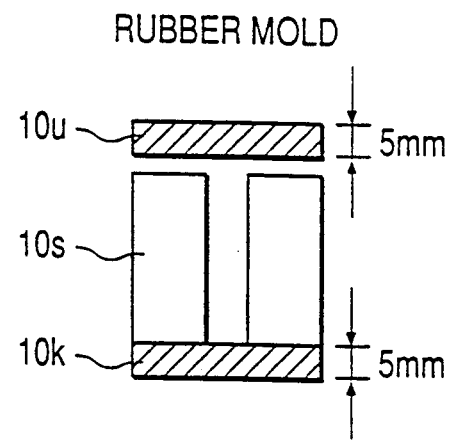

The method of Example 20 was carried out for using the rubber molds shown in FIG. 63.

| | Rubber Mold A | Rubber Mold B |
|---|---|---|
| Cover | soft rubber (JIS A hardness 40) | hard rubber (JIS A hardness 80) |
| Side wall | hard rubber (hardness 80) | soft rubber (hardness 40) |
| Bottom | soft rubber (hardness 40) | hard rubber (hardness 80) |

Every green compact produced by using the rubber mold B cracked, while every green compact produced by using the rubber mold did not crack and attained excellent shaping.

EXAMPLE 23

Figure 64A:
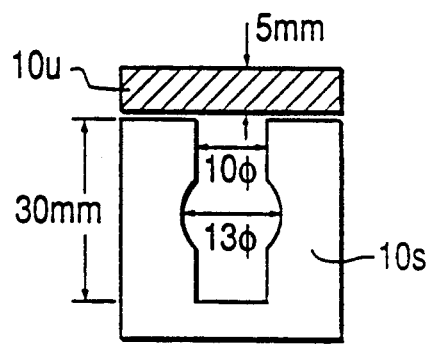
FIGS. 64(A), (B) and (C) are drawings of the rubber mold used in Example 23.
Figure 64B:
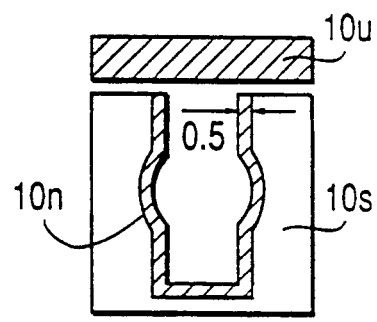
Figure 64C:
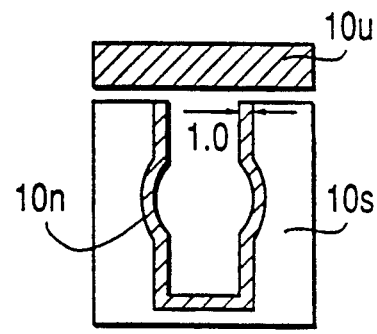

The rubber molds shown in FIGS. 64(A) through (C) were used to compact the atomized aluminum powder (average particle diameter-30 μm).
Rubber mold (A)
 Cover—hard rubber (hardness 90)
 Side wall—soft rubber (hardness 40)
 inner coating (10n)—no
Rubber mold (B)
 Cover—hard rubber (hardness 80)
 Side wall—soft rubber (hardness 40)
 inner coating (10n)—Polytetrafluoroethylene
Rubber mold (C)
 Cover—hard rubber (hardness 80)
 Side wall—soft rubber (hardness 40)
 inner coating (10n)—soft rubber, in which 40% of MoS$_2$ is blended (t=1 mm)

During the powder compaction using Rubber mold (A), the green compact was seized by the rubber mold, and the green compact could not be removed from the rubber mold, even by turning the rubber mold upside down and applying pressure of 1.0 kg/cm$^2$ of pressurized air into the rubber mold. No seizure occurred in the cases of Rubber molds B and C at all. The green compacts could easily be removed from the rubber molds by turning upside down the rubber molds and then expanding them, allowing the compacts to fall out.

EXAMPLE 24

Figure 65A:
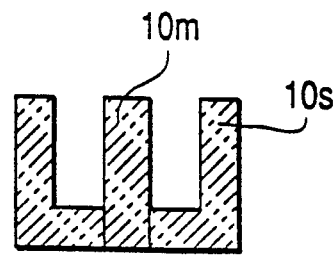
FIGS. 65(A), (B) and (C) are drawings of the rubber mold used in Example 24.
Figure 65B:
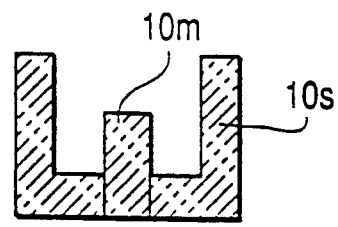
Figure 65C:
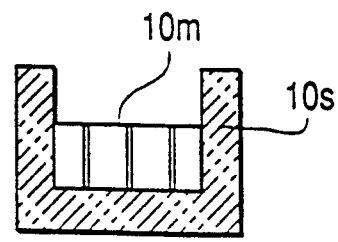

The rubber molds shown in FIGS. 65(A), (B) and (C) were used to compact the fine Fe-2 wt % Si powder (average particle diameter 12 μm). The compacting pressure was 1 t/cm². The generation of cracks in relation to the material of mandrel was investigated.

Rubber Mold (A)
  Outer diameter—33 mm
  Inner diameter—24 mm
  Height—18 mm
  Mandrel m—12 mm in outer diameter and 15 mm in height (at the setting)
Rubber Mold (B)
  Outer diameter—33 mm
  Inner diameter—24 mm
  Height—18 mm
  Mandrel m—12.5 mm in outer diameter and 7.5 mm in height (at the setting)
Rubber Mold (A)
  Outer diameter—33 mm
  Inner diameter—24 mm
  Height—18 mm
  Mandrel m—eight radially arranged blades, each 1.5 mm in thickness, 7.5 mm in height
Number of cracks are shown in Table 28.

TABLE 28

| Hardness of mandrels | Rubber Molds | | |
|---|---|---|---|
| | (A) | (B) | (C) |
| 40 (soft rubber) | 10 | 10 | 10 |
| 90 (hard rubber) | 0 | 1 | 2 |
| Metal | 0 | 0 | 0 |

EXAMPLE 25

High purity Al and high purity Li were blended to provide an alloy composition of Al-2.84 wt % Li and was then melted in a Ar atmosphere. The melt was atomized by Ar gas to provide the fine powder of Al-Li alloy having average particle diameter of 8 μm. This powder subjected to the production of green compacts by the circulating type apparatus illustrated in FIG. 39. The rubber mold was a hollw type made of hard urethane resin (hardness 60) and 30 mm in inner diameter and 10 mm in height. When the entire apparatus was exposed to the ambient air, the ignition of the powder so frequently occurred that the powder compacting was impossible. When the circular die 40 was located in the chamber, in which argon gas was filled, the powder compacting became possible.

We claim:

1. A production method for producing a green magnet compact, comprising:
   preparing a rubber mold which comprises rubber in at least a side portion thereof and which is located outside a die-press machine;
   filling a cavity in the rubber mold with a magnet powder to a density which is at least 1.2 times a natural filling density of the magnet powder, by means of vibrations pressing the magnet powder with pushing or both;
   placing the filled rubber mold in the die-press machine; and
   compacting the filled rubber mold and the magnet powder therein by a punch in the die-press machine under a magnetic field to obtain a green compact of the magnet powder;
   wherein the natural filling density is obtained by allowing the magnet powder to fall under gravity from a powder pan into the rubber mold until the top of the magnet powder arrives at an upper frame which prevents the magnet powder from overflowing the rubber mold, the distance between a bottom end of the powder pan and the bottom of the rubber mold being 3.7 times the depth of the cavity of the rubber mold.

2. A production method for producing a green magnet compact according to claim 1, wherein the magnet powder is filled under gravity and by a vibrator, on which the rubber mold is placed.

3. A production method for producing a green magnet compact according to claim 1, wherein the magnet powder is filled under gravity and by a pusher which pushes the magnet powder filled under gravity.

4. A production method for producing a green magnet compact according to claim 1, the magnet powder is preliminarily weighed and then filled under gravity into the rubber mold, which has a guide frame on the upper surface of the rubber mold, until the magnet powder stacks higher than the upper surface of the rubber mold.

5. A production method for producing a green magnet compact according to claim 1, a feeder box for feeding the magnet powder is located on the rubber mold, and the magnet powder is stirred by a rotary blade mounted in the feeder box to fill the magnet powder into the rubber mold.

6. A production method for producing a green magnet compact according to claim 1, wherein the green magnet compact is sabsequently subjected to sintering.

7. A production method for producing a green magnet compact according to claim 1, wherein resin is filled together with the magnet powder at the high density.

8. A production method for producing a green magnet compact according to claim 1, wherein upper and lower peripheral edges of the inner wall of the rubber mold are tapered.

9. A production method for producing a green magnet compact according to claim 1, wherein the rubber mold has at least one of the top and bottom harder than said side portion.

10. A production method for producing a green magnet compact according to claim 1, wherein the rubber mold comprising at least a top and bottom, in which at least one of the top and the bottom has a thickness (t, units-mm) defined by $t \leq 16h/D$ (h is thickness of a green compact, and D is a positive square root of cross-sectional area of the green compact).

11. A production method for producing a green magnet compact according to claim 1, wherein the rubber mold comprises a mandrel which is harder than the other portions of the rubber mold.

12. A production method for producing a green magnet compact according to claim 1, wherein the rubber mold is open at the top thereof or at the bottom thereof, and the open portion of the rubber mold is directly pressed by a punch of the die-press machine.

13. A production method for producing a green magnet compact according to claim 1, 2, 3, 4, 5, 6, 7, 8, 9, 10, 11, 12, wherein the magnet powder is rare-earth magnet powder and is filled to a density of 1.78 times or more the natural filling density.

14. A production method for producing a green magnet compact according to claim 1, 2, 3, 4, 5, 6, 7, 8, 9, 10, 11, or 12, wherein the magnet powder is ferrite powder and is filled to a density of 1.67 times or more the natural filling density.

15. A production method for producing a green magnet compact, comprising:
    preparing a rubber mold which comprises rubber in at least a side portion thereof and which is located outside a die-press machine;
    preliminarily compacting a magnet powder to a density which is at least 1.2 times a natural filling density of the magnet powder;
    inserting the preliminary compact of the magnet powder in the rubber mold outside the die-press machine;
    placing the filled rubber mold in the die-press machine; and
    compacting the filled rubber mold and the magnet powder therein by a punch in the die-press machine under a magnetic field to obtain a green compact of the magnet powder;
    wherein the natural filling density is obtained by allowing the magnet powder to fall under gravity from a powder pan into the rubber mold until the top of the magnet powder arrives at an upper frame which prevents the magnet powder from overflowing the rubber mold, the distance between a bottom end of the powder pan and the bottom of the rubber mold being 3.7 times the depth of the cavity of the rubber mold.

16. A production method for producing a green magnet compact according to claim 15, wherein the magnet powder is compacted under a pressure of 15 to 1000 kg/cm$^2$.

17. A production method for producing a green magnet compact according to claim 15, wherein the preliminary compacting is carried out by using a punch and a die provided with a retractable bottom, and the precompact is fallen into the rubber mold by retracting the retractable bottom.

18. A production method for producing a green magnet compact according to claim 15, wherein the green magnet compact is subsequently subjected to sintering.

19. A production method for producing a green magnet compact according to claim 15, wherein resin is precompacted together with the magnet powder at the high density.

20. A production method for producing a green magnet compact according to claim 15, wherein upper and lower peripheral edges of the inner wall of the rubber mold are tapered.

21. A production method for producing a green magnet compact according to claim 1, wherein the rubber mold has at least one of the top and bottom harder than said side portion.

22. A production method for producing a green magnet compact according to claim 15, wherein the rubber mold comprising at least a top and bottom, in which at least one of the top and the bottom has a thickness (t, unit-mm) defined by $t \leq 16h/D$ (h is thickness of a green compact, and D is a positive square root of cross-sectional area of the green compact).

23. A production method for producing green magnet compact according to claim 15, wherein the rubber mold comprises a mandrel which is harder than the other portions of the rubber mold.

24. A production method for producing a green magnet compact according to claim 15, wherein the rubber mold is open at the top thereof or at the bottom thereof, and the open portion of the rubber mold is directly pressed by a punch of the die-press machine.

25. A production method for producing a green magnet compact according to claim 15, 16, 17, 18, 19, 20, 21, 22, 23, or 24, wherein the magnet powder is a rare-earth magnet powder and is filled to a density of 1.78 times or more the natural filling density.

26. A production method for producing a green magnet compact according to claim 15, 16, 17, 18, 19, 20, 21, 22, 23, or 24, wherein the magnet powder is ferrite powder and is filled to a density of 1.67 times or more the natural filling density.

27. A production method for producing a green magnet compact according to claim 1, 2, 3, 4, 5, 6, 7, 8, 9, 10, 11, 12, 13, 14, 15, 16, 17, 18, 21, 22, 23, or 24, further comprising the steps of covering the upper open portion of the rubber mold with a cover; and, subsequently, prior to the compacting step in the die-press machine, applying an instantaneous magnetic field or static magnetic field more than 8 kOe to the magnet powder in the rubber mold covered with the cover.

28. A production method for producing a green magnet compact according to claim 27, wherein the magnet powder is rare-earth magnet powder and is filled to a density of 1.78 times or more the natural filling density.

29. A production method for producing a green magnet compact according to claim 27, wherein the magnet powder is ferrite powder and is filled to a density of 1.67 times or more the natural filling density.

30. A production method for producing a green magnet compact, comprising:
    preparing a rubber mold which comprises rubber in at least a side portion thereof and which is located outside a die-press machine;
    filling a cavity in the rubber mold with a magnet powder to a density which is at least 1.2 times a natural filling density of the magnet powder, by means of vibration, pressing the magnet powder with pushing or both;
    covering an upper open part of the rubber mold with a cover;
    applying an instantaneous magnetic field or stronger magnetic field more than 8 kOe to the magnet powder in the rubber mold;
    placing the filled rubber mold in the die-press machine; and
    compacting the filled rubber mold and the magnet powder therein by a punch in the die-press machine without a magnetic field;
    wherein the natural filling density is obtained by allowing the magnet powder to fall under gravity from a powder pan into the rubber mold until the top of the magnet powder arrives at an upper frame which prevents the magnet powder from overflowing the rubber mold, the distance between a bottom end of the powder pan and the bottom of the rubber mold being 3.7 times the depth of the cavity of the rubber mold.

31. A production method for producing a green magnet compact according to claim 30, wherein the magnet powder is filled under gravity and by a vibrator, on which the rubber mold is placed.

32. A production method for producing a green magnet compact according to claim 30, wherein the magnet powder is filled under gravity and by a pusher which pushes the magnet powder filled under gravity.

33. A production method for producing a green magnet compact according to claim 30, the magnet powder is preliminarily weighed and then filled under gravity into the rubber mold, which has a guide frame on the upper surface of the rubber mold, until the magnet powder stacks higher than the upper surface of the rubber mold.

34. A production method for producing a green magnet compact according to claim 30, a feeder box for feeding the magnet powder is located on the rubber mold, and the magnet powder is stirred by a rotary blade mounted in the feeder box to fill the magnet powder into the rubber mold.

35. A production method for producing a green magnet compact according to claim 30, wherein a feeder box for feeding the magnet powder is located on the rubber mold, and the magnet powder is stirred by a reciprocating blade mounted in the feeder box to fill the magnet powder into the rubber mold.

36. A production method for producing a green magnet compact according to claim 30, wherein a feeder box for feeding the magnet powder is located on the rubber mold, and the magnet powder is vibrated by a vibrator mounted in the feeder box to fill the magnet powder into the rubber mold.

37. A production method for producing a green magnet compact according to claim 30, wherein the magnet powder is conveyed by a conveyor, on whose lower side a vibrator is slidably attached to fill the magnet powder into the rubber mold at the high density.

38. A production method for producing a green magnet compact according to claim 30, wherein a screw rod, around which blades are spirally secured, is coaxially mounted in a container, and, the magnet powder is stirred in the container to enhance its density and is then dropped into the rubber mold.

39. A production method for producing a green magnet compact according to claim 30, wherein the magnet powder is conveyed by a conveyor, on whose both sides rolls are located to press the magnet powder, and the densified magnet powder is dropped into the rubber mold.

40. A production method for producing a green magnet compact according to claim 30, wherein the magnet powder is filled into the rubber mold under gravity and magnetic field.

41. A production method for producing a green magnet compact according to claim 30, wherein the green magnet compact is subsequently subjected to sintering.

42. A production method for producing a green magnet compact according to claim 30, wherein resin is filled together with the magnet powder at the high density.

43. A production method for producing a green magnet compact according to claim 30, wherein upper and lower peripheral edges of the inner wall of the rubber mold are tapered.

44. A production method for producing a green magnet compact according to claim 30, wherein the rubber mold has at least one of the top and bottom harder than said side portion.

45. A production method for producing a green magnet compact according to claim 30 wherein the rubber mold comprises at least a top and bottom, in which at least one of the top and the bottom has a thickness (t, units-mm) defined by $t \leq 16h/D$ (h is thickness of a green compact, and D is a positive square root of cross-sectional area of the green compact).

46. A production method for producing a green magnet compact according to claim 30, wherein the rubber mold comprises a mandrel which is harder than the other portions of the rubber mold.

47. A production method for producing a green magnet compact according to claim 30, 31, 32, 33, 34, 35, 36, 37, 38, 39, 40, 41, 42, 43, 44, 45, or 46 wherein the magnet powder is rare-earth magnet powder and is filled to a density of 1.78 times or more the natural filling density.

48. A production method for producing a green magnet compact according to claim 30, 31, 32, 33, 34, 35, 36, 37, 38, 39, 40, 42, 42, 43, 44, 45, or 46 wherein the magnet powder is ferrite powder and is filled to a density of 2.41 times or more the natural filling density.

49. A production method for producing a green magnet compact, comprising:
preparing a rubber mold which comprises rubber in at least a side portion thereof and which is located outside a die-press preliminarily compacting a magnet powder to a density which is at least 1.2 times a natural filling density of the magnet powder;
inserting the prliminary compact of the magnet powder in the rubber mold outside the die-press machine;
covering an upper open part of the rubber mold with a cover;
applying an instantaneous magnetic field or stronger magnetic field than 8kOe to the magnet powder in the rubber mold;
placing the filled rubber mold in the die-press machine; and
compacting the filled rubber mold and the magnet powder therein by a punch in the die-press machine without a magnetic field or under a magnetic field to obtain a green compact of the magnet powder;
wherein the natural filling density is obtained by allowing the magnet powder to fall under gravity from a powder pan into the rubber mold until the top of the magnet powder arrives at an upper frame which prevents the magnet powder from overflowing the rubber mold, the distance between a bottom end of the powder pan and the bottom of the rubber mold being 3.7 times the depth of the cavity of the rubber mold.

50. A production method of a green magnet compact according to claim 49, wherein the magnet powder is compacted under a pressure of from 15 to 1000 kg/cm$^2$.

51. A production method of a green magnet compact according to claim 49 wherein the preliminary compacting is carried out by using a punch and a die provided with a retractable bottom, and the precompact is dropped into the rubber mold by retracting retractable bottom.

52. A production method of a green magnet compact according to claim 2, 3, 4, 3, 6, 7, 8, 9, 10, 11, 12, 13, 14, 15, 16, 17, 18, 21, 22, 23, 24, 25, 26, 27, 28, 29, 30, 36, 37, 38, 39, 40, 41, 42, 43, 44, 45, 46, 47, 48, 49, 50, or 51, wherein a back-up plate, consisting of harder elastic material than the rubber mold, is located between the rubber mold and one or both of the upper and lower punches.

53. A production method of a green magnet compact according to claim 52, wherein the magnet powder is rare-earth magnet powder and is filled to a density of 1.78 times or more the natural filling density.

54. A production method of a green magnet compact according to claim 52, wherein the magnet powder is ferrite powder and is filled to a density of 2.41 times or more the natural filling density.

55. A production method of a green magnet compact according to claim 1, 2, 3, 4, 5, 6, 7, 8, 9, 10, 11, 12, 13, 14, 15, 16, 17, 18, 19, 21, 22, 23, 24, 25, 26, 27, 28, 29, 30, 36, 37, 38, 39, 40, 41, 42, 43, 44, 45, 46, 47, 48, 49, 50, or 51, wherein the magnet powder contains a rare-earth element, and is filled or precompacted in the rubber mold under an inert gas atomsphere.

56. A production method of a green magnet compact according to claim 55, wherein the magnet powder is rare-earth magnet powder and is filled to a density of 1.78 times or more the natural filling density.

57. A production method of a green magnet compact according to claim 55, wherein the magnet powder is ferrite powder and is filled to a density of 2.41 times or more the natural filling density.

58. A production method of a green magnet compact, characterized by repeatedly carrying out:
preparing a rubber mold which comprises rubber in at least a side portion thereof and which is located outside a die-press machine;
filling a cavity in the rubber mold with a magnet powder to a density at least 1.2 times a natural filling density of the magnet powder, by means of vibration, pressing the magnet powder with a pushing or both;
covering an upper open portion of the rubber mold with a cover;
applying instantaneous magnetic field or stronger static magnetic field than 8kOe to the magnet powder in the rubber mold;
placing the filled rubber mold in the die-press machine; and
compacting the filled rubber mold and the magnet powder therein by a punch in the die-press machine under a magnetic field or without a magnetic field to obtain a green compact of the magnet powder;
wherein the natural filling density is obtained by allowing the magnet powder to fall under gravity from a powder pan into the rubber mold until the top of the magnet powder arrives at an upper frame which prevents the magnet powder from overflowing the rubber mold, the distance between a bottom end of the powder pan and the bottom of the rubber mold being 3.7 times the depth of the cavity of the rubber mold.

59. A production method of a green magnet compact according to claim 58, wherein the magnet powder is rare-earth magnet powder and is filled to a density of 1.78 times or more the natural filling density.

60. A production method of a green magnet compact according to claim 58 wherein the magnet powder is ferrite powder and is filled to a density of 2.41 times or more the natural filling density.

61. A production method of a green magnet compact, comprising repeatedly carrying out:
preparing a rubber mold which comprises rubber in at least a side portion thereof and which is located outside a die-press machine;
preliminarily compacting a magnet powder to a density at least 1.2 times a natural filling density of the magnet powder, by means of vibration, pressing the magnet powder with a pushing or both;
inserting the preliminary compact of the magnet powder in the rubber mold outside the die-press machine;
covering an upper open portion of the rubber mold with a cover;
applying instantaneous magnetic field or stronger magnetic field than 8kO3 to the magnet powder in the rubber mold;
placing the filled rubber mold in the die-press machine; and
compacting the filled rubber mold and the magnet powder therein by a punch in the die-press machine under a magnetic field or without a magnetic field to obtain a green compact of the magnet powder;
wherein the natural filling density is obtained by allowing the magnet powder to fall under gravity from a powder pan into the rubber mold until the top of the magnet powder arrives at an upper frame which prevents the magnet powder from overflowing the rubber mold, the distance between a bottom end of the powder pan and the bottom of the rubber mold being 3.7 times the depth of the cavity of the rubber mold.

62. A production method of a green magnet compact according to claim 61, wherein the magnet powder is rare-earth magnet powder and is filled to a density of 1.78 times or more the natural filling density.

63. A production method of a green magnet compact according to claim 61, wherein the magnet powder is ferrite powder and is filled to a density of 2.41 times or more the natural filling density.

64. A production method of a green magnet compact according to claim 61, 62 or 63, wherein the rubber mold is transferred on the circuit which is located in a chamber having inert-gas atmosphere.

65. A production method of a green magnet compact, comprising:
preparing a rubber mold which comprises rubber in at least side portion thereof and is open at a top thereof;
filling a cavity of the rubber mold with a slurry containing maget powder and a solvent in the rubber mold in or outside a die-press machine is provided with an upper punch, a filter and a water suction channel formed in the upper punch;
placing the filled rubber mold in the die-press machine;
placing the filter between the upper punch and the open top of the rubber mold;
compacting the filled rubber mold and the magnet powder therein, thereby sucking the solvent through the filter and the water-suction channel.

66. A production method of a green magnet compact according to claim 65 further comprising making the upper profile of the slurry filled in the rubber mold essentially the same as the profile of a lower punch of the upper punch.

67. A production method of a green magnet compact according to claim 66, wherein the slurry contains a defoaming agent.

68. A production method of a green magnet compact according to claim 65, 66 or 67, wherein prior or subsequent to filling the slurry in the rubber mold the inside of the cavity of the rubber mold is subjected to degassing treatment under vacuum.

69. A production method of a green magnet compact according to claim 68, wherein a bottom of a rubber mold is harder than the side portion of the rubber mold.

70. A production method of a green magnet compact according to claim 69, wherein prior or subsequent to filling the slurry in the rubber mold, the inside of cavity of the rubber mold is subjected to a degassing treatement under vacuum.

71. A production method of a green magnet compact according to claim 1, wherein the rubber mold comprising at least a top and bottom, in which at least one of the top and the bottom has a thickness (t, unti-mm) defined by $t \leq 16h/D$ (h is thickness of a green compact, and D is a positive square root of cross-sectional area of the green compact).

72. A production method of a green magnet compact according to claim 71, wherein prior or subsequent to filling the slurry in the rubber mold the inside of the cavity of the rubber mold is subjected to degassing treatment under vacuum.

73. A production method of a green magnet compact according to claim 65, 66 or 67, wherein said green compact is hollow, and said rubber mold is provided with a mandrel which is harder than the other portion of the rubber mold.

74. A production method of a green magnet according to claim 73, wherein prior or subs compact according to filling the slurry in the rubber mold, the inside of the cavity of the rubber mold is subjected to a degassing treatement under vacuum.

75. A production method of a green compact according to claim 65 repeatedly carrying out on a circuit the preparation of the rubber mold, filling of the slurry, placing the filled rubber mold, and compacting.

76. A production method of a green compact according to claim 75, repeatedly carrying out on a circuit the preparation of the rubber mold, filling of the slurry, placing the filled rubber mold, compacting and the degassing treatment.

77. A production method of a green compact according to claim 75 or 76, wherein at least one rubber mold is mounted on the circuit and circulates around positions of respective treatments.

78. A production method of a green compact according to claim 75 or 76, wherein at least one palette, on which the rubber mold is mounted, is conveyed through positions of respective treatments.

79. A production method of a sintered compact having a density of 90% or more, comprising:
preparing a rubber mold which comprises rubber in at least a side portion thereof and which is located outside a die-press machine;
filling a cavity in the rubber mold with a fine powder of material except for Magnet material having average particle diameter of 50 μm or less and being essentially free of organic binder to a density which is at least 1.15 times a natural filling density of the fine powder, by means of vibration, pressing the fine powder with a pushing or both;
placing the filled rubber mold in the die-press machine;
compacting the filled rubber mold and the fine powder therein by a punch in the die-press machine to obtain a green compact of the fine powder; and
sintering the green compact;
wherein the natural filling density is obtained by allowing the fine powder from a powder pan into the rubber mold until the top of the fine powder arrives at an upper frame which prevents the fine powder from overflowing the rubber mold, the distance between a bottom end of the powder pan and the bottom of the rubber mold being 3.7 times the depth of the cavity of the rubber mold.

80. A production method of a sintered compact having a density of 90% or more according to claim 79, wherein the fine powder is filled under gravity and by a vibrator, on which the rubber mold is placed.

81. A production method of a sintered compact having a density of 90% or more according to claim 79, wherein weight of the fine powder is preliminarily weighed and then filled under gravity into the rubber mold, which has a guide frame on the upper surface of the rubber mold, until the fine powder stacks higher than the upper surface of the rubber mold.

82. A production method of a sintered compact having a density of 90% or more according to claim 79, a feeder box for feeding the fine powder is located on the rubber mold, and the fine powder is stirred by a rotary blade mounted in the feeder box to fill the fine powder into the rubber mold.

83. A production method of a sintered compact having a density of 90% or more according to claim 79, wherein a feeder box for feeding the fine powder is located on the rubber mold, and the fine powder is stirred by a reciprocating blade mounted in the feeder box to fill the fine powder into the rubber mold.

84. A production method of a sintered compact having a density of 90% or more according to claim 79, wherein a feeder box for feeding the fine powder is located on the rubber mold, and the fine powder is vibrated by a vibrator mounted in the feeder box to fill the fine powder into the rubber mold.

85. A production method of a sintered compact having a density of 90% or more according to claim 79, wherein the fine powder is conveyed by a conveyor, on whose lower side a vibrator is slidably attached to fill the fine powder into the rubber mold at the high density.

86. A production method of a sintered compact having a density of 90% or more according to claim 79, wherein a screw rod, around which blades are spirally secured, is coaxially mounted in a container, and, the fine powder is stirred in the container to enhance its density and is then dropped into the rubber mold.

87. A production method of a sintered compact having a density of 90% or more according to claim 79, wherein the fine powder is conveyed by a conveyor, on whose both sides rolls are located to press the fine powder, and the densified fine powder is dropped into the rubber mold.

88. A production method of a sintered compact having a density of 90% or more according to claim 79, wherein the fine powder is filled into the rubber mold under gravity and magnetic field.

89. A production method of a sintered compact having a density of 90% or more according to claim 79, wherein upper and lower peripheral edges of the inner wall of the rubber mold are tapered.

90. A production method of a sintered compact having a density of 90% or more according to claim 79, wherein the green compact has a flat shape having 2 or more of width/thickness ratio, and further the rubber mold having at least one of the top and the bottom harder than said side protion, wherein the width is defined as a positive square root of cross sectiona area of the sintered green compact.

91. A production method of a sintered compact having a density of 90% or more according to claim 79, wherein the green compact has a flat shape having 0.5 or less of width/thickness ratio, and further the rubber mold having at least one of the top and the bottom softer than said side protion, wherein the width is defined as a positive square root of cross sectiona area of the sintered green compact.

92. A production method of a sintered magnet compact according to claim 79, wherein the rubber mold comprising at least a top and bottom, in which at least one of the top and the bottom has a thickness (t, unit-mm) defined by t≦16h/D (h is thickness of a green compact, and D is a positive square root of cross-sectional area of the green compact).

93. A production method of a sintered magnet compact according to claim 79, wherein the rubber mold comprises a mandrel which is harder than the other portions of the rubber mold.

94. A production method 0 f a sintered magnet compact according to 79, wherein the rubber mold is open at the top thereof or at the bottom thereof, ant the open portion of the rubber mold is directly pressed by a punch of the die-press machine.

95. A production method of a sintered magnet compact according to claim 79, 80, 81, 82, 83, 84, 85, 86, 87, 88, 89, 90, 91, 92, 93, or 94, further comprising the steps of weighing the fine powder to provide a predetermined weight, and producing green compacts having said predetermined weight.

96. A production method for making a sintered magnet compact according to claim 95, further comprising the steps of dropping fine powder onto a tray through a vibrating mesh until a predetermined weight of the fine powder is obtained; and then dropping the predetermined weight of said fine powder from the tray into the rubber mold.

97. A production method of a sintered magnet compact according to claim 79, 80, 81, 82, 83, 84 ,85, 86, 87, 88, 89, 90, 91, 92, 93, or 94, further comprising the steps of filling the fine powder under gravity into the rubber mold; weighing the fine powder during its filling in the rubber mold under gravity; and stopping the filling under gravity when a predermined weight is obtained.

98. A production method of a sintered compact having a density of 90% or more according to claim 79, 80, 81, 82, 83 ,84, 85, 86, 87, 88, 89, 90, 91, 92, 93, or 94, wherein the side portion of the rubber mold consist of two or more parts.

99. A production method of a sintered compact having a density of 90% or more according to claim 79, 80, 81, 82, 83, 84, 85, 86, 87, 88, 89, 90, 91, 92, 93, or 94, wherein the side portion of the rubber mold consists the first material at the inner side thereof and the second material facing a die of the die-pressing machine, said first material being essentially harder than the second material.

100. A production method of a sintered compact having a density of 90% or more according to claim 79, 80, 81, 82, 83, 84, 85, 86, 87, 88, 89, 90, 91, 92, 93 or 94, wherein the fine powder has an average particle diameter of 30 $\mu$m or less.

101. A production method of a sintered compact having a density of 90% or more according to claim 99, wherein the average particle deameter is 20 $\mu$m or less.

102. A production method of a sintered compact according to claim 99, wherein the fine powder is filled at a density of 1.3 times or more the natural density.

103. A production method of a magnet according to claim 110, wherein the fine powder is filled at a density of 60% or less or of a true density of the fine powder.

104. A production method of a sintered compost having a density of 90% or more according claim 79, 80, 81, 82, 83, 84, 85, 86, 87, 88, 89, 90, 91, 92, 93, or 94, wherein the material of the fine power is at least one selected from the group consisting of Fe, Co, Ni, Cu, Mo, Al, Ti, and their alloys.

105. A production method of a sintered compact having a density of 90% or more according to claim 104, wherein material of the fine powder is atomized iron.

106. A production method of a sintered compact having a density of 90% or more according to claim 100, wherein the material fine powder is atomized or melt-quenched aluminum.

107. A production method of a sintered compact having a density of 90% or more according to claim 79, 80, 81, 82, 83, 84, 85, 86, 87, 88, 89, 90, 91, 92, 93 or 94, wherein further comprising a step of enlarging a clearance between the green compact and the rubber mold.

108. A production method of a sintered compact having a density of 90% or more according to claim 107, wherein the clearance enlarging step is carried out by imparting pressure to the inner surface of the rubber mold.

109. A production method of a sintered compact having a density of 90% or more according to claim 107, wherein the clearance enlarging step is carried out by decreasing pressure applied to the outer surface of the rubber mold.

110. A production method of a sintered compact having a density of 90% or more, comprising:
preparing a rubber mold which comprises rubber at least in a side portion thereof;
weighing fine powder of material except for magnet material, having average particle size of 50 m or less and being essentially free of organic binder, to provide a predetermined amount;
filling a cavity of the rubber mold with the fine powder to a density at least 1.15 times a natural filling density, outside a die-press machine;
placing the filled rubber mold in the die-press machine;
compacting the rubber mold and the fine powder by a punch of the die-press machine thereby obtaining a green compact;
withdrawing the green compact from the rubber mold; and
sintering the green compact; wherein the rubber mold is mounted on a conveying means for circulating the same around and intermittently moving the same between positions where said filling, compacting and withdrawing are carried out, and, further wherein the natural filling density is obtained by allowing the fine powder to fall under gravity into the rubber mold from a powder pan until the top of the fine powder arrives at an upper frame which prevents the fine powder from overflowing from the rubber mold, the distance between the bottom end of the powder pan and the bottom of the rubber mold is 3.7 times the depth of cavity of the rubber mold.

111. A production method of a sintered compact having a density of 90% or more, comprising:
preparing a rubber mold which comprises rubber at least in a side portion thereof;
weighing fine powder of material except for magnet material, having average particle size of 50 $\mu$m or less and being essentially free of organic binder, to provide a predetermined amount;

filling a cavity of the rubber mold with the fine powder to a density at least 1.15 times a natural filling density, outside a die-press machine;

placing the filled rubber mold in the die-press machine;

compacting the rubber mold and the fine powder by a punch of the die-press machine thereby obtaining a green compact;

withdrawing the green compact from the rubber mold; and sintering the green compact; wherein the rubber mold is mounted on a conveying means for linearly and intermittently conveying the rubber molds between positions where said filling, compacting and withdrawing are carried out, and, further wherein the natural filling density is obtained by allowing the fine powder to fall under gravity into the rubber mold from a powder pan until the top of the fine powder arrives at an upper frame which prevents the fine powder from overflowing from the rubber mold, the distance between the bottom end of the powder pan and the bottom of the rubber mold is 3.7 times the depth of cavity of the rubber mold.

112. A production method of a sintered it compact having a density of 90% or more according to claim 111, wherein the linear moving passage of the supporting means has a polygonal configuration.

113. A production method of a sintered compact having a density of 90% or more according to claim 112, where the linear moving passage of the supporting means is straight.

114. A production method of a sintered compact having a density of 90% or more according to claim 110, 111, 112 or 113, wherein a die is moved together with the rubber mold.

115. A production method of a sintered compact having a density of 90% or more according to claim 110, 111, 112 or 113, wherein the rubber mold is moved within a chamber, whose inner atmosphere is inert gas.

116. A production method for producing a sintered compact having a density of 90% or more, comprising:

preparing a rubber mold which comprises rubber in at least a side portion thereof and which is located outside a die-press machine;

filling a cavity in the rubber mold with a fine powder of a material other than a magnet material having an average particle diameter of 50 μm or less to a density which is at least 1.15 times a natural filling density of the fine powder, by means of vibration, pressing the fine powder with pushing or both;

placing the filled rubber mold in the die-press machine;

compacting the filled rubber mold and the fine powder therein by a punch in the die-press machine to obtain a green compact of the fine powder; and sintering the green compact;

wherein the natural filling density is obtained by allowing the fine powder to fall from a powder pan into the rubber mold until the top of the fine powder arrives at an upper frame which prevents the fine powder from overflowing the rubber mold, the distance between a bottom end of the powder pan and the bottom of the rubber mold being 3.7 times the depth of the cavity of the rubber mold.

117. A production method for producing a sintered compact having a density of 90% or more according to claim 116, wherein the fine powder is filled under gravity and by a vibrator, on which the rubber mold is placed.

118. A production method for producing a sintered compact having a density of 90% or more according to claim 116, wherein the fine powder is preliminarily weighed and then filled under gravity into the rubber mold, which has a guide frame on the upper surface of the rubber mold, until the fine powder stacks higher than the upper surface of the rubber mold.

119. A production method for producing a sintered compact having a density of 90% or more according to claim 116, wherein a feeder box for feeding the fine powder is located on the rubber mold, and the fine powder is stirred by a blade mounted in the feeder box to fill the fine powder into the rubber mold.

120. A production method for producing a sintered compact having a density of 90% or more according to claim 116, wherein a feeder box for feeding the fine powder is located on the rubber mold, and the fine powder is vibrated by a vibrator mounted in the feeder box to fill the fine powder into the rubber mold.

121. A production method for producing a sintered compact having a density of 90% or more according to claim 116, wherein the fine powder is conveyed by a conveyor, on whose lower side a vibrator is slidably attached to fill the fine powder into the rubber mold at the high density.

122. A production method for producing a sintered compact having a density of 90% or more according to claim 116, wherein a screw rod, around which blades are spirally secured, is coaxially mounted in a container, and the fine powder is stirred in the container to enhance its density and is then dropped into the rubber mold.

123. A production method for producing a sintered compact having a density of 90% or more according to claim 116, wherein the fine powder is conveyed by a conveyor, on both sides of which rolls are located to press the fine powder, and the densified fine powder is dropped into the rubber mold.

124. A production method for producing a sintered compact having a density of 90% or more according to claim 116, wherein upper and lower peripheral edges of the inner wall of the rubber mold are tapered.

125. A production method for producing a sintered compact having a density of 90% or more according to claim 116, wherein the green compact has a flat shape of a width/thickness ratio of 2 or more the rubber mold has at least one of the top and the bottom harder than said side portion, and wherein the width is defined as a positive square root of cross sectional area of the sintered green compact.

126. A production method for producing a sintered compact having a density of 90% or more according to claim 116, wherein the green compact has a flat shape of a width/thickness ratio of 0.5 or less the rubber mold has at least one of the top and the bottom softer than said side portion, wherein the width is defined as a positive square root of cross sectional area of the sintered green compact.

127. A production method for producing a sintered magnet compact according to claim 116, wherein the rubber mold comprises at least a top and bottom, in which at least one of the top and the bottom has a thickness t, units in mm, defined by $t \leq 16h/D$, wherein h is thickness of a green compact and D is a positive square root of cross-sectional area of the green compact.

128. A production method for producing a sintered magnet compact according to claim 116, wherein the rubber mold comprises a mandrel which is harder than the other portions of the rubber mold.

129. A production method of a sintered magnet compact according to claim 116, wherein the rubber mold is open at the top thereof or at the bottom thereof, and the open portion of the rubber mold is directly pressed by a punch of the die-press machine.

130. A production method of a sintered magnet compact according to any one of claims 116 through 127, further comprising the steps of filling the fine powder under gravity into the rubber mold; weighing the fine powder during its filling in the rubber mold under gravity; and stopping the filling under gravity when a predetermined weight is obtained.

131. A production method for producing a sintered compact having a density of 90% or more according to any one of claims 116 through 129, wherein the fine powder has an average particle diameter of 30 μm or less.

132. A production method for producing a sintered compact having a density of 90% or more according to claim 131, wherein the average particle diameter is 20 μm or less.

133. A production method for producing a sintered compact according to claim 131, wherein the fine powder is filled to a density of 1.3 times or more the natural density.

134. A production method for producing a magnet according to claim 133, wherein the fine powder is filled to a density of 60% or less or of a true density of the fine powder.

135. A production method for producing a sintered compact having a density of 90% or more according to any of claims 116 through 129, wherein the material of the fine powder is at least one selected from the group consisting of Fe, Co, Ni, Cu, Mo, Al, Ti, and their alloys.

136. A production method for producing a sintered compact having a density of 90% or more according to claim 135, wherein the material of the fine powder is atomized iron.

137. A production method for producing a sintered compact having a density of 90% or more according to claim 135, wherein the material fine powder is atomized or melt-quenched aluminum.

138. A production method for producing a sintered compact having a density of 90% or more according to any of claims 116 through 129, further comprising a step of enlarging a clearance between the green compact and the rubber mold.

139. A production method for producing a sintered compact having a density of 90% or more, comprising:
preparing a rubber mold which comprises rubber at least in a side portion thereof;
weighing fine powder of a material other than a magnet material, having an average particle size of 50 μm or less to provide a predetermined amount;
filling a cavity of the rubber mold with the fine powder to a density at least 1.15 times a natural filling density, outside a die-press machine;
placing the filled rubber mold in the die-press machine;
compacting the rubber mold and the fine powder by a punch of the die-press machine thereby obtaining a green compact;
withdrawing the green compact from the rubber mold; and
sintering the green compact;
wherein the rubber mold is mounted on a conveying means for circulating the same around and intermittently moving the same between positions wherein said filling, compacting and withdrawing are carried out, and, further wherein the natural filling density is obtained by allowing the fine powder to fall under gravity into the rubber mold from a powder pan until the top of the fine powder arrives at an upper frame which prevents the fine powder from overflowing from the rubber mold, the distance between the bottom end of the powder pan and the bottom of the rubber mold being 3.7 times the depth of cavity of the rubber mold.

140. A production method for producing a sintered compact having a density of 90% or more, comprising:
preparing a rubber mold which comprises rubber at least in a side portion thereof;
weighing fine powder of a material other than a magnet material, having an average particle size of 50 μm or less to provide a predetermined amount;
filling a cavity of the rubber mold with the fine powder to a density at least 1.15 times a natural filling density, outside a die-press machine.
placing the filled rubber mold in the die-press machine;
compacting the rubber mold and the fine powder by a punch of the die-press machine thereby obtaining a green compact;
withdrawing the green compact from the rubber mold; and
sintering the green compact,
wherein the rubber mold is mounted on a conveying means for linearly and intermittently conveying the rubber molds between positions where said filling, compacting and withdrawing are carried out, and, further wherein the natural filling density is obtained by allowing the fine powder to fall under gravity into the rubber mold from a powder pan until the top of the fine powder arrives at an upper frame which prevents the fine powder from overflowing from the rubber mold, the distance between the bottom end of the powder pan and the bottom of the rubber mold being 3.7 times the depth of cavity of the rubber mold.

141. A production method for producing a sintered compact having a density of 90% or more according to claim 140, wherein the linear moving passage of the supporting means has a polygonal configuration.

142. A production method for producing a sintered compact having a density of 90% or more according to claims 139, 140 or 141, wherein a die is moved together with the rubber mold.

143. A production method for producing a sintered compact having a density of 90% or more according to claim 139, 140 or 141, wherein the rubber mold is moved within a chamber, whose inner atmosphere is inert gas.

144. A production method for producing a green magnet compact, comprising:
preparing a rubber mold which comprises rubber in at least a side portion thereof and which is located outside a die-press machine;
filling a cavity in the rubber mold with a magnet powder to a density which is at least 1.2 times a natural filling density of the fine powder, by means of stirring the magnet powder by a reciprocating blade mounted in a feeder box to fill the magnet powder into the rubber mold, said feeder box being located on the rubber mold;

placing the filled rubber mold in the die-press machine; and compacting the filled rubber mold and the fine powder therein by a punch in the die-press machine to obtain a green compact of the magnet powder;

wherein the natural filling density is obtained by allowing the fine powder to fall from a powder pan into the rubber mold until the top of the fine powder arrives at an upper frame which prevents the fine powder from overflowing the rubber mold, the distance between a bottom end of the powder pan and the bottom of the rubber mold being 3.7 times the depth of the cavity of the rubber mold; and wherein a magnetic field is applied to the filled rubber mold containing the magnet powder before or during the compacting of the filled rubber mold and the fine powder therein by the punch in the die-press machine.

145. A production method for producing a green magnet compact, comprising:

preparing a rubber mold which comprises rubber in at least a side portion thereof and which is located outside a die-press machine;

filling a cavity in the rubber mold with a magnet powder to a density which is at least 1.2 times a natural filling density of the fine powder, by means of vibrating the magnet powder by a vibrator mounted in a feeder box to fill the magnet powder into the rubber mold, said feeder box being located on the rubber mold;

placing the filled rubber mold in the die-press machine; and compacting the filled rubber mold and the fine powder therein by a punch in the die-press machine to obtain a green compact of the magnet powder;

wherein the natural filling density is obtained by allowing the fine powder to fall from a powder pan into the rubber mold until the top of the fine powder arrives at an upper frame which prevents the fine powder from overflowing the rubber mold, the distance between a bottom end of the powder pan and the bottom of the rubber mold being 3.7 times the depth of the cavity of the rubber mold; and wherein a magnetic field is applied to the filled rubber mold containing the magnet powder before or during the compacting of the filled rubber mold and the fine powder therein by the punch in the die-press machine.

146. A production method for producing a green magnet compact, comprising:

preparing a rubber mold which comprises rubber in at least a side portion thereof and which is located outside a die-press machine;

filling a cavity in the rubber mold with a magnet powder to a density which is at least 1.2 times a natural filling density of the fine powder, by means if imparting vibration to the magnet powder while the magnet powder is conveyed on a conveyor by a vibrator slidably attached to a lower side of the conveyor and then dropping the magnet powder into the rubber mold;

placing the filled rubber mold in the die-press machine; and compacting the filled rubber mold and the fine powder therein by a punch in the die-press machine to obtain a green compact of the magnet powder;

wherein the natural filling density is obtained by allowing the fine powder to fall from a powder pan into the rubber mold until the top of the fine powder arrives at an upper frame which prevents the fine powder from overflowing the rubber mold, the distance between a bottom end of the powder pan and the bottom of the rubber mold being 3.7 times the depth of the cavity of the rubber mold; and wherein a magnetic field is applied to the filled rubber mold containing the magnet powder before or during the compacting of the filled rubber mold and the fine powder therein by the punch in the die-press machine.

147. A production method for producing a green magnet compact, comprising:

preparing a rubber mold which comprises rubber in at least a side portion thereof and which is located outside a die-press machine;

filling a cavity in the rubber mold with a magnet powder to a density which is at least 1.2 times a natural filling density of the fine powder, by means of stirring the magnet powder with blades which are spirally secured around a screw rod coaxially mounted in a container and then dropping the magnet powder into the rubber mold;

placing the filled rubber mold in the die-press machine; and compacting the filled rubber mold and the fine powder therein by a punch in the die-press machine to obtain a green compact of the magnet powder;

wherein the natural filling density is obtained by allowing the fine powder to fall from a powder pan into the rubber mold until the top of the fine powder arrives at an upper frame which prevents the fine powder from overflowing the rubber mold, the distance between a bottom end of the powder pan and the bottom of the rubber mold being 3.7 times the depth of the cavity of the rubber mold; and wherein a magnetic field is applied to the filled rubber mold containing the magnet powder before or during the compacting of the filled rubber mold and the fine powder therein by the punch in the die-press machine.

148. A production method for producing a green magnet compact, comprising:

preparing a rubber mold which comprises rubber in at least a side portion thereof and which is located outside a die-press machine;

filling a cavity in the rubber mold with a magnet powder to a density which is at least 1.2 times a natural filling density of the fine powder, by densifying the magnet powder by rolls located on the sides of a conveyor on which the magnet powder is conveyed and dropping the densified magnet powder into the rubber mold;

placing the filled rubber mold in the die-press machine; and compacting the filled rubber mold and the fine powder therein by a punch in the die-press machine to obtain a green compact of the magnet powder;

wherein the natural filling density is obtained by allowing the fine powder to fall from a powder pan into the rubber mold until the top of the fine powder arrives at an upper frame which prevents the fine powder from overflowing the rubber mold, the distance between a bottom end of the powder pan and the bottom of the rubber mold being 3.7 times the depth of the cavity of the rubber mold; and wherein a magnetic field is applied to the filled rubber mold containing the magnet powder before or during the compacting of the filled rubber mold and the fine powder therein by the punch in the die-press machine.

149. A production method for producing a green magnet compact, comprising:

preparing a rubber mold which comprises rubber in at least a side portion thereof and which is located outside a die-press machine;

filling a cavity in the rubber mold with a magnet powder to a density which is at least 1.2 times a natural filling density of the fine powder under gravity and a magnetic field;

placing the filled rubber mold in the die-press machine; and compacting the filled rubber mold and the fine powder therein by a punch in the die-press machine to obtain a green compact of the magnet powder;

wherein the natural filling density is obtained by allowing the fine powder to fall from a powder pan into the rubber mold until the top of the fine powder arrives at an upper frame which prevents the fine powder from overflowing the rubber mold, the distance between a bottom end of the powder pan and the bottom of the rubber mold being 3.7 times the depth of the cavity of the rubber mold; and wherein a magnetic field is applied to the filled rubber mold containing the magnet powder before or during the compacting of the filled rubber mold and the time powder therein by the punch in the die-press machine.

150. The production method of claim 144, 145, 146, 147, 148 or 149, wherein the magnetic field is applied to orient particles in the magnetic powder prior to the compacting of the rubber mold and the magnet powder therein.

* * * * *